United States Patent
Narayanaswami

(10) Patent No.: US 12,514,980 B2
(45) Date of Patent: Jan. 6, 2026

(54) ADJUSTMENT OF MEDICAMENT DELIVERY BY A MEDICAMENT DELIVERY DEVICE BASED ON MENSTRUAL CYCLE PHASE

(71) Applicant: INSULET CORPORATION, Acton, MA (US)

(72) Inventor: Rangarajan Narayanaswami, Weston, MA (US)

(73) Assignee: INSULET CORPORATION, Acton, MA (US)

( * ) Notice: Subject to any disclaimer, the term of this patent is extended or adjusted under 35 U.S.C. 154(b) by 832 days.

(21) Appl. No.: 17/848,675

(22) Filed: Jun. 24, 2022

(65) Prior Publication Data

US 2023/0001089 A1 Jan. 5, 2023

Related U.S. Application Data

(60) Provisional application No. 63/216,814, filed on Jun. 30, 2021.

(51) Int. Cl.
*A61M 5/172* (2006.01)
*G16H 20/17* (2018.01)
*G16H 40/67* (2018.01)

(52) U.S. Cl.
CPC .......... *A61M 5/1723* (2013.01); *G16H 20/17* (2018.01); *G16H 40/67* (2018.01);
(Continued)

(58) Field of Classification Search
None
See application file for complete search history.

(56) References Cited

U.S. PATENT DOCUMENTS 303,013 A 8/1884 Horton
445,545 A 2/1891 Crane
(Continued)

FOREIGN PATENT DOCUMENTS

AU 2015200834 A1 3/2015
AU 2015301146 A1 3/2017
(Continued)

OTHER PUBLICATIONS

US 5,954,699 A, 09/1999, Jost et al. (withdrawn)
(Continued)

*Primary Examiner* — Manuel A Mendez
(74) *Attorney, Agent, or Firm* — GOODWIN PROCTER LLP

(57) ABSTRACT

Exemplary embodiments account for differing needs of a user over the menstrual cycle of the user to better control the blood glucose concentration of the user. The exemplary embodiments may be realized in control systems for medicament delivery devices that deliver medicaments, such as medicaments that regulate blood glucose concentration levels. Examples of such medicaments that regulate blood glucose concentration levels include insulin, glucagon, and glucagon peptide-1 (GLP-1) agonists. The exemplary embodiments are able to better tailor the dosages of the medicament delivered to the user with the medicament delivery device to reduce the risk of hyperglycemia and hypoglycemia and help reduce blood glucose concentration excursions.

20 Claims, 19 Drawing Sheets

(52) U.S. Cl.
CPC .............. *A61M 2205/3303* (2013.01); *A61M 2205/50* (2013.01); *A61M 2230/06* (2013.01); *A61M 2230/201* (2013.01); *A61M 2230/50* (2013.01); *A61M 2230/63* (2013.01); *A61M 2230/65* (2013.01)

(56) References Cited

U.S. PATENT DOCUMENTS

| | | |
|---|---|---|
| 588,583 A | 8/1897 | Lade |
| 1,441,508 A | 1/1923 | Marius |
| 2,283,925 A | 5/1942 | Harvey |
| 2,797,149 A | 6/1957 | Skeggs |
| 2,886,529 A | 5/1959 | Guillaud |
| 3,574,114 A | 4/1971 | Monforte |
| 3,614,554 A | 10/1971 | Shield |
| 3,631,847 A | 1/1972 | Hobbs |
| 3,634,039 A | 1/1972 | Brondy |
| 3,812,843 A | 5/1974 | Wootten et al. |
| 3,841,328 A | 10/1974 | Jensen |
| 3,885,662 A | 5/1975 | Schaefer |
| 3,963,380 A | 6/1976 | Thomas, Jr. et al. |
| 3,983,077 A | 9/1976 | Fuller et al. |
| 4,055,175 A | 10/1977 | Clemens et al. |
| 4,108,177 A | 8/1978 | Pistor |
| 4,146,029 A | 3/1979 | Ellinwood, Jr. |
| 4,151,845 A | 5/1979 | Clemens |
| 4,245,634 A | 1/1981 | Albisser et al. |
| 4,268,150 A | 5/1981 | Chen |
| 4,313,439 A | 2/1982 | Babb et al. |
| 4,368,980 A | 1/1983 | Aldred et al. |
| 4,373,527 A | 2/1983 | Fischell |
| 4,400,683 A | 8/1983 | Eda et al. |
| 4,403,984 A | 9/1983 | Ash et al. |
| 4,424,720 A | 1/1984 | Bucchianeri |
| 4,435,173 A | 3/1984 | Siposs et al. |
| 4,464,170 A | 8/1984 | Clemens et al. |
| 4,469,481 A | 9/1984 | Kobayashi |
| 4,475,901 A | 10/1984 | Kraegen et al. |
| 4,498,843 A | 2/1985 | Schneider et al. |
| 4,507,115 A | 3/1985 | Kambara et al. |
| 4,523,170 A | 6/1985 | Huth, III |
| 4,526,568 A | 7/1985 | Clemens et al. |
| 4,526,569 A | 7/1985 | Bernardi |
| 4,529,401 A | 7/1985 | Leslie et al. |
| 4,551,134 A | 11/1985 | Slavik et al. |
| 4,559,033 A | 12/1985 | Stephen et al. |
| 4,559,037 A | 12/1985 | Franetzki et al. |
| 4,562,751 A | 1/1986 | Nason et al. |
| 4,573,968 A | 3/1986 | Parker |
| 4,585,439 A | 4/1986 | Michel |
| 4,601,707 A | 7/1986 | Albisser et al. |
| 4,624,661 A | 11/1986 | Arimond |
| 4,633,878 A | 1/1987 | Bombardieri |
| 4,634,427 A | 1/1987 | Hannula et al. |
| 4,646,038 A | 2/1987 | Wanat |
| 4,657,529 A | 4/1987 | Prince et al. |
| 4,678,408 A | 7/1987 | Nason et al. |
| 4,684,368 A | 8/1987 | Kenyon |
| 4,685,903 A | 8/1987 | Cable et al. |
| 4,731,726 A | 3/1988 | Allen, III |
| 4,743,243 A | 5/1988 | Vaillancourt |
| 4,755,169 A | 7/1988 | Sarnoff et al. |
| 4,755,173 A | 7/1988 | Konopka et al. |
| 4,759,120 A | 7/1988 | Bernstein |
| 4,781,688 A | 11/1988 | Thoma et al. |
| 4,781,693 A | 11/1988 | Martinez et al. |
| 4,808,161 A | 2/1989 | Kamen |
| 4,854,170 A | 8/1989 | Brimhall et al. |
| 4,859,492 A | 8/1989 | Rogers, Jr. et al. |
| 4,880,770 A | 11/1989 | Mir et al. |
| 4,886,499 A | 12/1989 | Cirelli et al. |
| 4,898,578 A | 2/1990 | Rubalcaba, Jr. |
| 4,898,579 A | 2/1990 | Groshong et al. |
| 4,900,292 A | 2/1990 | Berry et al. |
| 4,919,596 A | 4/1990 | Slate et al. |
| 4,925,444 A | 5/1990 | Orkin et al. |
| 4,940,527 A | 7/1990 | Kazlauskas et al. |
| 4,944,659 A | 7/1990 | Labbe et al. |
| 4,967,201 A | 10/1990 | Rich, III |
| 4,969,874 A | 11/1990 | Michel et al. |
| 4,975,581 A | 12/1990 | Robinson et al. |
| 4,976,720 A | 12/1990 | Machold et al. |
| 4,981,140 A | 1/1991 | Wyatt |
| 4,994,047 A | 2/1991 | Walker et al. |
| 5,007,286 A | 4/1991 | Malcolm et al. |
| 5,007,458 A | 4/1991 | Marcus et al. |
| 5,062,841 A | 11/1991 | Siegel |
| 5,084,749 A | 1/1992 | Losee et al. |
| 5,097,834 A | 3/1992 | Skrabal |
| 5,102,406 A | 4/1992 | Arnold |
| 5,109,850 A | 5/1992 | Blanco et al. |
| 5,125,415 A | 6/1992 | Bell |
| 5,130,675 A | 7/1992 | Sugawara |
| 5,134,079 A | 7/1992 | Cusack et al. |
| 5,139,999 A | 8/1992 | Gordon et al. |
| 5,153,827 A | 10/1992 | Coutre et al. |
| 5,154,973 A | 10/1992 | Imagawa et al. |
| 5,165,406 A | 11/1992 | Wong |
| 5,176,662 A | 1/1993 | Bartholomew et al. |
| 5,178,609 A | 1/1993 | Ishikawa |
| 5,189,609 A | 2/1993 | Tivig et al. |
| 5,198,824 A | 3/1993 | Poradish |
| 5,205,819 A | 4/1993 | Ross et al. |
| 5,207,642 A | 5/1993 | Orkin et al. |
| 5,213,483 A | 5/1993 | Flaherty et al. |
| 5,217,754 A | 6/1993 | Santiago-Aviles et al. |
| 5,219,377 A | 6/1993 | Poradish |
| 5,232,439 A | 8/1993 | Campbell et al. |
| 5,237,993 A | 8/1993 | Skrabal |
| 5,244,463 A | 9/1993 | Cordner, Jr. et al. |
| 5,254,096 A | 10/1993 | Rondelet et al. |
| 5,257,980 A | 11/1993 | Van Antwerp et al. |
| 5,261,882 A | 11/1993 | Sealfon |
| 5,263,198 A | 11/1993 | Geddes et al. |
| 5,272,485 A | 12/1993 | Mason et al. |
| 5,273,517 A | 12/1993 | Barone et al. |
| 5,281,202 A | 1/1994 | Weber et al. |
| 5,281,808 A | 1/1994 | Kunkel |
| 5,299,571 A | 4/1994 | Mastrototaro |
| 5,308,982 A | 5/1994 | Ivaldi et al. |
| 5,342,298 A | 8/1994 | Michaels et al. |
| 5,346,476 A | 9/1994 | Elson |
| 5,364,342 A | 11/1994 | Beuchat et al. |
| 5,377,674 A | 1/1995 | Kuestner |
| 5,380,665 A | 1/1995 | Cusack et al. |
| 5,385,539 A | 1/1995 | Maynard |
| 5,389,078 A | 2/1995 | Zalesky |
| 5,403,797 A | 4/1995 | Ohtani et al. |
| 5,411,889 A | 5/1995 | Hoots et al. |
| 5,421,812 A | 6/1995 | Langley et al. |
| 5,427,988 A | 6/1995 | Sengupta et al. |
| 5,433,710 A | 7/1995 | VanAntwerp et al. |
| 5,456,945 A | 10/1995 | McMillan et al. |
| 5,468,727 A | 11/1995 | Phillips et al. |
| 5,478,610 A | 12/1995 | Desu et al. |
| 5,505,709 A | 4/1996 | Funderburk et al. |
| 5,505,828 A | 4/1996 | Wong et al. |
| 5,507,288 A | 4/1996 | Bocker et al. |
| 5,513,382 A | 4/1996 | Agahi-Kesheh et al. |
| 5,533,389 A | 7/1996 | Kamen et al. |
| 5,535,445 A | 7/1996 | Gunton |
| 5,540,772 A | 7/1996 | McMillan et al. |
| 5,543,773 A | 8/1996 | Evans et al. |
| 5,558,640 A | 9/1996 | Pfeiler et al. |
| 5,569,186 A | 10/1996 | Lord et al. |
| 5,582,593 A | 12/1996 | Hultman |
| 5,584,053 A | 12/1996 | Kommrusch et al. |
| 5,584,813 A | 12/1996 | Livingston et al. |
| 5,590,387 A | 12/1996 | Schmidt et al. |
| 5,606,535 A * | 2/1997 | Lynn ................... G04G 9/00 368/10 |
| 5,609,572 A | 3/1997 | Lang |
| 5,614,252 A | 3/1997 | McMillan et al. |
| 5,625,365 A | 4/1997 | Tom et al. |

(56) References Cited

U.S. PATENT DOCUMENTS

| | | |
|---|---|---|
| 5,635,433 A | 6/1997 | Sengupta |
| 5,637,095 A | 6/1997 | Nason et al. |
| 5,665,065 A | 9/1997 | Colman et al. |
| 5,665,070 A | 9/1997 | McPhee |
| 5,678,539 A | 10/1997 | Schubert et al. |
| 5,685,844 A | 11/1997 | Marttila |
| 5,685,859 A | 11/1997 | Kornerup |
| 5,693,018 A | 12/1997 | Kriesel et al. |
| 5,697,899 A | 12/1997 | Hillman et al. |
| 5,700,695 A | 12/1997 | Yassinzadeh et al. |
| 5,703,364 A | 12/1997 | Rosenthal |
| 5,707,459 A | 1/1998 | Itoyama et al. |
| 5,707,715 A | 1/1998 | deRochemont et al. |
| 5,713,875 A | 2/1998 | Tanner, II |
| 5,714,123 A | 2/1998 | Sohrab |
| 5,716,343 A | 2/1998 | Kriesel et al. |
| 5,722,397 A | 3/1998 | Eppstein |
| 5,741,228 A | 4/1998 | Lambrecht et al. |
| 5,746,217 A | 5/1998 | Erickson et al. |
| 5,747,350 A | 5/1998 | Sattler |
| 5,747,870 A | 5/1998 | Pedder |
| 5,748,827 A | 5/1998 | Holl et al. |
| 5,755,682 A | 5/1998 | Knudson et al. |
| 5,758,643 A | 6/1998 | Wong et al. |
| 5,759,923 A | 6/1998 | McMillan et al. |
| 5,764,189 A | 6/1998 | Lohninger |
| 5,771,567 A | 6/1998 | Pierce et al. |
| 5,776,103 A | 7/1998 | Kriesel et al. |
| 5,779,676 A | 7/1998 | Kriesel et al. |
| 5,785,688 A | 7/1998 | Joshi et al. |
| 5,797,881 A | 8/1998 | Gadot |
| 5,800,397 A | 9/1998 | Wilson et al. |
| 5,800,405 A | 9/1998 | McPhee |
| 5,800,420 A | 9/1998 | Gross et al. |
| 5,801,057 A | 9/1998 | Smart et al. |
| 5,804,048 A | 9/1998 | Wong et al. |
| 5,807,075 A | 9/1998 | Jacobsen et al. |
| 5,817,007 A | 10/1998 | Fodgaard et al. |
| 5,820,622 A | 10/1998 | Gross et al. |
| 5,823,951 A | 10/1998 | Messerschmidt |
| 5,839,467 A | 11/1998 | Saaski et al. |
| 5,840,020 A | 11/1998 | Heinonen et al. |
| 5,848,991 A | 12/1998 | Gross et al. |
| 5,851,197 A | 12/1998 | Marano et al. |
| 5,854,608 A | 12/1998 | Leisten |
| 5,858,005 A | 1/1999 | Kriesel |
| 5,858,239 A | 1/1999 | Kenley et al. |
| 5,859,621 A | 1/1999 | Leisten |
| 5,865,806 A | 2/1999 | Howell |
| 5,871,470 A | 2/1999 | McWha |
| 5,879,310 A | 3/1999 | Sopp et al. |
| 5,889,459 A | 3/1999 | Hattori et al. |
| 5,891,097 A | 4/1999 | Saito et al. |
| 5,892,489 A | 4/1999 | Kanba et al. |
| 5,897,530 A | 4/1999 | Jackson |
| 5,902,253 A | 5/1999 | Pfeiffer et al. |
| 5,903,421 A | 5/1999 | Furutani et al. |
| 5,906,597 A | 5/1999 | McPhee |
| 5,911,716 A | 6/1999 | Rake et al. |
| 5,919,167 A | 7/1999 | Mulhauser et al. |
| 5,931,814 A | 8/1999 | Alex et al. |
| 5,932,175 A | 8/1999 | Knute et al. |
| 5,933,121 A | 8/1999 | Rainhart et al. |
| 5,935,099 A | 8/1999 | Peterson et al. |
| 5,945,963 A | 8/1999 | Leisten |
| 5,947,911 A | 9/1999 | Wong et al. |
| 5,957,890 A | 9/1999 | Mann et al. |
| 5,961,492 A | 10/1999 | Kriesel et al. |
| 5,965,848 A | 10/1999 | Altschul et al. |
| 5,971,941 A | 10/1999 | Simons et al. |
| 5,993,423 A | 11/1999 | Choi |
| 5,997,501 A | 12/1999 | Gross et al. |
| 6,017,318 A | 1/2000 | Gauthier et al. |
| 6,019,747 A | 2/2000 | McPhee |
| 6,023,251 A | 2/2000 | Koo et al. |
| 6,024,539 A | 2/2000 | Blomquist |
| 6,027,826 A | 2/2000 | deRochemont et al. |
| 6,028,568 A | 2/2000 | Asakura et al. |
| 6,031,445 A | 2/2000 | Marty et al. |
| 6,032,059 A | 2/2000 | Henning et al. |
| 6,036,924 A | 3/2000 | Simons et al. |
| 6,040,578 A | 3/2000 | Malin et al. |
| 6,040,805 A | 3/2000 | Huynh et al. |
| 6,046,707 A | 4/2000 | Gaughan et al. |
| 6,049,727 A | 4/2000 | Crothall |
| 6,050,978 A | 4/2000 | Orr et al. |
| 6,052,040 A | 4/2000 | Hino |
| 6,058,934 A | 5/2000 | Sullivan |
| 6,066,103 A | 5/2000 | Duchon et al. |
| 6,071,292 A | 6/2000 | Makower et al. |
| 6,072,180 A | 6/2000 | Kramer et al. |
| 6,077,055 A | 6/2000 | Vilks |
| 6,090,092 A | 7/2000 | Fowles et al. |
| 6,101,406 A | 8/2000 | Hacker et al. |
| 6,102,872 A | 8/2000 | Doneen et al. |
| 6,111,544 A | 8/2000 | Dakeya et al. |
| 6,115,673 A | 9/2000 | Malin et al. |
| 6,123,827 A | 9/2000 | Wong et al. |
| 6,124,134 A | 9/2000 | Stark |
| 6,126,637 A | 10/2000 | Kriesel et al. |
| 6,128,519 A | 10/2000 | Say |
| 6,142,939 A | 11/2000 | Eppstein et al. |
| 6,143,164 A | 11/2000 | Heller et al. |
| 6,143,432 A | 11/2000 | de Rochemont et al. |
| 6,154,176 A | 11/2000 | Fathy et al. |
| 6,157,041 A | 12/2000 | Thomas et al. |
| 6,161,028 A | 12/2000 | Braig et al. |
| 6,162,639 A | 12/2000 | Douglas |
| 6,174,300 B1 | 1/2001 | Kriesel et al. |
| 6,176,004 B1 | 1/2001 | Rainhart et al. |
| 6,181,297 B1 | 1/2001 | Leisten |
| 6,188,368 B1 | 2/2001 | Koriyama et al. |
| 6,190,359 B1 | 2/2001 | Heruth |
| 6,195,049 B1 | 2/2001 | Kim et al. |
| 6,196,046 B1 | 3/2001 | Braig et al. |
| 6,200,287 B1 | 3/2001 | Keller et al. |
| 6,200,293 B1 | 3/2001 | Kriesel et al. |
| 6,200,338 B1 | 3/2001 | Solomon et al. |
| 6,204,203 B1 | 3/2001 | Narwankar et al. |
| 6,208,843 B1 | 3/2001 | Huang et al. |
| 6,214,629 B1 | 4/2001 | Freitag et al. |
| 6,222,489 B1 | 4/2001 | Tsuru et al. |
| 6,226,082 B1 | 5/2001 | Roe |
| 6,244,776 B1 | 6/2001 | Wiley |
| 6,261,065 B1 | 7/2001 | Nayak et al. |
| 6,262,798 B1 | 7/2001 | Shepherd et al. |
| 6,266,020 B1 | 7/2001 | Chang |
| 6,270,455 B1 | 8/2001 | Brown |
| 6,271,045 B1 | 8/2001 | Douglas et al. |
| 6,280,381 B1 | 8/2001 | Malin et al. |
| 6,285,448 B1 | 9/2001 | Kunstner |
| 6,300,894 B1 | 10/2001 | Lynch et al. |
| 6,309,370 B1 | 10/2001 | Haim et al. |
| 6,312,888 B1 | 11/2001 | Wong et al. |
| 6,320,547 B1 | 11/2001 | Fathy et al. |
| 6,323,549 B1 | 11/2001 | deRochemont et al. |
| 6,334,851 B1 | 1/2002 | Hayes et al. |
| 6,363,609 B1 | 4/2002 | Pickren |
| 6,375,627 B1 | 4/2002 | Mauze et al. |
| 6,375,638 B2 | 4/2002 | Nason et al. |
| 6,379,301 B1 | 4/2002 | Worthington et al. |
| 6,402,689 B1 | 6/2002 | Scarantino et al. |
| 6,470,279 B1 | 10/2002 | Samsoondar |
| 6,474,219 B2 | 11/2002 | Klitmose et al. |
| 6,475,196 B1 | 11/2002 | Vachon |
| 6,477,065 B2 | 11/2002 | Parks |
| 6,477,901 B1 | 11/2002 | Tadigadapa et al. |
| 6,484,044 B1 | 11/2002 | Lilienfeld-Toal |
| 6,485,461 B1 | 11/2002 | Mason et al. |
| 6,485,462 B1 | 11/2002 | Kriesel |
| 6,491,656 B1 | 12/2002 | Morris |
| 6,492,949 B1 | 12/2002 | Breglia et al. |
| 6,496,149 B1 | 12/2002 | Birnbaum et al. |
| 6,501,415 B1 | 12/2002 | Viana et al. |

(56) References Cited

U.S. PATENT DOCUMENTS

| | | |
|---|---|---|
| 6,512,937 B2 | 1/2003 | Blank et al. |
| 6,520,936 B1 | 2/2003 | Mann |
| 6,525,509 B1 | 2/2003 | Petersson et al. |
| 6,527,744 B1 | 3/2003 | Kriesel et al. |
| 6,528,809 B1 | 3/2003 | Thomas et al. |
| 6,537,249 B2 | 3/2003 | Kriesell et al. |
| 6,540,260 B1 | 4/2003 | Tan |
| 6,540,672 B1 | 4/2003 | Simonsen et al. |
| 6,541,820 B1 | 4/2003 | Bol |
| 6,544,212 B2 | 4/2003 | Galley et al. |
| 6,546,268 B1 | 4/2003 | Ishikawa et al. |
| 6,546,269 B1 | 4/2003 | Kurnik |
| 6,552,693 B1 | 4/2003 | Leisten |
| 6,553,841 B1 | 4/2003 | Blouch |
| 6,554,798 B1 | 4/2003 | Mann et al. |
| 6,556,850 B1 | 4/2003 | Braig et al. |
| 6,558,351 B1 | 5/2003 | Steil et al. |
| 6,559,735 B1 | 5/2003 | Hoang et al. |
| 6,560,471 B1 | 5/2003 | Heller et al. |
| 6,561,978 B1 | 5/2003 | Conn et al. |
| 6,562,001 B2 | 5/2003 | Lebel et al. |
| 6,562,014 B2 | 5/2003 | Lin et al. |
| 6,569,115 B1 | 5/2003 | Barker et al. |
| 6,569,125 B2 | 5/2003 | Jepson et al. |
| 6,572,542 B1 | 6/2003 | Houben et al. |
| 6,572,545 B2 | 6/2003 | Knobbe et al. |
| 6,574,490 B2 | 6/2003 | Abbink et al. |
| 6,575,905 B2 | 6/2003 | Knobbe et al. |
| 6,580,934 B1 | 6/2003 | Braig et al. |
| 6,583,699 B2 | 6/2003 | Yokoyama |
| 6,595,956 B1 | 7/2003 | Gross et al. |
| 6,605,151 B1 | 8/2003 | Wessels et al. |
| 6,611,419 B1 | 8/2003 | Chakravorty |
| 6,618,603 B2 | 9/2003 | Varalli et al. |
| 6,620,750 B2 | 9/2003 | Kim et al. |
| 6,633,772 B2 | 10/2003 | Ford et al. |
| 6,635,958 B2 | 10/2003 | Bates et al. |
| 6,639,556 B2 | 10/2003 | Baba |
| 6,642,908 B2 | 11/2003 | Pleva et al. |
| 6,645,142 B2 | 11/2003 | Braig et al. |
| 6,650,303 B2 | 11/2003 | Kim et al. |
| 6,653,091 B1 | 11/2003 | Dunn et al. |
| 6,656,158 B2 | 12/2003 | Mahoney et al. |
| 6,662,030 B2 | 12/2003 | Khalil et al. |
| 6,669,663 B1 | 12/2003 | Thompson |
| 6,670,497 B2 | 12/2003 | Tashino et al. |
| 6,678,542 B2 | 1/2004 | Braig et al. |
| 6,680,700 B2 | 1/2004 | Hilgers |
| 6,683,576 B2 | 1/2004 | Achim |
| 6,686,406 B2 | 2/2004 | Tomomatsu et al. |
| 6,690,336 B1 | 2/2004 | Leisten et al. |
| 6,697,605 B1 | 2/2004 | Atokawa et al. |
| 6,699,218 B2 | 3/2004 | Flaherty et al. |
| 6,699,221 B2 | 3/2004 | Vaillancourt |
| 6,718,189 B2 | 4/2004 | Rohrscheib et al. |
| 6,720,926 B2 | 4/2004 | Killen et al. |
| 6,721,582 B2 | 4/2004 | Trepagnier et al. |
| 6,723,072 B2 | 4/2004 | Flaherty et al. |
| 6,727,785 B2 | 4/2004 | Killen et al. |
| 6,728,560 B2 | 4/2004 | Kollias et al. |
| 6,731,244 B2 | 5/2004 | Killen et al. |
| 6,731,248 B2 | 5/2004 | Killen et al. |
| 6,733,890 B2 | 5/2004 | Imanaka et al. |
| 6,740,059 B2 | 5/2004 | Flaherty |
| 6,740,072 B2 | 5/2004 | Starkweather et al. |
| 6,741,148 B2 | 5/2004 | Killen et al. |
| 6,742,249 B2 | 6/2004 | deRochemont et al. |
| 6,743,744 B1 | 6/2004 | Kim et al. |
| 6,750,740 B2 | 6/2004 | Killen et al. |
| 6,750,820 B2 | 6/2004 | Killen et al. |
| 6,751,490 B2 | 6/2004 | Esenaliev et al. |
| 6,753,745 B2 | 6/2004 | Killen et al. |
| 6,753,814 B2 | 6/2004 | Killen et al. |
| 6,758,835 B2 | 7/2004 | Close et al. |
| 6,762,237 B2 | 7/2004 | Glatkowski et al. |
| 6,780,156 B2 | 8/2004 | Haueter et al. |
| 6,787,181 B2 | 9/2004 | Uchiyama et al. |
| 6,791,496 B1 | 9/2004 | Killen et al. |
| 6,810,290 B2 | 10/2004 | Lebel et al. |
| 6,826,031 B2 | 11/2004 | Nagai et al. |
| 6,830,623 B2 | 12/2004 | Hayashi et al. |
| 6,837,858 B2 | 1/2005 | Cunningham et al. |
| 6,837,988 B2 | 1/2005 | Leong et al. |
| 6,846,288 B2 | 1/2005 | Nagar et al. |
| 6,853,288 B2 | 2/2005 | Ahn et al. |
| 6,858,892 B2 | 2/2005 | Yamagata |
| 6,862,534 B2 | 3/2005 | Sterling et al. |
| 6,864,848 B2 | 3/2005 | Sievenpiper |
| 6,865,408 B1 | 3/2005 | Abbink et al. |
| 6,871,396 B2 | 3/2005 | Sugaya et al. |
| 6,878,871 B2 | 4/2005 | Scher et al. |
| 6,883,778 B1 | 4/2005 | Newton et al. |
| 6,890,291 B2 | 5/2005 | Robinson et al. |
| 6,905,989 B2 | 6/2005 | Ellis et al. |
| 6,906,674 B2 | 6/2005 | McKinzie, III et al. |
| 6,914,566 B2 | 7/2005 | Beard |
| 6,919,119 B2 | 7/2005 | Kalkan et al. |
| 6,928,298 B2 | 8/2005 | Furutani et al. |
| 6,936,029 B2 | 8/2005 | Mann et al. |
| 6,943,430 B2 | 9/2005 | Kwon |
| 6,943,731 B2 | 9/2005 | Killen et al. |
| 6,949,081 B1 | 9/2005 | Chance |
| 6,958,809 B2 | 10/2005 | Sterling et al. |
| 6,963,259 B2 | 11/2005 | Killen et al. |
| 6,989,891 B2 | 1/2006 | Braig et al. |
| 6,990,366 B2 | 1/2006 | Say et al. |
| 7,002,436 B2 | 2/2006 | Ma et al. |
| 7,008,404 B2 | 3/2006 | Nakajima |
| 7,009,180 B2 | 3/2006 | Sterling et al. |
| 7,016,713 B2 | 3/2006 | Gardner et al. |
| 7,018,360 B2 | 3/2006 | Flaherty et al. |
| 7,025,743 B2 | 4/2006 | Mann et al. |
| 7,025,744 B2 | 4/2006 | Utterberg et al. |
| 7,027,848 B2 | 4/2006 | Robinson et al. |
| 7,043,288 B2 | 5/2006 | Davis, III et al. |
| 7,047,637 B2 | 5/2006 | deRochemont et al. |
| 7,060,059 B2 | 6/2006 | Keith et al. |
| 7,060,350 B2 | 6/2006 | Takaya et al. |
| 7,061,593 B2 | 6/2006 | Braig et al. |
| 7,096,124 B2 | 8/2006 | Sterling et al. |
| 7,115,205 B2 | 10/2006 | Robinson et al. |
| 7,116,949 B2 | 10/2006 | Irie et al. |
| 7,128,727 B2 | 10/2006 | Flaherty et al. |
| 7,137,694 B2 | 11/2006 | Ferran et al. |
| 7,139,593 B2 | 11/2006 | Kavak et al. |
| 7,139,598 B2 | 11/2006 | Hull et al. |
| 7,144,384 B2 | 12/2006 | Gorman et al. |
| 7,160,272 B1 | 1/2007 | Eyal et al. |
| 7,171,252 B1 | 1/2007 | Scarantino et al. |
| 7,190,988 B2 | 3/2007 | Say et al. |
| 7,204,823 B2 | 4/2007 | Estes et al. |
| 7,230,316 B2 | 6/2007 | Yamazaki et al. |
| 7,248,912 B2 | 7/2007 | Gough et al. |
| 7,267,665 B2 | 9/2007 | Steil et al. |
| 7,271,912 B2 | 9/2007 | Sterling et al. |
| 7,278,983 B2 | 10/2007 | Ireland et al. |
| 7,291,107 B2 | 11/2007 | Hellwig et al. |
| 7,291,497 B2 | 11/2007 | Holmes et al. |
| 7,291,782 B2 | 11/2007 | Sager et al. |
| 7,303,549 B2 | 12/2007 | Flaherty et al. |
| 7,303,622 B2 | 12/2007 | Loch et al. |
| 7,303,922 B2 | 12/2007 | Jeng et al. |
| 7,354,420 B2 | 4/2008 | Steil et al. |
| 7,388,202 B2 | 6/2008 | Sterling et al. |
| 7,402,153 B2 | 7/2008 | Steil et al. |
| 7,404,796 B2 | 7/2008 | Ginsberg |
| 7,405,698 B2 | 7/2008 | de Rochemont |
| 7,429,255 B2 | 9/2008 | Thompson |
| 7,460,130 B2 | 12/2008 | Salganicoff |
| 7,481,787 B2 | 1/2009 | Gable et al. |
| 7,491,187 B2 | 2/2009 | Van Den Berghe et al. |
| 7,500,949 B2 | 3/2009 | Gottlieb et al. |
| 7,509,156 B2 | 3/2009 | Flanders |
| 7,522,124 B2 | 4/2009 | Smith et al. |

(56) References Cited

U.S. PATENT DOCUMENTS

| | | |
|---|---|---|
| 7,547,281 B2 | 6/2009 | Hayes et al. |
| 7,553,512 B2 | 6/2009 | Kodas et al. |
| 7,564,887 B2 | 7/2009 | Wang et al. |
| 7,569,030 B2 | 8/2009 | Ebel et al. |
| 7,595,623 B2 | 9/2009 | Bennett |
| 7,608,042 B2 | 10/2009 | Goldberger et al. |
| 7,651,845 B2 | 1/2010 | Doyle, III et al. |
| 7,652,901 B2 | 1/2010 | Kirchmeier et al. |
| 7,680,529 B2 | 3/2010 | Kroll |
| 7,714,794 B2 | 5/2010 | Tavassoli Hozouri |
| 7,734,323 B2 | 6/2010 | Blomquist et al. |
| 7,763,917 B2 | 7/2010 | de Rochemont |
| 7,766,829 B2 | 8/2010 | Sloan et al. |
| 7,771,391 B2 | 8/2010 | Carter |
| 7,785,258 B2 | 8/2010 | Braig et al. |
| 7,806,854 B2 | 10/2010 | Damiano et al. |
| 7,806,886 B2 | 10/2010 | Kanderian, Jr. et al. |
| 7,812,774 B2 | 10/2010 | Friman et al. |
| 7,918,825 B2 | 4/2011 | OConnor et al. |
| 7,946,985 B2 | 5/2011 | Mastrototaro et al. |
| 7,972,296 B2 | 7/2011 | Braig et al. |
| 8,066,805 B2 | 11/2011 | Zurcher et al. |
| 8,069,690 B2 | 12/2011 | DeSantolo et al. |
| 8,114,489 B2 | 2/2012 | Nemat-Nasser et al. |
| 8,178,457 B2 | 5/2012 | De Rochemont |
| 8,193,873 B2 | 6/2012 | Kato et al. |
| 8,221,345 B2 | 7/2012 | Blomquist |
| 8,251,907 B2 | 8/2012 | Sterling et al. |
| 8,267,921 B2 | 9/2012 | Yodfat et al. |
| 8,350,657 B2 | 1/2013 | deRochemont |
| 8,354,294 B2 | 1/2013 | de Rochemont et al. |
| 8,449,524 B2 | 5/2013 | Braig et al. |
| 8,452,359 B2 | 5/2013 | Rebec et al. |
| 8,454,576 B2 | 6/2013 | Mastrototaro et al. |
| 8,467,980 B2 | 6/2013 | Campbell et al. |
| 8,478,557 B2 | 7/2013 | Hayter et al. |
| 8,547,239 B2 | 10/2013 | Peatfield et al. |
| 8,593,819 B2 | 11/2013 | de Rochemont |
| 8,597,274 B2 | 12/2013 | Sloan et al. |
| 8,622,988 B2 | 1/2014 | Hayter |
| 8,715,839 B2 | 5/2014 | de Rochemont |
| 8,810,394 B2 | 8/2014 | Kalpin |
| 8,939,935 B2 | 1/2015 | OConnor et al. |
| 9,061,097 B2 | 6/2015 | Holt et al. |
| 9,171,343 B1 | 10/2015 | Fischell et al. |
| 9,180,244 B2 | 11/2015 | Anderson et al. |
| 9,192,716 B2 | 11/2015 | Jugl et al. |
| 9,233,204 B2 | 1/2016 | Booth et al. |
| 9,402,950 B2 | 8/2016 | Dilanni et al. |
| 9,486,571 B2 | 11/2016 | Rosinko |
| 9,520,649 B2 | 12/2016 | de Rochemont |
| 9,579,456 B2 | 2/2017 | Budiman et al. |
| 9,656,017 B2 | 5/2017 | Greene |
| 9,743,224 B2 | 8/2017 | San Vicente et al. |
| 9,857,090 B2 | 1/2018 | Golden et al. |
| 9,907,515 B2 | 3/2018 | Doyle, III et al. |
| 9,980,140 B1 | 5/2018 | Spencer et al. |
| 9,984,773 B2 | 5/2018 | Gondhalekar et al. |
| 10,248,839 B2 | 4/2019 | Levy et al. |
| 10,335,464 B1 | 7/2019 | Michelich et al. |
| 10,583,250 B2 | 3/2020 | Mazlish et al. |
| 10,737,024 B2 | 8/2020 | Schmid |
| 10,987,468 B2 | 4/2021 | Mazlish et al. |
| 11,197,964 B2 | 12/2021 | Sjolund et al. |
| 11,260,169 B2 | 3/2022 | Estes |
| 11,990,238 B2 * | 5/2024 | Spang ................... G16H 50/20 |
| 2001/0021803 A1 | 9/2001 | Blank et al. |
| 2001/0034023 A1 | 10/2001 | Stanton, Jr. et al. |
| 2001/0034502 A1 | 10/2001 | Moberg et al. |
| 2001/0048969 A1 | 12/2001 | Constantino et al. |
| 2001/0051377 A1 | 12/2001 | Hammer et al. |
| 2001/0053895 A1 | 12/2001 | Vaillancourt |
| 2001/0056258 A1 | 12/2001 | Evans |
| 2002/0010401 A1 | 1/2002 | Bushmakin et al. |
| 2002/0010423 A1 | 1/2002 | Gross et al. |
| 2002/0016568 A1 | 2/2002 | Lebel et al. |
| 2002/0040208 A1 | 4/2002 | Flaherty et al. |
| 2002/0047768 A1 | 4/2002 | Duffy |
| 2002/0070983 A1 | 6/2002 | Kozub et al. |
| 2002/0123740 A1 | 9/2002 | Flaherty et al. |
| 2002/0128543 A1 | 9/2002 | Leonhardt |
| 2002/0147423 A1 | 10/2002 | Burbank et al. |
| 2002/0155425 A1 | 10/2002 | Han et al. |
| 2002/0161288 A1 | 10/2002 | Shin et al. |
| 2002/0173769 A1 | 11/2002 | Gray et al. |
| 2002/0190818 A1 | 12/2002 | Endou et al. |
| 2003/0023148 A1 | 1/2003 | Lorenz et al. |
| 2003/0034124 A1 | 2/2003 | Sugaya et al. |
| 2003/0040715 A1 | 2/2003 | DAntonio et al. |
| 2003/0050621 A1 | 3/2003 | Lebel et al. |
| 2003/0060692 A1 | 3/2003 | Ruchti et al. |
| 2003/0086074 A1 | 5/2003 | Braig et al. |
| 2003/0086075 A1 | 5/2003 | Braig et al. |
| 2003/0090649 A1 | 5/2003 | Sterling et al. |
| 2003/0100040 A1 | 5/2003 | Bonnecaze et al. |
| 2003/0122647 A1 | 7/2003 | Ou |
| 2003/0125662 A1 * | 7/2003 | Bui ................... A61M 5/1723 |
| | | 128/DIG. 13 |
| 2003/0130616 A1 | 7/2003 | Steil et al. |
| 2003/0135388 A1 | 7/2003 | Martucci et al. |
| 2003/0144582 A1 | 7/2003 | Cohen et al. |
| 2003/0148024 A1 | 8/2003 | Kodas et al. |
| 2003/0163097 A1 | 8/2003 | Fleury et al. |
| 2003/0170436 A1 | 9/2003 | Sumi et al. |
| 2003/0195404 A1 | 10/2003 | Knobbe et al. |
| 2003/0208113 A1 | 11/2003 | Mault et al. |
| 2003/0208154 A1 | 11/2003 | Close et al. |
| 2003/0212379 A1 | 11/2003 | Bylund et al. |
| 2003/0216627 A1 | 11/2003 | Lorenz et al. |
| 2003/0220605 A1 | 11/2003 | Bowman, Jr. et al. |
| 2003/0221621 A1 | 12/2003 | Pokharna et al. |
| 2004/0010207 A1 | 1/2004 | Flaherty et al. |
| 2004/0034295 A1 | 2/2004 | Salganicoff |
| 2004/0045879 A1 | 3/2004 | Shults et al. |
| 2004/0051368 A1 | 3/2004 | Caputo et al. |
| 2004/0064088 A1 | 4/2004 | Gorman et al. |
| 2004/0064259 A1 | 4/2004 | Haaland et al. |
| 2004/0068224 A1 | 4/2004 | Alfred, Jr. et al. |
| 2004/0069044 A1 | 4/2004 | Lavi et al. |
| 2004/0097796 A1 | 5/2004 | Berman et al. |
| 2004/0116847 A1 | 6/2004 | Wall |
| 2004/0122353 A1 | 6/2004 | Shahmirian et al. |
| 2004/0133166 A1 | 7/2004 | Moberg et al. |
| 2004/0147034 A1 | 7/2004 | Gore et al. |
| 2004/0171983 A1 | 9/2004 | Sparks et al. |
| 2004/0203357 A1 | 10/2004 | Nassimi |
| 2004/0204868 A1 | 10/2004 | Maynard et al. |
| 2004/0215492 A1 | 10/2004 | Choi |
| 2004/0220517 A1 | 11/2004 | Starkweather et al. |
| 2004/0241736 A1 | 12/2004 | Hendee et al. |
| 2004/0249308 A1 | 12/2004 | Forssell |
| 2005/0003470 A1 | 1/2005 | Nelson et al. |
| 2005/0020980 A1 | 1/2005 | Noue et al. |
| 2005/0022274 A1 | 1/2005 | Campbell et al. |
| 2005/0033148 A1 | 2/2005 | Haueter et al. |
| 2005/0049179 A1 | 3/2005 | Davidson et al. |
| 2005/0065464 A1 | 3/2005 | Talbot et al. |
| 2005/0065465 A1 | 3/2005 | Lebel et al. |
| 2005/0075624 A1 | 4/2005 | Miesel |
| 2005/0105095 A1 | 5/2005 | Pesach et al. |
| 2005/0134609 A1 | 6/2005 | Yu |
| 2005/0137573 A1 | 6/2005 | McLaughlin |
| 2005/0171503 A1 | 8/2005 | Van Den Berghe et al. |
| 2005/0182306 A1 | 8/2005 | Sloan |
| 2005/0182366 A1 | 8/2005 | Vogt et al. |
| 2005/0192494 A1 | 9/2005 | Ginsberg |
| 2005/0192557 A1 | 9/2005 | Brauker et al. |
| 2005/0197621 A1 | 9/2005 | Poulsen et al. |
| 2005/0203360 A1 | 9/2005 | Brauker et al. |
| 2005/0203461 A1 | 9/2005 | Flaherty et al. |
| 2005/0238507 A1 | 10/2005 | Dilanni et al. |
| 2005/0261660 A1 | 11/2005 | Choi |
| 2005/0262451 A1 | 11/2005 | Remignanti et al. |
| 2005/0272640 A1 | 12/2005 | Doyle, III et al. |

(56) References Cited

U.S. PATENT DOCUMENTS

| | | |
|---|---|---|
| 2005/0277912 A1 | 12/2005 | John |
| 2006/0009727 A1 | 1/2006 | OMahony et al. |
| 2006/0041229 A1 | 2/2006 | Garibotto et al. |
| 2006/0079765 A1 | 4/2006 | Neer et al. |
| 2006/0079809 A1 | 4/2006 | Goldberger et al. |
| 2006/0086994 A1 | 4/2006 | Viefers et al. |
| 2006/0100494 A1 | 5/2006 | Kroll |
| 2006/0134323 A1 | 6/2006 | OBrien |
| 2006/0134491 A1 | 6/2006 | Hilchenko et al. |
| 2006/0167350 A1 | 7/2006 | Monfre et al. |
| 2006/0173406 A1 | 8/2006 | Hayes et al. |
| 2006/0178633 A1 | 8/2006 | Garibotto et al. |
| 2006/0189925 A1 | 8/2006 | Gable et al. |
| 2006/0189926 A1 | 8/2006 | Hall et al. |
| 2006/0197015 A1 | 9/2006 | Sterling et al. |
| 2006/0200070 A1 | 9/2006 | Callicoat et al. |
| 2006/0204535 A1 | 9/2006 | Johnson |
| 2006/0229531 A1 | 10/2006 | Goldberger et al. |
| 2006/0253085 A1 | 11/2006 | Geismar et al. |
| 2006/0264895 A1 | 11/2006 | Flanders |
| 2006/0270983 A1 | 11/2006 | Lord et al. |
| 2006/0276771 A1 | 12/2006 | Galley et al. |
| 2006/0282290 A1 | 12/2006 | Flaherty et al. |
| 2007/0016127 A1 | 1/2007 | Staib et al. |
| 2007/0060796 A1 | 3/2007 | Kim |
| 2007/0060869 A1 | 3/2007 | Tolle et al. |
| 2007/0060872 A1 | 3/2007 | Hall et al. |
| 2007/0083160 A1 | 4/2007 | Hall et al. |
| 2007/0100635 A1 | 5/2007 | Mahajan et al. |
| 2007/0106135 A1 | 5/2007 | Sloan et al. |
| 2007/0116601 A1 | 5/2007 | Patton |
| 2007/0118405 A1 | 5/2007 | Campbell et al. |
| 2007/0129690 A1 | 6/2007 | Rosenblatt et al. |
| 2007/0142720 A1 | 6/2007 | Ridder et al. |
| 2007/0166453 A1 | 7/2007 | Van Duren et al. |
| 2007/0173761 A1 | 7/2007 | Kanderian et al. |
| 2007/0173974 A1 | 7/2007 | Lin et al. |
| 2007/0179352 A1 | 8/2007 | Randlov et al. |
| 2007/0191716 A1 | 8/2007 | Goldberger et al. |
| 2007/0197163 A1 | 8/2007 | Robertson |
| 2007/0225675 A1 | 9/2007 | Robinson et al. |
| 2007/0244381 A1 | 10/2007 | Robinson et al. |
| 2007/0249007 A1 | 10/2007 | Rosero |
| 2007/0259768 A1 | 11/2007 | Kear et al. |
| 2007/0264707 A1 | 11/2007 | Liederman et al. |
| 2007/0282269 A1 | 12/2007 | Carter et al. |
| 2007/0287985 A1 | 12/2007 | Estes et al. |
| 2007/0293843 A1 | 12/2007 | Ireland et al. |
| 2008/0033272 A1 | 2/2008 | Gough et al. |
| 2008/0051738 A1 | 2/2008 | Griffin |
| 2008/0051764 A1 | 2/2008 | Dent et al. |
| 2008/0058625 A1 | 3/2008 | McGarraugh et al. |
| 2008/0065050 A1 | 3/2008 | Sparks et al. |
| 2008/0071157 A1 | 3/2008 | McGarraugh et al. |
| 2008/0071158 A1 | 3/2008 | McGarraugh et al. |
| 2008/0078400 A1 | 4/2008 | Martens et al. |
| 2008/0097289 A1 | 4/2008 | Steil et al. |
| 2008/0114304 A1 | 5/2008 | Nalesso et al. |
| 2008/0132880 A1 | 6/2008 | Buchman |
| 2008/0160492 A1 | 7/2008 | Campbell et al. |
| 2008/0161664 A1 | 7/2008 | Mastrototaro et al. |
| 2008/0172026 A1 | 7/2008 | Blomquist |
| 2008/0172028 A1 | 7/2008 | Blomquist |
| 2008/0177165 A1 | 7/2008 | Blomquist et al. |
| 2008/0188796 A1 | 8/2008 | Steil et al. |
| 2008/0200838 A1 | 8/2008 | Goldberger et al. |
| 2008/0206067 A1 | 8/2008 | De Corral et al. |
| 2008/0208113 A1 | 8/2008 | Damiano et al. |
| 2008/0214919 A1 | 9/2008 | Harmon et al. |
| 2008/0228056 A1 | 9/2008 | Blomquist et al. |
| 2008/0249386 A1 | 10/2008 | Besterman et al. |
| 2008/0269585 A1 | 10/2008 | Ginsberg |
| 2008/0269714 A1 | 10/2008 | Mastrototaro et al. |
| 2008/0269723 A1 | 10/2008 | Mastrototaro et al. |
| 2008/0287906 A1 | 11/2008 | Burkholz et al. |
| 2009/0006061 A1 | 1/2009 | Thukral et al. |
| 2009/0018406 A1 | 1/2009 | Yodfat et al. |
| 2009/0030398 A1 | 1/2009 | Yodfat et al. |
| 2009/0036753 A1 | 2/2009 | King |
| 2009/0043240 A1 | 2/2009 | Robinson et al. |
| 2009/0054753 A1 | 2/2009 | Robinson et al. |
| 2009/0069743 A1 | 3/2009 | Krishnamoorthy et al. |
| 2009/0069745 A1 | 3/2009 | Estes et al. |
| 2009/0069787 A1 | 3/2009 | Estes et al. |
| 2009/0099521 A1 | 4/2009 | Gravesen et al. |
| 2009/0105573 A1 | 4/2009 | Malecha |
| 2009/0131861 A1 | 5/2009 | Braig et al. |
| 2009/0156922 A1 | 6/2009 | Goldberger et al. |
| 2009/0156924 A1 | 6/2009 | Shariati et al. |
| 2009/0163781 A1 | 6/2009 | Say et al. |
| 2009/0198350 A1 | 8/2009 | Thiele |
| 2009/0221890 A1 | 9/2009 | Saffer et al. |
| 2009/0228214 A1 | 9/2009 | Say et al. |
| 2009/0318791 A1 | 12/2009 | Kaastrup |
| 2009/0326343 A1 | 12/2009 | Gable et al. |
| 2009/0326472 A1 | 12/2009 | Carter |
| 2010/0017141 A1 | 1/2010 | Campbell et al. |
| 2010/0036326 A1 | 2/2010 | Matusch |
| 2010/0057042 A1 | 3/2010 | Hayter |
| 2010/0064243 A1 | 3/2010 | Buck et al. |
| 2010/0077198 A1 | 3/2010 | Buck et al. |
| 2010/0114026 A1 | 5/2010 | Karratt et al. |
| 2010/0121170 A1 | 5/2010 | Rule |
| 2010/0137784 A1 | 6/2010 | Cefai et al. |
| 2010/0152658 A1 | 6/2010 | Hanson et al. |
| 2010/0174228 A1 | 7/2010 | Buckingham et al. |
| 2010/0185183 A1 | 7/2010 | Alme et al. |
| 2010/0211003 A1 | 8/2010 | Sundar et al. |
| 2010/0228110 A1 | 9/2010 | Tsoukalis |
| 2010/0241066 A1 | 9/2010 | Hansen et al. |
| 2010/0262117 A1 | 10/2010 | Magni et al. |
| 2010/0262434 A1 | 10/2010 | Shaya |
| 2010/0295686 A1 | 11/2010 | Sloan et al. |
| 2010/0298765 A1 | 11/2010 | Budiman et al. |
| 2010/0317952 A1 | 12/2010 | Budiman et al. |
| 2011/0021584 A1 | 1/2011 | Berggren et al. |
| 2011/0028817 A1 | 2/2011 | Jin et al. |
| 2011/0049394 A1 | 3/2011 | de Rochemont |
| 2011/0054390 A1 | 3/2011 | Searle et al. |
| 2011/0054399 A1 | 3/2011 | Chong et al. |
| 2011/0065224 A1 | 3/2011 | Bollman et al. |
| 2011/0071765 A1 | 3/2011 | Yodfat et al. |
| 2011/0124996 A1 | 5/2011 | Reinke et al. |
| 2011/0144586 A1 | 6/2011 | Michaud et al. |
| 2011/0160652 A1 | 6/2011 | Yodfat et al. |
| 2011/0178472 A1 | 7/2011 | Cabiri |
| 2011/0190694 A1 | 8/2011 | Lanier, Jr. et al. |
| 2011/0202005 A1 | 8/2011 | Yodfat et al. |
| 2011/0218495 A1 | 9/2011 | Remde |
| 2011/0230833 A1 | 9/2011 | Landman et al. |
| 2011/0251509 A1 | 10/2011 | Beyhan et al. |
| 2011/0313680 A1 | 12/2011 | Doyle et al. |
| 2011/0316562 A1 | 12/2011 | Cefai et al. |
| 2012/0003935 A1 | 1/2012 | Lydon et al. |
| 2012/0010594 A1 | 1/2012 | Holt et al. |
| 2012/0030393 A1 | 2/2012 | Ganesh et al. |
| 2012/0053556 A1 | 3/2012 | Lee |
| 2012/0078067 A1 | 3/2012 | Kovatchev et al. |
| 2012/0078161 A1 | 3/2012 | Masterson et al. |
| 2012/0078181 A1 | 3/2012 | Smith et al. |
| 2012/0101451 A1 | 4/2012 | Boit et al. |
| 2012/0123234 A1 | 5/2012 | Atlas et al. |
| 2012/0124521 A1 | 5/2012 | Guo |
| 2012/0136336 A1 | 5/2012 | Mastrototaro et al. |
| 2012/0150446 A1 | 6/2012 | Chang et al. |
| 2012/0190955 A1 | 7/2012 | Rao et al. |
| 2012/0203085 A1 | 8/2012 | Rebec |
| 2012/0203178 A1 | 8/2012 | Tverskoy |
| 2012/0215087 A1 | 8/2012 | Cobelli et al. |
| 2012/0225134 A1 | 9/2012 | Komorowski |
| 2012/0226259 A1 | 9/2012 | Yodfat et al. |
| 2012/0232520 A1 | 9/2012 | Sloan et al. |
| 2012/0238851 A1 | 9/2012 | Kamen et al. |
| 2012/0250449 A1 | 10/2012 | Nakano |

(56) References Cited

U.S. PATENT DOCUMENTS

| | | |
|---|---|---|
| 2012/0271655 A1 | 10/2012 | Knobel et al. |
| 2012/0277668 A1 | 11/2012 | Chawla |
| 2012/0282111 A1 | 11/2012 | Nip et al. |
| 2012/0295550 A1 | 11/2012 | Wilson et al. |
| 2013/0030358 A1 | 1/2013 | Yodfat et al. |
| 2013/0158503 A1 | 6/2013 | Kanderian, Jr. et al. |
| 2013/0172695 A1 | 7/2013 | Nielsen et al. |
| 2013/0172710 A1 | 7/2013 | Mears et al. |
| 2013/0178791 A1 | 7/2013 | Javitt |
| 2013/0231642 A1 | 9/2013 | Doyle et al. |
| 2013/0245545 A1 | 9/2013 | Arnold et al. |
| 2013/0253472 A1 | 9/2013 | Cabiri |
| 2013/0261406 A1 | 10/2013 | Rebec et al. |
| 2013/0296792 A1 | 11/2013 | Cabiri |
| 2013/0296823 A1 | 11/2013 | Melker et al. |
| 2013/0298080 A1 | 11/2013 | Griffin et al. |
| 2013/0317753 A1 | 11/2013 | Kamen et al. |
| 2013/0332874 A1 | 12/2013 | Rosinko et al. |
| 2013/0338576 A1 | 12/2013 | OConnor et al. |
| 2013/0346858 A1 | 12/2013 | Neyrinck |
| 2014/0005633 A1 | 1/2014 | Finan |
| 2014/0018730 A1 | 1/2014 | Muller-Pathle |
| 2014/0032549 A1 | 1/2014 | McDaniel et al. |
| 2014/0066886 A1 | 3/2014 | Roy et al. |
| 2014/0074033 A1 | 3/2014 | Sonderegger et al. |
| 2014/0088428 A1 | 3/2014 | Yang et al. |
| 2014/0108046 A1 | 4/2014 | Cabrera et al. |
| 2014/0121635 A1 | 5/2014 | Hayter |
| 2014/0128839 A1 | 5/2014 | Dilanni et al. |
| 2014/0129951 A1 | 5/2014 | Amin et al. |
| 2014/0135880 A1 | 5/2014 | Baumgartner et al. |
| 2014/0142508 A1 | 5/2014 | Dilanni et al. |
| 2014/0146202 A1 | 5/2014 | Boss et al. |
| 2014/0171901 A1 | 6/2014 | Langsdorf et al. |
| 2014/0180203 A1 | 6/2014 | Budiman et al. |
| 2014/0180240 A1 | 6/2014 | Finan et al. |
| 2014/0200426 A1 | 7/2014 | Taub et al. |
| 2014/0200559 A1 | 7/2014 | Doyle et al. |
| 2014/0230021 A1 | 8/2014 | Birthwhistle et al. |
| 2014/0276554 A1 | 9/2014 | Finan et al. |
| 2014/0276556 A1 | 9/2014 | Saint et al. |
| 2014/0278123 A1 | 9/2014 | Prodhom et al. |
| 2014/0309615 A1 | 10/2014 | Mazlish |
| 2014/0316379 A1 | 10/2014 | Sonderegger et al. |
| 2014/0325065 A1 | 10/2014 | Birtwhistle et al. |
| 2015/0018633 A1 | 1/2015 | Kovachev et al. |
| 2015/0025329 A1 | 1/2015 | Amarasingham et al. |
| 2015/0025495 A1 | 1/2015 | Peyser |
| 2015/0025503 A1 | 1/2015 | Searle et al. |
| 2015/0041498 A1 | 2/2015 | Kakiuchi et al. |
| 2015/0120317 A1 | 4/2015 | Mayou et al. |
| 2015/0134265 A1 | 5/2015 | Kohlbrecher et al. |
| 2015/0134353 A1 | 5/2015 | Ferrell et al. |
| 2015/0165119 A1 | 6/2015 | Palerm et al. |
| 2015/0173674 A1 | 6/2015 | Hayes et al. |
| 2015/0193585 A1 | 7/2015 | Sunna |
| 2015/0202386 A1 | 7/2015 | Brady et al. |
| 2015/0205509 A1 | 7/2015 | Scriven et al. |
| 2015/0205511 A1 | 7/2015 | Vinna et al. |
| 2015/0213217 A1 | 7/2015 | Amarasingham et al. |
| 2015/0217052 A1 | 8/2015 | Keenan et al. |
| 2015/0217053 A1 | 8/2015 | Booth et al. |
| 2015/0265767 A1 | 9/2015 | Vazquez et al. |
| 2015/0301691 A1 | 10/2015 | Qin |
| 2015/0306314 A1 | 10/2015 | Doyle et al. |
| 2015/0331995 A1 | 11/2015 | Zhao et al. |
| 2015/0351671 A1 | 12/2015 | Vanslyke et al. |
| 2015/0356250 A1 | 12/2015 | Polimeni |
| 2015/0366945 A1 | 12/2015 | Greene et al. |
| 2016/0015891 A1 | 1/2016 | Papiorek |
| 2016/0019352 A1 | 1/2016 | Cohen et al. |
| 2016/0038673 A1 | 2/2016 | Morales |
| 2016/0038689 A1 | 2/2016 | Lee et al. |
| 2016/0051749 A1 | 2/2016 | Istoc |
| 2016/0057268 A1* | 2/2016 | Jiang .................... H04W 4/027 455/556.1 |
| 2016/0066894 A1 | 3/2016 | Barton-Sweeney |
| 2016/0082187 A1 | 3/2016 | Schaible et al. |
| 2016/0089494 A1 | 3/2016 | Guerrini |
| 2016/0175520 A1 | 6/2016 | Palerm et al. |
| 2016/0220181 A1 | 8/2016 | Rigooard et al. |
| 2016/0228641 A1 | 8/2016 | Gescheit et al. |
| 2016/0243318 A1 | 8/2016 | Despa et al. |
| 2016/0256087 A1 | 9/2016 | Doyle et al. |
| 2016/0259889 A1 | 9/2016 | Murtha et al. |
| 2016/0287512 A1 | 10/2016 | Cooper et al. |
| 2016/0302054 A1 | 10/2016 | Kimura et al. |
| 2016/0331310 A1 | 11/2016 | Kovatchev |
| 2016/0354543 A1 | 12/2016 | Cinar et al. |
| 2017/0007214 A1 | 1/2017 | Dillen |
| 2017/0021096 A1 | 1/2017 | Cole et al. |
| 2017/0049386 A1 | 2/2017 | Abraham et al. |
| 2017/0131887 A1 | 5/2017 | Kim et al. |
| 2017/0143899 A1 | 5/2017 | Gondhalekar et al. |
| 2017/0143900 A1 | 5/2017 | Rioux et al. |
| 2017/0150917 A1* | 6/2017 | Brief .................... A61B 5/0022 |
| 2017/0156682 A1 | 6/2017 | Doyle et al. |
| 2017/0173261 A1 | 6/2017 | OConnor et al. |
| 2017/0189625 A1 | 7/2017 | Cirillo et al. |
| 2017/0216524 A1 | 8/2017 | Haider et al. |
| 2017/0239415 A1 | 8/2017 | Hwang et al. |
| 2017/0281877 A1 | 10/2017 | Marlin et al. |
| 2017/0296746 A1 | 10/2017 | Chen et al. |
| 2017/0311903 A1 | 11/2017 | Davis et al. |
| 2017/0348482 A1 | 12/2017 | Duke et al. |
| 2018/0036495 A1 | 2/2018 | Searle et al. |
| 2018/0040255 A1 | 2/2018 | Freeman et al. |
| 2018/0075200 A1 | 3/2018 | Davis et al. |
| 2018/0075201 A1 | 3/2018 | Davis et al. |
| 2018/0075202 A1 | 3/2018 | Davis et al. |
| 2018/0092576 A1 | 4/2018 | O'Connor et al. |
| 2018/0126073 A1 | 5/2018 | Wu et al. |
| 2018/0169334 A1 | 6/2018 | Grosman et al. |
| 2018/0200434 A1 | 7/2018 | Mazlish et al. |
| 2018/0200438 A1 | 7/2018 | Mazlish et al. |
| 2018/0200441 A1 | 7/2018 | Desborough et al. |
| 2018/0204636 A1 | 7/2018 | Edwards et al. |
| 2018/0277253 A1 | 9/2018 | Gondhalekar et al. |
| 2018/0289891 A1 | 10/2018 | Finan et al. |
| 2018/0296757 A1 | 10/2018 | Finan et al. |
| 2018/0307515 A1 | 10/2018 | Meller et al. |
| 2018/0342317 A1 | 11/2018 | Skirble et al. |
| 2018/0369479 A1 | 12/2018 | Hayter et al. |
| 2019/0076600 A1 | 3/2019 | Grosman et al. |
| 2019/0095052 A1 | 3/2019 | De Wever et al. |
| 2019/0132801 A1 | 5/2019 | Kamath et al. |
| 2019/0184091 A1 | 6/2019 | Sjolund et al. |
| 2019/0240403 A1 | 8/2019 | Palerm et al. |
| 2019/0290844 A1 | 9/2019 | Monirabbasi et al. |
| 2019/0321545 A1 | 10/2019 | Saint |
| 2019/0336683 A1 | 11/2019 | O'Connor et al. |
| 2019/0336684 A1 | 11/2019 | O'Connor et al. |
| 2019/0348157 A1 | 11/2019 | Booth et al. |
| 2019/0374714 A1 | 12/2019 | Rioux et al. |
| 2020/0001006 A1 | 1/2020 | Pizzochero et al. |
| 2020/0046268 A1 | 2/2020 | Patek et al. |
| 2020/0101222 A1 | 4/2020 | Lintereur et al. |
| 2020/0101223 A1 | 4/2020 | Lintereur et al. |
| 2020/0101225 A1 | 4/2020 | O'Connor et al. |
| 2020/0113515 A1 | 4/2020 | O'Connor et al. |
| 2020/0219625 A1 | 7/2020 | Kahlbaugh |
| 2020/0342974 A1 | 10/2020 | Chen et al. |
| 2021/0050085 A1 | 2/2021 | Hayter et al. |
| 2021/0098105 A1 | 4/2021 | Lee et al. |
| 2022/0023536 A1 | 1/2022 | Graham et al. |

FOREIGN PATENT DOCUMENTS

| | | |
|---|---|---|
| CN | 1297140 A | 5/2001 |
| CN | 101208699 A | 6/2008 |
| DE | 4200595 A1 | 7/1993 |
| DE | 19756872 A1 | 7/1999 |
| EP | 0026056 A1 | 4/1981 |

(56) References Cited

FOREIGN PATENT DOCUMENTS

| | | |
|---|---|---|
| EP | 0341049 A2 | 11/1989 |
| EP | 0496305 A2 | 7/1992 |
| EP | 0549341 A1 | 6/1993 |
| EP | 0867196 A2 | 9/1998 |
| EP | 0939451 A1 | 9/1999 |
| EP | 1177802 A1 | 2/2002 |
| EP | 1376759 A2 | 1/2004 |
| EP | 1491144 A1 | 12/2004 |
| EP | 0801578 B1 | 7/2006 |
| EP | 2139382 A1 | 1/2010 |
| EP | 2397181 A1 | 12/2011 |
| EP | 2468338 A1 | 6/2012 |
| EP | 2666520 A1 | 11/2013 |
| EP | 2695573 A2 | 2/2014 |
| EP | 2703024 A1 | 3/2014 |
| EP | 2830499 A1 | 2/2015 |
| EP | 2943149 A1 | 11/2015 |
| EP | 3177344 A1 | 6/2017 |
| EP | 3193979 A1 | 7/2017 |
| EP | 3314548 A1 | 5/2018 |
| EP | 1571582 B1 | 4/2019 |
| EP | 2897071 B1 | 5/2019 |
| EP | 3607985 A1 | 2/2020 |
| FR | 2096275 A5 | 2/1972 |
| GB | 1125897 A | 9/1968 |
| GB | 2443261 A | 4/2008 |
| JP | 51125993 A | 11/1976 |
| JP | 02131777 A | 5/1990 |
| JP | 2005326943 A1 | 11/2005 |
| JP | 2004283378 A | 10/2007 |
| JP | 2008513142 A1 | 5/2008 |
| JP | 2017525451 A | 9/2017 |
| JP | 2018153569 A | 10/2018 |
| JP | 2019525276 A | 9/2019 |
| TW | 200740148 A | 10/2007 |
| TW | M452390 U | 5/2013 |
| WO | 200048112 A2 | 9/1968 |
| WO | 8606796 A1 | 11/1986 |
| WO | 9800193 A1 | 1/1998 |
| WO | 9855073 A1 | 12/1998 |
| WO | 9910040 A1 | 3/1999 |
| WO | 9910049 A1 | 3/1999 |
| WO | 9956803 A1 | 11/1999 |
| WO | 9962576 A1 | 12/1999 |
| WO | 0030705 A1 | 6/2000 |
| WO | 200032258 A1 | 6/2000 |
| WO | 0172354 A2 | 10/2001 |
| WO | 2001078812 A1 | 10/2001 |
| WO | 2002015954 A1 | 2/2002 |
| WO | 0226282 A2 | 4/2002 |
| WO | 2002043866 A2 | 6/2002 |
| WO | 2002076535 A1 | 10/2002 |
| WO | 2002082990 A1 | 10/2002 |
| WO | 2003016882 A1 | 2/2003 |
| WO | 2003039362 A1 | 5/2003 |
| WO | 2003045233 A1 | 6/2003 |
| WO | 2003097133 A1 | 11/2003 |
| WO | 2004043250 A1 | 5/2004 |
| WO | 2005110601 A1 | 5/2004 |
| WO | 2004092715 A1 | 10/2004 |
| WO | 2005051170 A2 | 6/2005 |
| WO | 2005082436 A1 | 9/2005 |
| WO | 2005113036 A1 | 12/2005 |
| WO | 2006053007 A2 | 5/2006 |
| WO | 2007064835 A2 | 6/2007 |
| WO | 2007066152 A2 | 6/2007 |
| WO | 2007078937 A1 | 7/2007 |
| WO | 2008024810 A2 | 2/2008 |
| WO | 2008029403 A2 | 3/2008 |
| WO | 2008133702 A1 | 11/2008 |
| WO | 2009039203 A2 | 3/2009 |
| WO | 2009045462 A1 | 4/2009 |
| WO | 2009049252 A1 | 4/2009 |
| WO | 2009066287 A3 | 5/2009 |
| WO | 2009066288 A1 | 5/2009 |
| WO | 2009098648 A2 | 8/2009 |
| WO | 2009134380 A2 | 11/2009 |
| WO | 2010022069 A2 | 2/2010 |
| WO | 2010053702 A1 | 5/2010 |
| WO | 2010077279 A1 | 7/2010 |
| WO | 2010132077 A1 | 11/2010 |
| WO | 2010138848 A1 | 12/2010 |
| WO | 2010139793 A1 | 12/2010 |
| WO | 2010147659 A2 | 12/2010 |
| WO | 2011031458 A1 | 3/2011 |
| WO | 2011075042 A1 | 6/2011 |
| WO | 2011095483 A1 | 8/2011 |
| WO | 2011133823 A1 | 10/2011 |
| WO | 2012045667 A2 | 4/2012 |
| WO | 2012073032 A1 | 6/2012 |
| WO | 2012108959 A1 | 8/2012 |
| WO | 2012134588 A1 | 10/2012 |
| WO | 2012177353 A1 | 12/2012 |
| WO | 2012178134 A2 | 12/2012 |
| WO | 2013050535 A2 | 4/2013 |
| WO | 2013078200 A1 | 5/2013 |
| WO | 2013134486 A2 | 9/2013 |
| WO | 20130149186 A1 | 10/2013 |
| WO | 2013177565 A1 | 11/2013 |
| WO | 2013182321 A1 | 12/2013 |
| WO | 2014029416 A1 | 2/2014 |
| WO | 2014109898 A1 | 7/2014 |
| WO | 2014110538 A1 | 7/2014 |
| WO | 2014149357 A1 | 9/2014 |
| WO | 2014179774 A1 | 11/2014 |
| WO | 2014194183 A2 | 12/2014 |
| WO | 2015056259 A1 | 4/2015 |
| WO | 2015061493 A1 | 4/2015 |
| WO | 2015073211 A1 | 5/2015 |
| WO | 2015081337 A2 | 6/2015 |
| WO | 2015117082 A1 | 8/2015 |
| WO | 2015117854 A1 | 8/2015 |
| WO | 2015167201 A1 | 11/2015 |
| WO | 2015177082 A1 | 11/2015 |
| WO | 2015187366 A1 | 12/2015 |
| WO | 2016004088 A1 | 1/2016 |
| WO | 2016022650 A1 | 2/2016 |
| WO | 2016041873 A1 | 3/2016 |
| WO | 2016089702 A1 | 6/2016 |
| WO | 2016141082 A1 | 9/2016 |
| WO | 2016161254 A1 | 10/2016 |
| WO | 2017004278 A1 | 1/2017 |
| WO | 2017091624 A1 | 6/2017 |
| WO | 2017105600 A1 | 6/2017 |
| WO | 2017184988 A1 | 10/2017 |
| WO | 2017187177 A1 | 11/2017 |
| WO | 2017205816 A1 | 11/2017 |
| WO | 2018009614 A1 | 1/2018 |
| WO | 2018067748 A1 | 4/2018 |
| WO | 2018120104 A1 | 7/2018 |
| WO | 2018136799 A1 | 7/2018 |
| WO | 2018204568 A1 | 11/2018 |
| WO | 2019077482 A1 | 4/2019 |
| WO | 2019094440 A1 | 5/2019 |
| WO | 2019213493 A1 | 11/2019 |
| WO | 2019246381 A1 | 12/2019 |
| WO | 2020081393 A1 | 4/2020 |
| WO | 2021011738 A1 | 1/2021 |
| WO | 2021037724 A1 | 3/2021 |

OTHER PUBLICATIONS

Anonymous: "Artificial pancreas—Wikipedia", Mar. 13, 2018 (Mar. 13, 2018), XP055603712, Retrieved from the Internet: URL: https://en.wikipedia.org/wiki/Artificial_pancreas [retrieved on Jul. 9, 2019] section "Medical Equipment" and the figure labeled "The medical equipment approach to an artifical pancreas".

Kaveh et al., "Blood Glucose Regulation via Double Loop Higher Order Sliding Mode Control and Multiple Sampling Rate." Paper presented at the proceedings of the 17th IFAC World Congress, Seoul, Korea (Jul. 2008).

(56) References Cited

OTHER PUBLICATIONS

Dassau et al., "Real-Time Hypoglycemia Prediction Suite Using Contineous Glucose Monitoring," Diabetes Care, vol. 33, No. 6, 1249-1254 (2010).
International Search Report and Written Opinion for International Patent Application No. PCT/US17/53262, mailed on Dec. 13, 2017, 8 pages.
Van Heusden et al., "Control-Relevant Models for Glucose Control using A Priori Patient Characteristics", IEEE Transactions on Biomedical Engineering, vol. 59, No. 7, (Jul. 1, 2012) pp. 1839-1849.
Doyle III et al., "Run-to-Run Control Strategy for Diabetes Management." Paper presented at 23rd Annual International Conference of the IEEE Engineering in Medicine and Biology Society, Istanbul, Turkey. (Oct. 2001).
Bequette, B.W., and Desemone, J., "Intelligent Dosing Systems": Need for Design and Analysis Based on Control Theory, Diabetes Technology and Therapeutics 9(6): 868-873 (2004).
Parker et al., "A Model-Based Agorithm for Blood Gucose Control in Type 1 Diabetic Patients." IEEE Transactions on Biomedical Engineering, 46 (2) 148-147 (1999).
International Search Report and Written Opinion for International Patent Application No. PCT/US2017/015601, mailed May 16, 2017, 12 pages.
International Search Report and Written Opinion for the International Patent Application No. PCT/US2018/018901, mailed on Aug. 6, 2018, 12 pages.
International Search Report and Written Opinion for International Patent Application No. PCT/US2018/052467, mailed Jan. 4, 2019, 13 pages.
"How to Create a QR Code that Deep Links to Your Mobile App", Pure Oxygen Labs, web<https://pureoxygenlabs.com/how-to-create-a-qr-codes-that-deep-link-to-your-mobile-app/> Year:2017.
"Read NFC Tags with an iPHone App on iOS 11", GoToTags, Sep. 11, 2017, web <https://gototags.com/blog/read-nfc-tags-with-an-iphone-app-on-ios-11/> (Year:2017).
International Search Report and Written Opinion for International Patent Application No. PCT/US2016/063350, mailed on Mar. 27, 2017, 9 pages.
Extended Search Report mailed Aug. 13, 2018, issued in European Patent Application No. 16753053.4, 9 pages.
International Search Report and Written Opinion for International Patent Application No. PCT/US16/18452, mailed on Apr. 29, 2015, 9 pages.
International Preliminary Report on Patentability mailed Aug. 31, 2017, issued in PCT Patent Application No. PCT/ JS2016/018452, 7 pages.
International Search Report and Written Opinion for International Patent Application No. PCT/US2019/055862, mailed on Mar. 11, 2020.
International Search Report and Written Opinion for Application No. PCT/US2019/030562, Sep. 25, 2019, 19 pages.
Andrenko et al., "EM Analysis of PBG Substrate Microstrip Circuits for Integrated Transmitter Front End" MMET Proceedings, 295-297 (2000).
Bardi et al., "Plane Wave Scattering From Frequency-Selective Surfaces by the Finite-Element Method" IEEE Transactions on Magnetics 38(2):641-644 (2002).
Chappell et al., "Composite Metamaterial Systems for Two-Dimensional Periodic Structures" IEEE, 3840387 (2002).
Cheng et al., "Preparation and Characterization of (Ba, Sr) TiO3 thin films using interdigitial electrodes" Microelectronic Engineering, 66:872-879 (2003).
Clavijo et al., "Design Methodology for Sievenpiper High-Impedance Surfaces: An Artificial Magnetic Conductor for Positive Gain Electrically Small Antennas" IEEE Transactions on Antennas and Propagation, 51(10):2678-2690 (2003).
Diaz et al., "Magnetic Loading of Antifical Magnetic Conductors for Bandwidth Enhancement" IEEE, 431-434 (2003).
Hansen "Effect of a High-Impedance Screen on a Dipole Antenna" IEEE Antennas and Wireless Propagation Letter, 1:46-49 (2002).
Joshi et al., "Processing and Characterization of Pure and Doped Ba0.6Sr0.4TiO3 thin films for tunable microsave applications" Mat. Res. Soc. Symp. Proc., 656E:DD4.9.1-DD4.9.6 (2001).
Kern et al., "Active Negative Impedance Loaded EBG Structures for the Realization of Ultra-Wideband Artificial Magnetic Conductors" IEEE, 427-430 (2003).
Kern et al., "The Synthesis of Metamaterial Ferrities for RF Applications Using Electromagnetic Bandgap Structures" EEE, 497-500 (2003).
Kern et al., "Ultra-thin Electromagnetic Bandgap Absorbers Synthesized via Genetic Algorithms" IEEE, 1119-1122 (2003).
Kuhn et al., "Characterization of novel mono- and bifacially active semi-transparent crystalline silicon solar cells" IEEE Transactions on Electron Devices, 46(10): 2013-2017 (1999).
Kretly et al., "The Influence of the Height Variation on the Frequency Bandgap in an AMC, Artificial magnetic Conductor for Wireless Applications: an EM Experimental Design Approach" Proceedings SBMO/IEEE MTT-S IMOC, 219-223 (2003).
Lee et al., "Investigation of Electromagnetic Bandgap (EBG) Structures for Antenna Pattern Control" IEEE, 1115-1118 (2003).
Mckinzie III et al., "Mitigation of Multipath Through the Use of an Artificial Magnetic Conductor for Precision CPS Surveying Antennas" IEEE, 640-643.
Monorciho et al., "Synthesis of Artificial Magnetic Conductors by Using Multilatered Frequency Selective Surfaces" EEE Antennas and Wireless Propagation Letters, 1:196-1999 (2002).
Mosallaei et al. "Periodic Bandgap and Effective Dielectric Materials in Electromagnetics: Characterization and Applications in Nanocavities and Waveguides" IEEE Transcations on Antennas and Propagation, 51(3):549-563 (2003).
Pontes et al., "Study of the dielectric and ferroelectric properties of chemically processed BaxSr1-xTiO3 thin films" Thin Solid Films, 386(2)91-98 (2001).
Rogers et al., "AMCs Comprised of Interdigital Capacitor FSS Layers Enable Lower Cost Applications" IEEE, 411-414 (2003).
Sievenpiper et al., "Two-Dimensional Beam Steering Using an Electrically Tunable Impedance Surface" IEEE Transactions on Antennas and Propagation, 51(10):2713-2722(2003).
Sun et al., "Efficiency of Various Photonic Bandgap (PBG) Structures" 3rd Int'l. Conf. on Microwave and Millimeter Wave Technology Proceedings, 1055-1058 (2002).
Tsunemine et al., "Pt/BaxSr(1-x)TiO3/Pt Capacitor Technology for 0.15 micron Embedded Dynamic Random Access Memory" Jap. J. Appl. Phys., 43(5A):2457-2461 (2004).
Vest "Metallo-organic decomposition (MOD) processing of ferroelectric and electro-optic films: A review" Ferroelectrics, 102(1):53-68 (1990).
Viviani et al., "Positive Temperature Coefficient of Electrical Resistivity below 150k of Barium Strontium Titanate" J. Amer. Ceram. Soc. 87(4): 756-758 (2004).
Weily et al., "Antennas Based on 2-D and 3-D Electromagnetic Bandgap Materials" IEEE, 847-850 (2003).
Yang et al., "Surface Waves of Printed Antennas on Planar Artificial Periodic Dielectric Structures" IEEE Transactions on Antennas and Propagation 49(3): 444-450 (2001).
Zhang et al., "Planar Artificial magnetic Conductors and Patch Antennas" IEEE Transactions on Antennas and Propagation, 51(10):2704-2712 (2003).
Ziroff et al., "A Novel Approach for LTCC Packaging Using a PBG Structure for Shielding and Package Mode Suppression" 33rd European Microwave Conference—Munich 419-422 (2003).
International Search Report and Written Opinion for Application No. PCT/US17/61336, mailed on Jan. 25, 2018, 9 pages.
"Graph Chart." iconfinder.com. Aug. 15, 2016. Accessed Apr. 21, 2020. Available online at URL: https://www.iconfinder.com/iconsets/graph-chart-2>.
"Circular Progress Indicator Component for React." reactscript.com. Dec. 2, 2016. Accessed Sep. 9, 2020. Available online at URL: <http://reactscripts.com/circular-progress-indicator-component-react/>.
Kruska, Michal. "Circle progress bar." dribbble.com. Oct. 18, 2012. Accessed Apr. 21, 2020. Available online at URL: <https://dribbble.com/shots/775718-Circle-progress-bar>.

(56) References Cited

OTHER PUBLICATIONS

"C# custom control <circle progress bar) Xamarian Forms." stackoverflow.com. May 22, 2016. Accessed Apr. 21, 2020. Available online at URL: <https://stackoverflow.com/questions/37379868/c-sharp-custom-control-circle-progress-bar-xamarin-forms>.
International Search Report and Written Opinion for Application No. PCT/US2021/047685 mailed on Dec. 6, 2021, 15 pages.
Team Section—Qonto, by Christophe Kerebel, dated Dec. 12, 2018, dribbble.com [online]. Retrieved Jul. 1, 2022 from Internet <URL:https://dribbble.com/shots/5676730-Team-Section-Qonto> (Year: 2018).
"Circular Loader." dribbble.com. Nov. 19, 2015. Accessed Jul. 24, 2019. Available online at URL: https://dribbble.com/shots/2362441-Circular-Loader (Year: 2015).
"Creating NSSlider with 2 knobs (range slider)." stackoverflow.com. May 6, 2015. Accessed Oct. 25, 2018. Available online at URL: <https://stackoverflow.com/questions/30082809/creating-nsslider-with-2- -knobs-range-slider> (Year: 2015).
"How to do a Round Slider." freecodecamp.org. Comment from Aug. 2018. Accessed Jul. 24, 2019. Available online at URL: https://www.freecodecamp.org/forum/t/how-to-do-a-round-slider/220375 (Year: 2018).
"Tick and cross circle shape icon . . . " depositphotos.com. Aug. 27, 2016. Accessed Feb. 1, 2019. Available online at URL:<https://depositphotos.com/121291612/stock-illustration-tick-and-cross-circle-shape.html> (Year: 2016).
"Vector-Vector Illustration of Preloader / Buffer Shapes, or Dials with Knobs." 123rf.com. Date not available. Accessed Oct. 25, 2018. Available online at URL: <https://www.123rf.com/photo_37292689_stock-vector-vector-illustration- -of-preloader-buffer-shapes-or-dials-with-knobs.html> (Year. N/A).
Gad, Tess. "Framer Cheat Sheet: Slider & Range Sliders." blog.framer.com. Jun. 12, 2017. Accessed Oct. 25, 2018. Available online at URL: <https://blog.framer.com/framer-cheat-sheets-slider-range-sliders-3dd2e5a4621d> (Year: 2017).
Obaizamomwan, Osas. "How to use the new features in iOS 9 Notes App." iphonehacks.com. Sep. 12, 2015. Accessed Apr. 24, 2018. Available online at URL: https://www.iphonehacks.com/2015/09/how-to-use-the-new-features-in-ios-9-notes-app.html.
International Search Report and Written Opinion for the International Patent Application No. PCT/US21/064056, mailed Apr. 4, 2022, 12 pages.
International Search Report and Written Opinion for the International Patent Application No. PCT/US21/064170, mailed Apr. 20, 2022, 12 pages.
Anonymous: "AndroidAPS ComponentOverview", AndroidAPS documentation, Nov. 12, 2020 (Nov. 12, 2020), pp. 1-7, Retrieved from the Internet: URL:https://github.com/openaps/AndroidAPSdocs/blob/199ef86a900adf4b3d9c32f605eb11047bd3d62f/docs/EN/Module/module.rst [retrieved on Nov. 4, 2022] the whole document.
International Search Report and Written Opinion for the International Patent Application No. PCT/US2020/052125, mailed Aug. 12, 2020, 15 pages.
International Search Report and Written Opinion for the International Patent Application No. PCT/US2020/050332, mailed Sep. 12, 2020, 12 pages.
European Patent Office, "Notification of Transmittal of the ISR and the Written Opinion of the International Searching Authority, or the Declaration," in PCT Application No. PCT/GB2015/050248, Jun. 23, 2015, 12 pages.
International Search Report and Written Opinion for the International Patent Application No. PCT/US2021/012246, mailed Apr. 13, 2021, 15 pages.
International Search Report and Written Opinion for the International Patent Application No. PCT/US2021/013639, mailed Apr. 28, 2021, 14 pages.
International Search Report and Written Opinion for the International Patent Application No. PCT/US2020/063326, mailed May 3, 2021, 17 pages.
European Search Report for the European Patent Application No. 21168591, mailed Oct. 13, 2021, 4 pages.
International Search Report and Written Opinion for the International Patent Application No. PCT/US2021/041954, mailed Oct. 25, 2021, 13 pages.
International Search Report and Written Opinion for the International Patent Application No. PCT/US2021/022694, mailed Jun. 25, 2021, 13 pages.
International Search Report and Written Opinion for the International Patent Application No. PCT/US2021/017664, mailed May 26, 2021, 16 pages.
International Search Report and Written Opinion for the International Patent Application No. PCT/US2022/012896, mailed Apr. 22, 2022, 15 pages.
International Search Report and Written Opinion for the International Patent Application No. PCT/US2022/013470, mailed May 6, 2022, 14 pages.
International Search Report and Written Opinion for the International Patent Application No. PCT/US2022/013473, mailed May 6, 2022, 13 pages.
International Search Report and Written Opinion for the International Patent Application No. PCT/US2022/019079, mailed Jun. 2, 2022, 14 pages.
International Search Report and Written Opinion for the International Patent Application No. PCT/US2022/018453, mailed Jun. 2, 2022, 13 pages.
International Search Report and Written Opinion for the International Patent Application No. PCT/US22/018700, mailed Jun. 7, 2022, 13 pages.
International Search Report and Written Opinion for the International Patent Application No. PCT/US22/019080, mailed Jun. 7, 2022, 14 pages.
International Search Report and Written Opinion for the International Patent Application No. PCT/US22/019664, mailed Jun. 7, 2022, 14 pages.
International Search Report and Written Opinion for International Patent Application No. PCT/US2021/051027, mailed on Jan. 7, 2022, 16 pages.
International Search Report and Written Opinion for International Patent Application No. PCT/US2021/052372, mailed Jan. 26, 2022, 15 pages.
International Search Report and Written Opinion for the International Patent Application No. PCT/US2021/046607, mailed Jan. 31, 2022, 20 pages.
International Search Report and Written Opinion for the International Patent Application No. PCT/US2021/055745, mailed Feb. 14, 2022, 13 pages.
International Search Report and Written Opinion for the International Patent Application No. PCT/US21/060618, mailed Mar. 21, 2022, 15 pages.
Herrero Pau et al: "Enhancing automatic closed-loop glucose control in type 1 diabetes with an adaptive meal bolus calculator -in silicoevaluation under intra-day variability", Computer Methods and Programs in Biomedicine, Elsevier, Amsterdam, NL, vol. 146, Jun. 1, 2017 (Jun. 1, 2017), pp. 125-131, XP085115607, ISSN: 0169-2607, DOI:10.1016/J.CMPB.2017.05.010.
Marie Aude Qemerais: "Preliminary Evaluation of a New Semi-Closed-Loop Insulin Therapy System over the prandial period in Adult Patients with type I diabetes: the WP6. 0 Diabeloop Study", Journal of Diabetes Science and Technology Diabetes Technology Society Reprints and permissions, Jan. 1, 2014, pp. 1177-1184, Retrieved from the Internet: URL:http://journals.sagepub.com/doi/pdf/10.1177/1932296814545668 [retrieved on Jun. 6, 2022] chapter "Functioning of the Algorithm" chapter "Statistical Analysis" p. 1183, left-hand column, line 16-line 23.
Anonymous: "Kernel density estimation", Wikipedia, Nov. 13, 2020 (Nov. 13, 2020), pp. 1-12, XP055895569, Retrieved from the Internet: URL:https://en.wikipedia.org/w/index.php?title=Kernel_density_estimation&oldid=988508333 [retrieved on Jun. 6, 2022].
Anonymous: "openaps / oref0 /lib/determine-basal-js", openaps repository, Nov. 9, 2019 (Nov. 9, 2019), pp. 1-17, XP055900283, Retrieved from the Internet: URL:https://github.com/openaps/oref0/blob/ master/lib/determine-basal/determine-basal.js [retrieved on Jun. 6, 2022] line 116-line 118, line 439-line 446.

(56) References Cited

OTHER PUBLICATIONS

Anonymous: "AndroidAPS screens", AndroidAPS documentation, Oct. 4, 2020 (Oct. 4, 2020), pp. 1-12, XP055894824, Retrieved from the Internet: URL:https://github.com/openaps/AndroidAPSdocs/blob/25d8acf8b28262b411b34f416f173ac0814d7e14/docs/EN/Getting-Started/Screenshots.md [retrieved on Jun. 6, 2022].

Kozak Milos et al: "Issue #2473 of AndroidAPS", MilosKozak / AndroidAPS Public repository, Mar. 4, 2020 (Mar. 4, 2020), pp. 1-4, XP055900328, Retrieved from the Internet: URL:https://github.com/MilosKozak/AndroidAPS/Issues/2473 [retrieved on Jun. 6, 2022].

International Search Report and Written Opinion for the International Patent Application No. PCT/US2021/052855, mailed Dec. 22, 2021, 11 pages.

International Search Report and Written Opinion for the International Patent Application No. PCT/US2021/047771, mailed Dec. 22, 2021, 11 pages.

Medication Bar Code System Implementation Planning Section I: A Bar Code Primer for Leaders, Aug. 2013.

Medication Bar Code System Implementation Planning Section II: Building the Case for Automated Identification of Medications, Aug. 2013.

Villareal et al. (2009) in: Distr. Comp. Art. Intell. Bioninf. Soft Comp. Amb. Ass. Living; Int. Work Conf. Art. Neural Networks (IWANN) 2009, Lect. Notes Comp. Sci. vol. 5518; S. Omatu et al. (Eds.), pp. 870-877.

Unger, Jeff, et al., "Glucose Control in the Hospitalized Patient," Emerg. Med 36(9):12-18 (2004).

"Glucommander FAQ" downloaded from https://adaendo.com/GlucommanderFAQ.html on Mar. 16, 2009.

Finfer, Simon & Heritier, Stephane. (2009). The Nice-Sugar (Normoglycaemia in Intensive Care Evaluation and Survival Using Glucose Algorithm Regulation) Study: statistical analysis plan. Critical care and resuscitation : journal of the Australasian Academy of Critical Care Medicine. 11. 46-57.

Letters to the Editor regarding "Glucose Control in Critically Ill Patients," N Engl J Med 361: 1, Jul. 2, 2009.

"Medtronic is Leading a Highly Attractive Growth Market," Jun. 2, 2009.

Davidson, Paul C., et al. "Glucommander: An Adaptive, Computer-Directed System for IV Insulin Shown to be Safe, Simple, and Effective in 120,618 Hours of Operation," Atlanta Diabetes Associates presentation.

Davidson, Paul C., et al. "Pumpmaster and Glucommander," presented at the MiniMed Symposium, Atlanta GA, Dec. 13, 2003.

Kanji S., et al. "Reliability of point-of-care testing for glucose measurement in critically ill adults," Critical Care Med, vol. 33, No. 12, pp. 2778-2785, 2005.

Krinsley James S., "Severe hypoglycemia in critically ill patients: Risk factors and outcomes," Critical Care Med, vol. 35, No. 10, pp. 1-6, 2007.

International Search Report and Written Opinion for the International Patent Application No. PCT/US2021/016283, mailed Jun. 2, 2021, 15 pages.

Farkas et al. "Single-Versus Triple-Lumen Central Catheter-Related Sepsis: A Prospective Randomized Study in a Critically Ill Population" The American Journal of Medicine, Sep. 1992, vol. 93, p. 277-282.

Davidson, Paul C., et al., A computer-directed intravenous insulin system shown to be safe, simple, and effective in 120,618 h of operation, Diabetes Care, vol. 28, No. 10, Oct. 2005, pp. 2418-2423.

R Anthony Shaw, et al., "Infrared Spectroscopy in Clinical and Dianostic Analysis," Encyclopedia of Analytical Chemistry, ed. Robert A. Meyers, John Wiley & Sons, Ltd., pp. 1-20, 2006.

Gorke, A "Microbial Contamination Of Haemodialysis Catheter Connections" Journal of Renal Care, European Dialysis & Transplant Nurses Association.

Lovich et al. "Central venous catheter infusions: A laboratory model shows large differences in drug delivery dynamics related to catheter dead volume" Critical Care Med 2007 vol. 35, No. 12.

Van Den Berghe, Greet, M.D., Ph.D., et al., Intensive Insulin Therapy in Critically Ill Patients, The New England Journal of Medicine, vol. 345, No. 19, Nov. 8, 2001, pp. 1359-1367.

Schlegel et al, "Multilumen Central Venous Catheters Increase Risk for Catheter-Related Bloodstream Infection: Prospective Surveillance Study" Infection 2008; 36: 322-327.

Wilson, George S., et al., Progress toward the Development of an Implantable Sensor for Glucose, Clin. Chem., vol. 38, No. 9, 1992, pp. 1613-1617.

Yeung et al. "Infection Rate for Single Lumen v Triple Lumen Subclavian Catheters" Infection Control and Hospital Epidemiology, vol. 9, No. 4 (Apr. 1988) pp. 154-158 The University of Chicago Press.

International Search Report and Written Opinion, International Application No. PCT/US2010/033794 mailed Jul. 16, 2010.

International Search Report and Written Opinion in PCT/US2008/079641 dated Feb. 25, 2009.

Berger, "Measurement of Analytes in Human Serum and Whole Blood Samples by Near-Infrared Raman Spectroscopy," Ph.D. Thesis, Massachusetts Institute of Technology, Chapter 4, pp. 50-73, 1998.

Berger, "An Enhanced Algorithm for Linear Multivariate Calibration," Analytical Chemistry, vol. 70, No. 3, pp. 623-627, Feb. 1, 1998.

Billman et. al., "Clinical Performance of an In line Ex-Vivo Point of Care Monitor: A Multicenter Study," Clinical Chemistry 48: 11, pp. 2030-2043, 2002.

Widness et al., "Clinical Performance on an In-Line Point-of-Care Monitor in Neonates"; Pediatrics, vol. 106, No. 3, pp. 497-504, Sep. 2000.

Finkielman et al., "Agreement Between Bedside Blood and Plasma Glucose Measurement in the ICU Setting"; retrieved from http://www.chestjournal.org; CHEST/127/5/May 2005.

Glucon Critical Care Blood Glucose Monitor; Glucon; retrieved from http://www.glucon.com.

Fogt, et al., "Development and Evaluation of a Glucose Analyzer for a Glucose-Controlled Insulin Infusion System (Biostator)"; Clinical Chemistry, vol. 24, No. 8, pp. 1366-1372, 1978.

Vonach et al., "Application of Mid-Infrared Transmission Spectrometry to the Direct Determination of Glucose in Whole Blood," Applied Spectroscopy, vol. 52, No. 6, 1998, pp. 820-822.

Muniyappa et al., "Current Approaches for assessing insulin sensitivity and resistance in vivo: advantages, imitations, and appropriate usage," AJP-Endocrinol Metab, vol. 294, E15-E26, first published Oct. 23, 2007.

International Preliminary Report on Patentability for the International Patent Application No. PCT/US2019/053603, mailed Apr. 8, 2021, 9 pages.

International Search Report and Written Opinion for the International Patent Application No. PCT/US2019/053603, mailed Jan. 7, 2020, 16 pages.

Dassau et al., "Detection of a meal using continuous glucose monitoring: Implications for an artificial [beta]-cell." Diabetes Care, American Diabetes Association, Alexandria, VA, US, 31(2):295-300 (2008).

Cameron et al., "Probabilistic Evolving Meal Detection and Estimation of Meal Total Glucose Appearance Author Affiliations", J Diabetes Sci and Tech, vol. Diabetes Technology Society ;(5):1022-1030 (2009).

Lee et al., "A closed-loop artificial pancreas based on model predictive control: Human-friendly identification and automatic meal disturbance rejection", Biomedical Signal Processing and Control, Elsevier, Amsterdam, NL, 4(4):1746-8094 (2009).

Anonymous: "Fuzzy control system", Wikipedia, Jan. 10, 2020. URL: https://en.wikipedia.org/w/index.php?title=Fuzzy_control_system&oldid=935091190.

An Emilia Fushimi: "Artificial Pancreas: Evaluating the ARG Algorithm Without Meal Annoucement", Journal of Diabetes Science and Technology Diabetes Technology Society, Mar. 22, 2019, pp. 1025-1043.

International Search Report and Written Opinion for the InternationalPatent Application No. PCT/US2021/017441, mailed May 25, 2021, 12 pages.

(56) References Cited

OTHER PUBLICATIONS

Mirko Messori et al: "Individualized model predictive control for the artificial pancreas: In silico evaluation of closed-loop glucose control", IEEE Control Systems, vol. 38, No. 1, Feb. 1, 2018, pp. 86-104.
International Search Report and Written Opinion for the International Patent Application No. PCT/US2021/017662, mailed May 26, 2021, 14 pages.
Anonymous: "Reservoir Best Practice and Top Tips" Feb. 7, 2016, URL: https://www.medtronic-diabetes.co.uk/blog/reservoir-best-practice-and-top-tips, p. 1.
Gildon Bradford: "InPen Smart Insulin Pen System: Product Review and User Experience" Diabetes Spectrum, vol. 31, No. 4, Nov. 15, 2018, pp. 354-358.
International Search Report and Written Opinion for the International Patent Application No. PCT/US2021/016050, mailed May 27, 2021, 16 pages.
International Search Report and Written Opinion for the International Patent Application No. PCT/US2020/065226, mailed May 31, 2021, 18 pages.
International Search Report and Written Opinion for the International Patent Application No. PCT/US2021/017659, mailed May 31, 2021, 13 pages.
Montaser Eslam et al., "Seasonal Local Models for Glucose Prediction in Type 1 Diabetes", IEE Journal of Biomedical and Health Informatics, IEEE, Piscataway, NJ, USA, vol. 24, No. 7, Nov. 29, 2019, pp. 2064-2072.
Samadi Sediqeh et al., "Automatic Detection and Estimation of Unannouced Meals for Multivariable Artificial Pancreas System", Diabetis Technology & Therapeutics, vol. 20m No. 3, Mar. 1, 2018, pp. 235-246.
Samadi Sediqeh et al., "Meal Detection and Carbohydrate Estimation Using Continuous Glucose Sensor Data" IEEE Journal of Biomedical and Health Informatics, IEEE, Piscataway, NJ, USA, vol. 21, No. 3, May 1, 2017, pp. 619-627.
Khodaei et al., "Physiological Closed-Loop Contol (PCLC) Systems: Review of a Modern Frontier in Automation", IEEE Access, IEEE, USA, vol. 8, Jan. 20, 2020, pp. 23965-24005.
E. Atlas et al., "MD-Logic Artificial Pancreas System: A pilot study in adults with type 1 diabetes", Diabetes Care, vol. 33, No. 5, Feb. 11, 2010, pp. 1071-1076.
Fox, Ian G.; Machine Learning for Physiological Time Series: Representing and Controlling Blood Glucose for Diabetes Management; University of Michigan. ProQuest Dissertations Publishing, 2020. 28240142. (Year: 2020).
Anonymous: "PredictBGL User Manual", PredictBGL, Mar. 2, 2018 (Mar. 2, 2018), Retrieved from the Internet: URL: https://web.archive.org/web/20180324182956/http://predictbgl.com:80/app_user_manual.pdf [retrieved on Mar. 13, 2019].
Trout K K et al: "Insulin Sensitivity and Premenstrual Syndrome", Current Diabetes Reports, Current Science, Philadelphia, VA, US, vol. 4, No. 4, Jan. 31, 2004 (Jan. 31, 2004), pp. 273-280.

\* cited by examiner

ADJUSTMENT OF MEDICAMENT DELIVERY BY A MEDICAMENT DELIVERY DEVICE BASED ON MENSTRUAL CYCLE PHASE

RELATED APPLICATIONS

This application claims the benefit of U.S. Provisional Patent Application No. 63/216,814, filed Jun. 30, 2021, the contents of which are incorporated herein by reference in their entirety.

BACKGROUND

A conventional medicament delivery device may deliver medicament at basal dosages and/or bolus dosages. The basal dosages are delivered on an-ongoing basis and aim to address a substantial portion of the need for the medicament on an on-going basis. The bolus dosages are delivered when requested by a user or when the control system for the medicament delivery device concludes based on information regarding the user that there is a need to deliver the bolus dosage. In some instances, the basal dosages are delivered automatically by the medicament delivery device to the user. The control system is generally responsible for determining the timing and the dosages for such medicament deliveries.

One example of a conventional medicament delivery device is an insulin delivery device, such as an insulin pump or patch. The conventional insulin delivery device may calculate a basal dosage based on total daily insulin (TDI). TDI represents the aggregate amount of insulin needed by the user for a day. TDI is typically calculated based on the weight of the user. A commonly used formula is that TDI equals user weight in pounds divided by 4. Thus, the TDI for a 200-pound man is 200 divided by 4 or 50 units of insulin. The basal dosage is conventionally determined to be one half of TDI.

Insulin boluses are typically delivered in response to meals by the user. The meals will increase the user's blood glucose concentration. The magnitude of the increase in blood glucose concentration is related to the quantity of carbohydrates ingested. Thus, a conventional insulin delivery device may determine what dosage of insulin will compensate for the quantity of carbohydrates ingested. In order to determine the amount of insulin needed and hence the bolus dosage, the conventional insulin delivery system may multiply the carbohydrates ingested by the insulin to carbohydrates ratio (ICR). The ICR conventionally may be set as a value typically selected from the range of 4 to 50. For example, a value of 4 for the ICR implies that 1 unit of insulin is to be delivered for every 4 grams of carbohydrates ingested. The conventional insulin delivery system may also look at the current blood glucose concentration and the insulin on board (IOB) for the user, which represents the quantity of insulin delivered to user that still has insulin action remaining.

SUMMARY

In accordance with an inventive aspect of an embodiment, a method is performed by a processor in an electronic device. The method includes receiving information regarding a menstrual cycle of a user and based on the received information regarding a menstrual cycle of a user, adjusting a medicament dosage to be delivered by an automated medicament delivery device.

The received information may be a current phase of a menstrual cycle of the user. The received information may be received from a machine learning model. The received information may be information from which a current phase of the menstrual cycle is determined. The received information may include information from one or more sensors secured to the user. The medicament may be one of insulin, glucagon or a glucagon peptide-1 (GLP-1) agonist. The adjusting may include adjusting an insulin dosage to be delivered by the automated medicament delivery device based on an insulin sensitivity of the user for a current phase of the menstrual cycle of the user.

In accordance with another inventive feature of an embodiment, a method is performed by a processor in an electronic device. The method includes receiving input from a sensor. Based at least in part on the received input, a phase of a menstrual cycle of a user is determined with the processor. The method also includes determining insulin sensitivity of the user with the processor based on the determined phase of the menstrual cycle and adjusting the insulin delivered by a delivery device based on the determined insulin sensitivity.

The sensor may sense skin temperature, heart rate, skin conductance, or activity level. The method may further include receiving additional inputs from multiple sensors and using the additional inputs in the determining of the phase of the menstrual cycle of the user. The additional inputs from the multiple sensors may include a blood glucose concentration value for the user from one of the sensors that is a glucose monitor. The adjusting may adjust a size of a dosage of basal insulin to be delivered by the delivery device. The adjusting may adjust a size of dosage of an insulin bolus to be delivered by the delivery device.

In accordance with an additional aspect of an embodiment, a method is performed by a processor in an electronic device. Per the method, patterns of medicament sensitivity of a user based on a phase of a menstrual cycle of a user are learned by a machine learning model executing on the processor. Delivery of medicament to the user are adjusted by the processor based on the learned patterns to be delivered by a medicament delivery device to the user.

The method may further include receiving input from at least one sensor that senses information regarding the user and processing the input to determine a current phase of the menstrual cycle of the user. The input may include heart rate and skin temperature. The input may include blood glucose concentration and an indication of activity level. The learning may include training on a data set derived from women other than the user and subsequent to the training on the data set, training on data from the user to customize the machine learning model to the user. The medicament may be one of insulin, glucagon or a glucagon peptide-1 (GLP-1) agonist, for example.

DETAILED DESCRIPTION

Figure 1A:
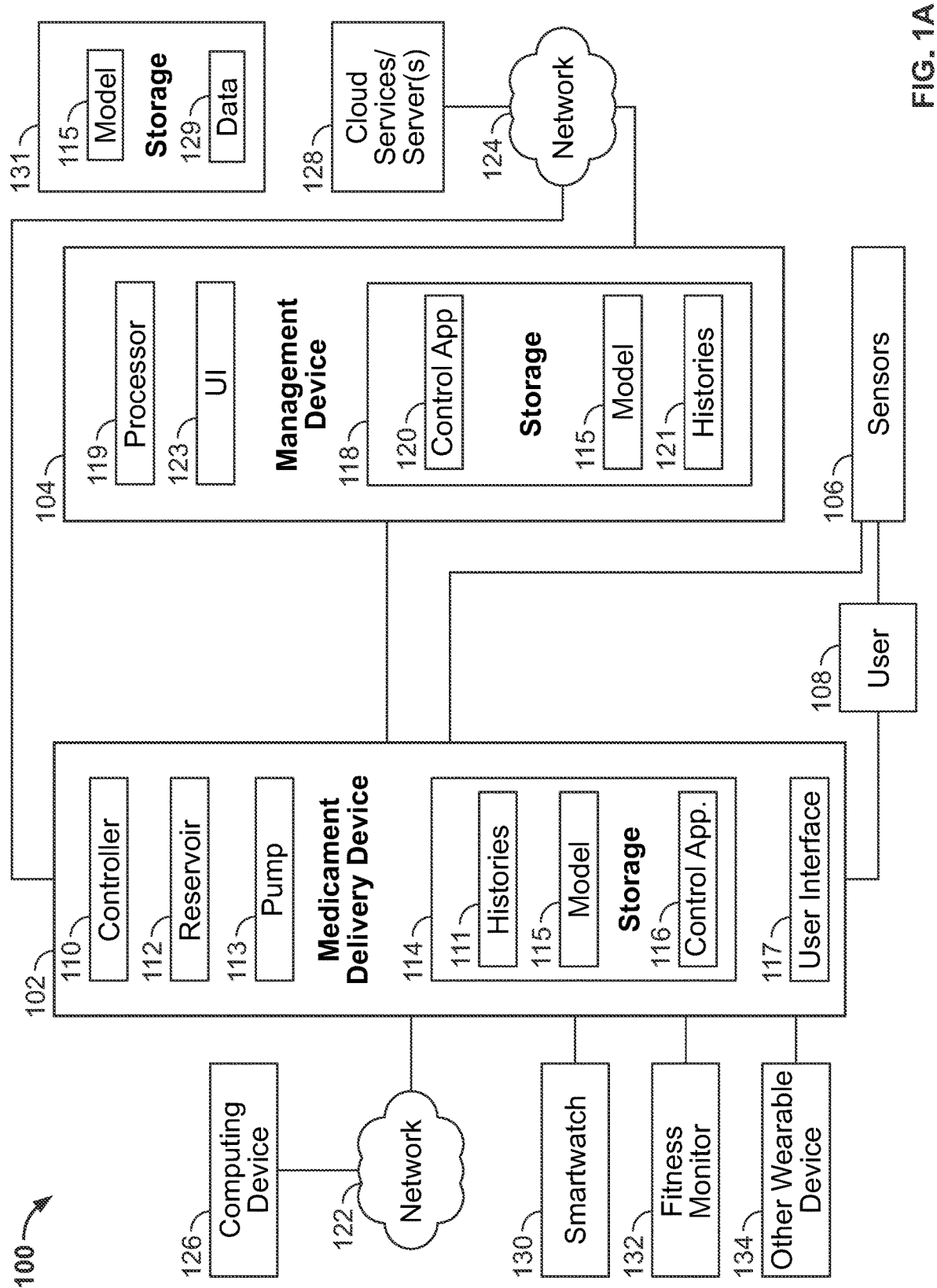
FIG. 1A depicts an illustrative medicament delivery system that is suitable for delivering a medicament to a user in accordance with exemplary embodiments.

The true medicament dosage needs of a user may vary from user to user. Moreover, the true medicament needs of a given user may vary over ranges of days or weeks and may vary even during a single day. Unfortunately, conventional medicament delivery devices do not account for many of these variations in medicament dosage needs. For example, a user's medicament dosage needs may vary based on the menstrual cycle of the user. One instance of this variation is that insulin sensitivity of a user may vary over the course of the menstrual cycle. Conventional insulin delivery devices do not account for this variation in insulin sensitivity due to the menstrual cycle phase of the user. This can be problematic in that the insulin needs of the user change over the course of the menstrual cycle of the user, but the conventional insulin delivery devices do not adjust for the change. As a result, the user may be at greater risk of hyperglycemia or hypoglycemia.

Exemplary embodiments described herein account for the differing needs of the user over the menstrual cycle of the user to better control the blood glucose concentration of the user. The exemplary embodiments may be realized in control systems for medicament delivery devices that deliver medicaments, such as medicaments that regulate blood glucose concentration levels. Examples of such medicaments that regulate blood glucose concentration levels include insulin, glucagon, and glucagon peptide-1 (GLP-1) agonists. The exemplary embodiments are able to better tailor the dosages of the medicament delivered to the user with the medicament delivery device to reduce the risk of hyperglycemia and hypoglycemia and help reduce blood glucose concentration excursions.

Some exemplary embodiments may use sensors, such as sensors of heart rate, skin temperature, skin conductance, and blood glucose concentration. The sensed values obtained from these sensors may be used to automatically determine a current phase of a menstrual cycle of the user. Once the current phase of the menstrual cycle is known the basal dosages and/or the bolus dosages automatically may be adjusted to account for changes associated with the phase. The adjustments may be made over time as new phases of the menstrual cycle are reached.

The exemplary embodiments may use a machine learning system to identify the phase of the menstrual cycle of the user from values obtained from the sensors. The machine learning system may learn the normal duration of each phase of the menstrual cycle as well as the normal length of a menstrual cycle for the user. The machine learning system may also learn how medicament sensitivity (such as insulin sensitivity) of the user varies over the course of the menstrual cycle for the user. In particular, the patterns of variance in magnitude and time may be learned.

In some exemplary embodiments, the machine learning system may rely upon a machine learning model that may utilize logistic regressors, random forests, deep learning networks, etc. The machine learning model may be trained on a data set derived from a large population of women and then may be customized to the user. Alternatively, the machine learning model may be trained solely on data derived from the user. The trained machine learning model may be used to identify the current phase of the menstrual cycle of the user.

In some exemplary embodiments no machine learning system is used. Instead, conventional logic may be used to identify the current phase of the menstrual cycle of the user. In other exemplary embodiments, a user identifies when the user's menstrual cycle began, and may also identify how long her menstrual cycle typically lasts, and that information from the user is used by the control system to adjust the medicament dosages.

FIG. 1A depicts an illustrative medicament delivery system 100 that is suitable for delivering a medicament to a user 108 in accordance with exemplary embodiments. The medicament delivery system 100 includes a medicament delivery device 102. The medicament delivery device 102 may be a wearable device that is worn on the body of the user 108 or carried by the user and having an infusion site. The medicament delivery device 102 may be directly coupled to a user (e.g., directly attached to a body part and/or skin of the user 108 via an adhesive or the like) or carried by the user (e.g., on a belt or in a pocket) with tubing connecting the medicament delivery device 102 to an infusion site where the medicament is injected. In a preferred embodiment, a surface of the medicament delivery device 102 may include an adhesive to facilitate attachment to the user 108.

The medicament delivery device 102 may include a controller 110. The controller 110 may be implemented in hardware, software, or any combination thereof. The controller 110 may, for example, include a microprocessor, a logic circuit, a field programmable gate array (FPGA), an application specific integrated circuit (ASIC) or a microcontroller coupled to a memory. The controller 110 may maintain a date and time as well as other functions (e.g., calculations or the like). The controller 110 may be operable to execute a control application 116 encoded in computer programming instructions stored in the storage 114 that enables the controller 110 to direct operation of the medicament delivery device 102. The controller may in some exemplary embodiments execute a model 115, such as machine learning model to perform functionality as detailed below. In some embodiments, the model 115 is responsible for determining a current phase of the menstrual cycle of the user 108 and also learning patterns of key metrics, like heart rate, heart rate variability, skin temperature, and skin conductance over phases of the menstrual cycle of the user. The model 115 may also learn the average length of the phases of the menstrual cycle of the user and the average variation in insulin sensitivity over phases of the menstrual cycle of the user. The model 115 may be used to identify a current phase of the menstrual cycle of the user and to provide pattern information that is used to adapt basal dosages and bolus dosages of the medicament, like insulin. The model 115 may be realized in software.

The control application 116 may control delivery of a medicament to the user 108 per a control approach like that described herein. The storage 114 may hold histories 111 for a user, such as a history of basal deliveries, a history of bolus deliveries, and/or other histories, such as a meal event history, exercise event history and/or the like. In addition, the controller 110 may be operable to receive data or information. The storage 114 may include both primary memory and secondary memory. The storage may include random access memory (RAM), read only memory (ROM), optical storage, magnetic storage, removable storage media, solid state storage or the like.

The medicament delivery device 102 may include one or more housings for housing its various components including a pump 113, a power source, and a reservoir 112 for storing a medicament for delivery to the user 108 as warranted. A fluid path to the user 108 may be provided, and the medicament delivery device 102 may expel the medicament from the reservoir 112 to deliver the medicament to the user 108 using the pump 113 via the fluid path. The fluid path may, for example, include tubing coupling the medicament delivery device 102 to the user 108 (e.g., tubing coupling a cannula to the reservoir 112), and may include tubing to a separate infusion site.

There may be one or more communications links with one or more devices physically separated from the medicament delivery device 102 including, for example, a management device 104 of the user and/or a caregiver of the user and/or a sensor 106. The communication links may include any wired or wireless communication links operating according to any known communications protocol or standard, such as Bluetooth®, Wi-Fi, a near-field communication standard, a cellular standard, or any other wireless protocol. The medicament delivery device 102 may also include a user interface 117, such as an integrated display device for displaying information to the user 108 and in some embodiments, receiving information from the user 108. The user interface 117 may include a touchscreen and/or one or more input devices, such as buttons, knobs, or a keyboard.

The medicament delivery device 102 may interface with a network 122. The network 122 may include a local area network (LAN), a wide area network (WAN) or a combination therein. A computing device 126 may be interfaced with the network, and the computing device may communicate with the medicament delivery device 102.

The medicament delivery system 100 may include sensors 106 for sensing the levels of one or more analytes. The sensors 106 may be coupled to the user 108 by, for example, adhesive or the like and may provide information or data on one or more medical conditions and/or physical attributes of the user 108. The sensors 106 may be physically separate from the medicament delivery device 102 or may be an integrated component thereof.

The medicament delivery system 100 may or may not also include a management device 104. In some embodiments, a management device is not needed as medicament delivery device 102 may manage itself. The management device 104 may be a special purpose device, such as a dedicated personal diabetes manager (PDM) device. The management device 104 may be a programmed general-purpose device, such as any portable electronic device including, for example, a dedicated controller, such as processor, a microcontroller, or the like. The management device 104 may be used to program or adjust operation of the medicament delivery device 102 and/or the sensors 106. The management device 104 may be any portable electronic device including, for example, a dedicated device, a smartphone, a smartwatch or a tablet. In the depicted example, the management device 104 may include a processor 119 and a storage 118. The processor 119 may execute processes to manage a user's blood glucose levels and to control the delivery of the medicament to the user 108. The model 115 may run on the processor 119 of the management device 104 in some embodiments. The medicament delivery device 102 may provide data from the sensors 106 and other data to the management device 104. The data may be stored in the storage 118. The processor 119 may also be operable to execute programming code stored in the storage 118. For example, the storage may be operable to store one or more control applications 120 for execution by the processor 119. The one or more control applications 120 may be responsible for controlling the medicament delivery device 102, such as by controlling the AID delivery of insulin to the user 108. The storage 118 may store the one or more control applications 120, histories 121 like those described above for the medicament delivery device 102, and other data and/or programs.

The management device 104 may include a user interface (UI) 123 for communicating with the user 108. The user interface 123 may include a display, such as a touchscreen, for displaying information. The touchscreen may also be used to receive input when it is a touch screen. The user interface 123 may also include input elements, such as a keyboard, button, knobs, or the like.

The management device 104 may interface with a network 124, such as a LAN or WAN or combination of such networks. The management device 104 may communicate over network 124 with one or more servers or cloud services 128. In some exemplary embodiment, the model 115 and the data used by the model may be stored on the storage 131 for the cloud services/server(s) 128. The computational needs and the storage needs of the model 115 may be large, and the cloud services/server(s) 128 may be a suitable match for those needs. In such instances, the data, such as sensor values, may be sent for storage and processing from the medicament delivery device 102 directly to the cloud services/server(s) 128 or instead from the management device 104 to the cloud services/server(s) 128. The cloud services/server(s) 128 may provide output from the model 115 as needed to the management device 104 and/or medicament delivery device 102 during operation.

Other devices, like smartwatch 130, fitness monitor 132 and wearable device 134 may be part of the delivery system 100. These devices may communicate with the medicament delivery device 102 to receive information and/or issue commands to the medicament delivery device 102. These devices 130, 132 and 134 may execute computer programming instructions to perform some of the control functions otherwise performed by controller 110 or processor 119. These devices 130, 132 and 134 may include displays for displaying information. The display may show a user interface for providing input by the user, such as to request a change or pause in dosage or to request, initiate, or confirm delivery of a bolus of a medicament, or for displaying output, such as a change in dosage (e.g., of a basal delivery amount) as determined by controller 110 or management device 104. These devices 130, 132 and 134 may also have wireless communication connections with the sensor 106 to directly receive analyte measurement data.

A wide variety of medicaments may be delivered by the medicament delivery device 102. The medicament may be insulin for treating diabetes. The medicament may be glucagon for raising a user's blood glucose level. The medicament may also be a glucagon-like peptide (GLP)-1 receptor agonists for lowering blood glucose or slowing gastric emptying, thereby delaying spikes in blood glucose after a meal.

Figure 1B:
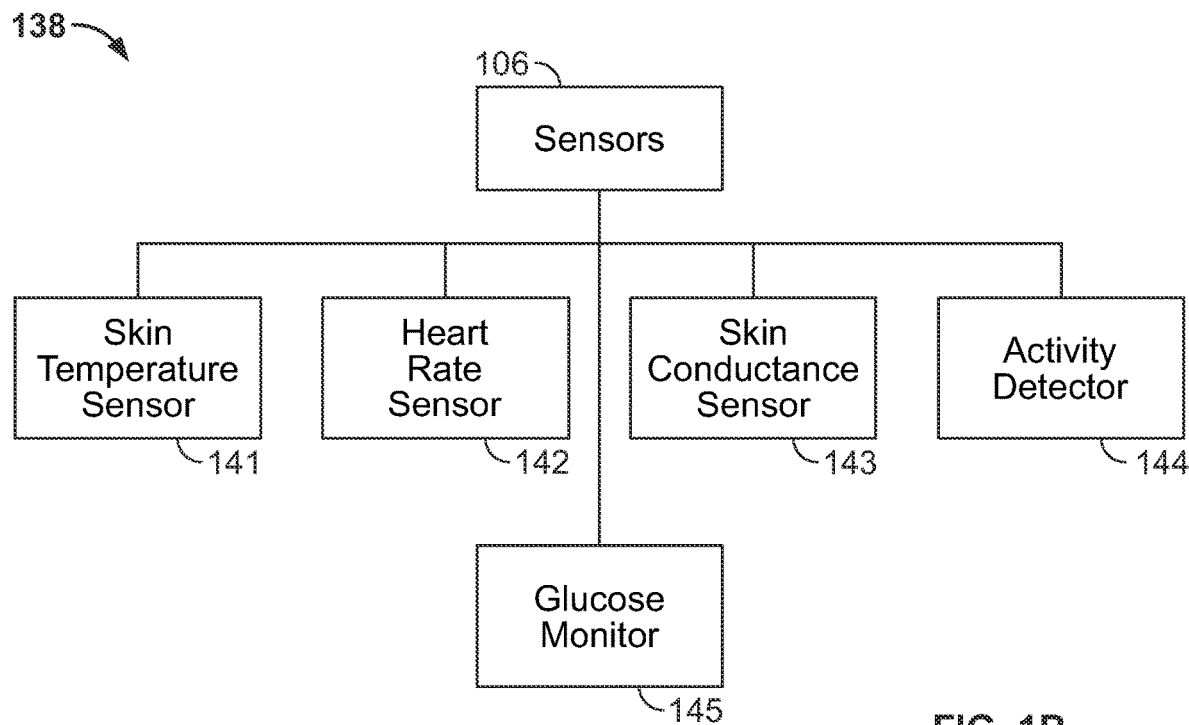
FIG. 1B shows a block diagram of examples of some sensors that may be used in exemplary embodiments.

FIG. 1B shows a block diagram 138 of examples of some sensors 106 that may be used in exemplary embodiments. The sensors 106 may gather information from the user 108 that help the model 115 to determine the current phase of the menstrual cycle of the user 108 and to help adapt to changing insulin sensitivity of the user over the phases of the menstrual cycle. The sensors 106 may include a skin temperature sensor 141 for sensing the skin temperature of the user at a suitable location, such as the wrist of the user or in proximity to the location of the medicament delivery device 102. The sensors 106 may include a heart rate monitor 142 for sensing the heart rate of the user 108. A skin conductance sensor 143 may be provided to measure the skin conductance of the user 108. An activity detector 144, such as an accelerometer, may be used to measure the activity level of the user. A glucose sensor 145, such as a continuous glucose monitor (CGM), may be provided. The glucose sensor 145 may be an on-body sensor that detects the blood glucose concentration of the user at regular intervals, such as every 5 minutes.

Figure 1C:
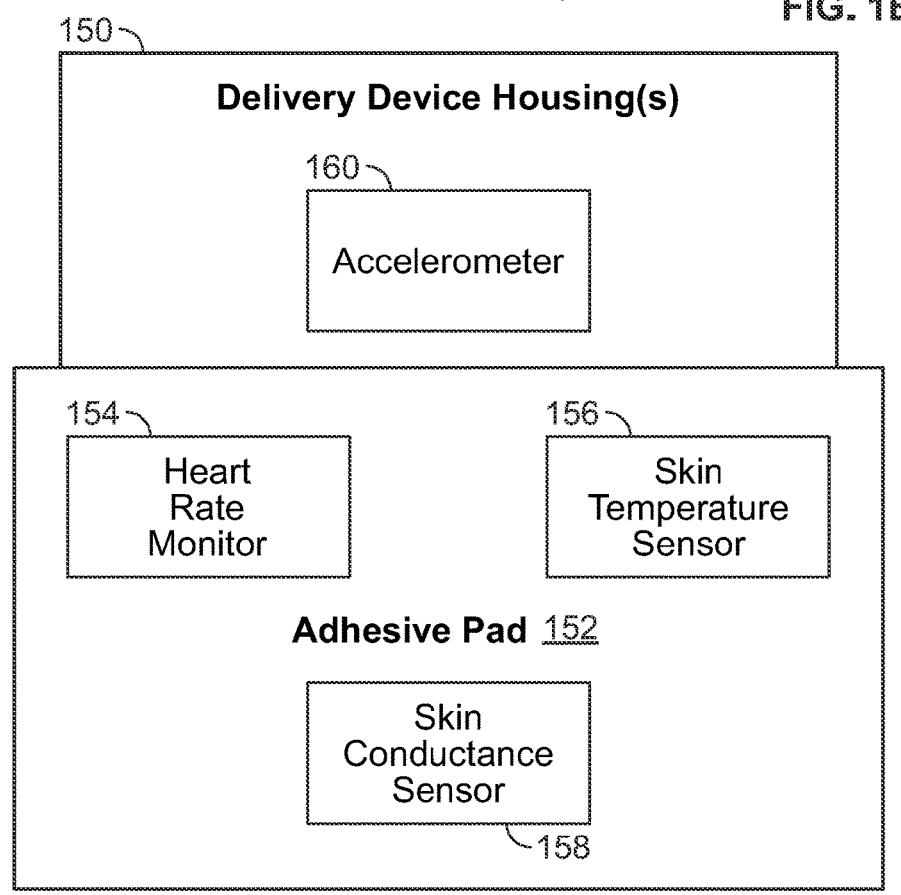
FIG. 1C depicts one exemplary configuration of the sensors relative to the medicament delivery device.

FIG. 1C depicts one exemplary configuration of the sensors 106 relative to the medicament delivery device 102. As shown in FIG. 1C, in some exemplary embodiments, the medicament delivery device 102 includes a delivery device housing or housings 150 in which components of the medicament delivery device, like the controller 110, the reservoir 112, the pump 113 and the storage are contained. An accelerometer 160 may be contained inside the delivery device housing(s) 150. The accelerometer 160 acts as an activity detector 144 (FIG. 1B) that may be used to determine if the user is sleeping, exercising, etc. The accelerometer 160 may also identify a magnitude of activity level of the user 108.

The delivery device housing(s) 150 have an adhesive pad 152 attached to the bottom surface of the delivery device housing(s) 150. The adhesive pad 152 is secured to the delivery device housing(s) 150 by a suitable means such as by heat welding, an adhesive or other means. The adhesive pad 152 has an adhesive on its underside. The adhesive secures the adhesive pad 152 to the skin surface of the user 108. Certain sensors may be secured to the underside of the adhesive pad as shown. For example, a heart rate monitor 154, a skin temperature sensor 156, and a skin conductance sensor 158 may be secured to the underside of the adhesive pad and may contact the skin surface of the user 108.

Figure 2:
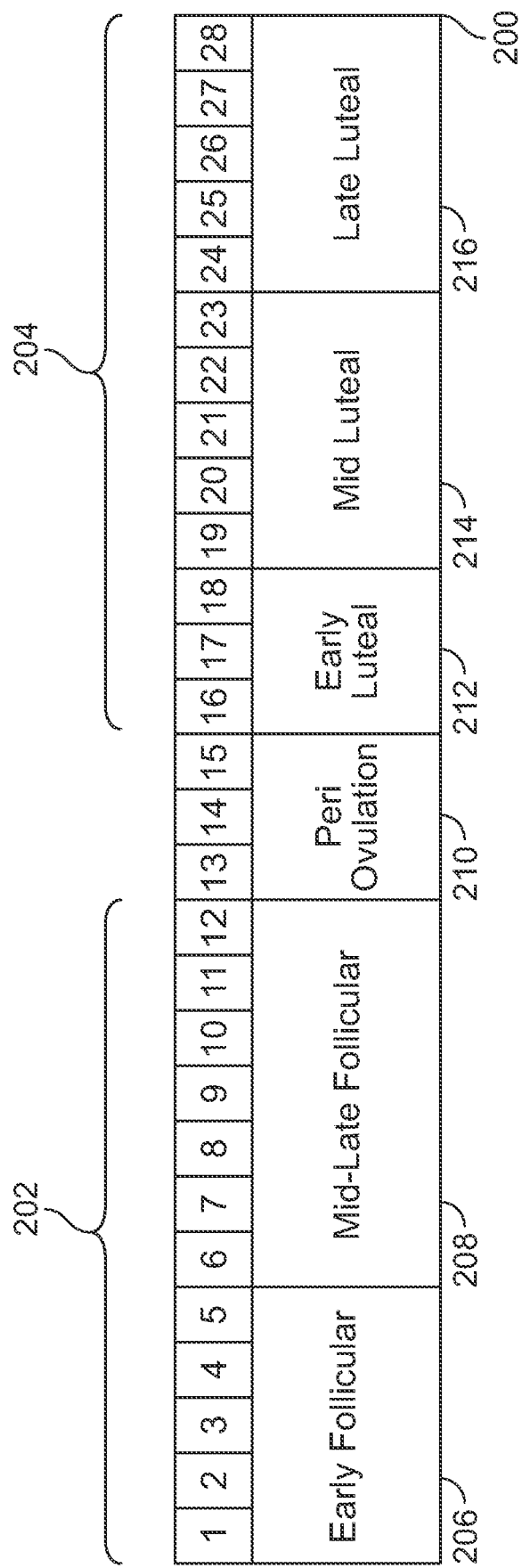
FIG. 2 depicts a breakdown of the phases of an idealized menstrual cycle.

The exemplary embodiments may determine the current phase of the menstrual cycle of the user 108 and based on that determination may adjust the magnitude of the basal dosages and/or bolus dosages of medicament, such as insulin, to matching changing insulin sensitivity due to the phase of the menstrual cycle. FIG. 2 depicts a breakdown of the phases of an idealized menstrual cycle 200. The depiction begins at the time that the user begins her period. The menstrual cycle 200 includes a follicular phase 202 that precedes ovulation and a luteal phase 202 that follows ovulation. Ovulation occurs during the peri-ovulation phase 210. The follicular phase 202 contains an early follicular phase 206 and a late follicular phase 208. The luteal phase 204 contains the early luteal phase 212, the mid luteal phase 214 and the late luteal phase 216. The days are numbered from 1 to 28 along the top of the phases in FIG. 2. The duration of these phases, and hence the total duration of the cycle, may vary among users.

The insulin needs of users change over the phases of the menstrual cycle 200. Changes in estradiol and progesterone levels over the menstrual cycle 200 are correlated with changing insulin sensitivity. Insulin sensitivity is higher in the early follicular phase 206 as opposed to the luteal phase 204. The insulin needs of a user may vary by 25% within the menstrual cycle. The variations in insulin needs are not consistent for users. A customized approach is helpful. The exemplary embodiments provide such as customized approach.

Figure 3:
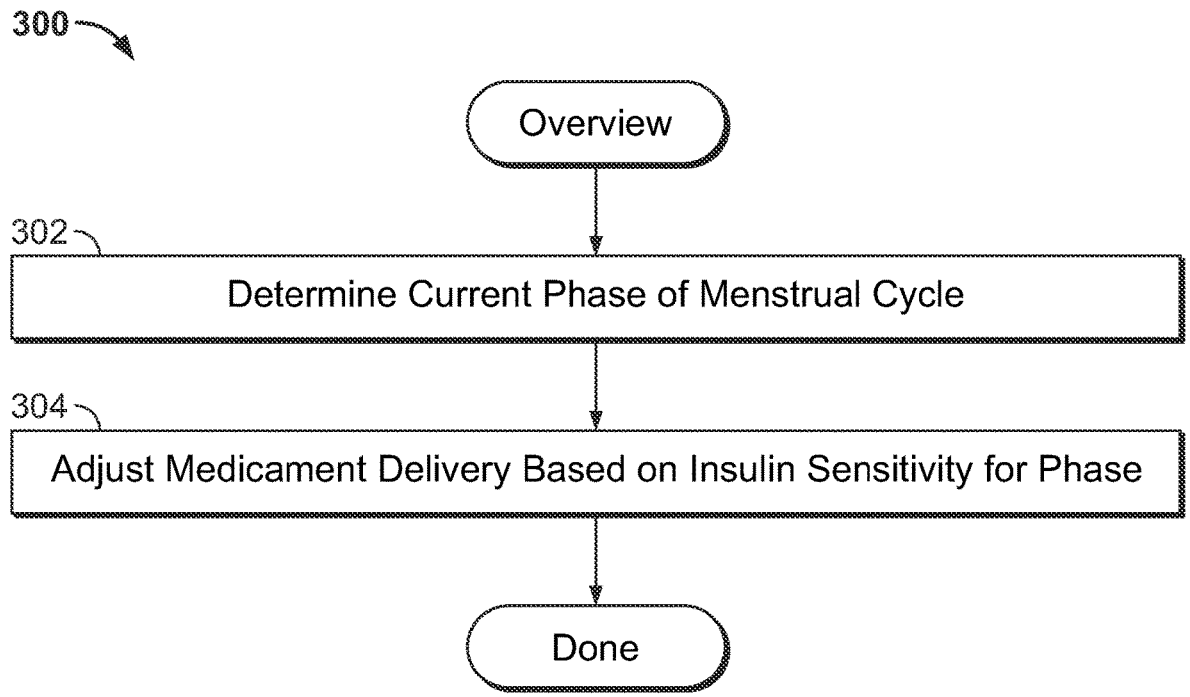
FIG. 3 depicts a flowchart of basic steps that may be performed in exemplary embodiments to compensate for changing insulin needs over the course of a menstrual cycle of a user.

FIG. 3 depicts a flowchart 300 of basic steps that may be performed in exemplary embodiments to compensate for changing insulin needs over the course of a menstrual cycle of a user 108. First, the current phase of the menstrual cycle of the user 108 is determined at 302. This may entail obtaining data from sensors connected to the user and processing the data to determine the current phase. Alternatively, this may entail simply prompting the user 108 to provide information from which the current phase may be derived. Once the current phase is known, the medicament delivery is adjusted based on the current phase at 304.

Figure 4A:
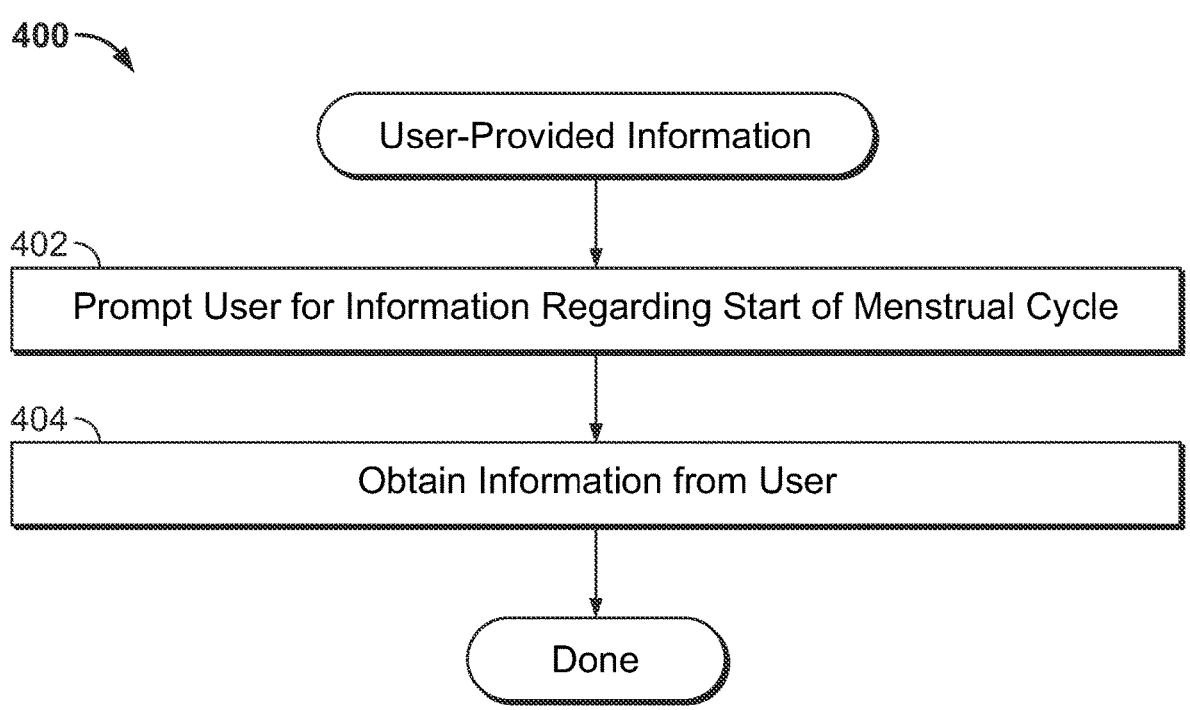
FIG. 4A depicts a flowchart of illustrative steps that may be performed in exemplary embodiments to determine a current phase of a menstrual cycle of a user based on user-provided information.

As shown in the flowchart 400 of FIG. 4A, the determination of the current phase of the menstrual cycle of the user 108 may be determined based on user provided information. At 402, the user 108 may be prompted to provide information regarding the start of the latest menstrual cycle. This may involve, for example, asking the user 108 to identify the date that their most recent period began. A prompt may be provided on the user interface 123 of the management device 104 or the user interface 117 of the medicament delivery device 102. The user might, for instance, be asked to choose a day on a monthly calendar (e.g., FIG. 15). At 404, the information is obtained from the user. The obtained information identifies the date of the beginning of the menstrual cycle of the user and may be used to identify the current phase of the menstrual cycle based on the offset of the current date from the date that the menstrual cycle began.

Figure 4B:
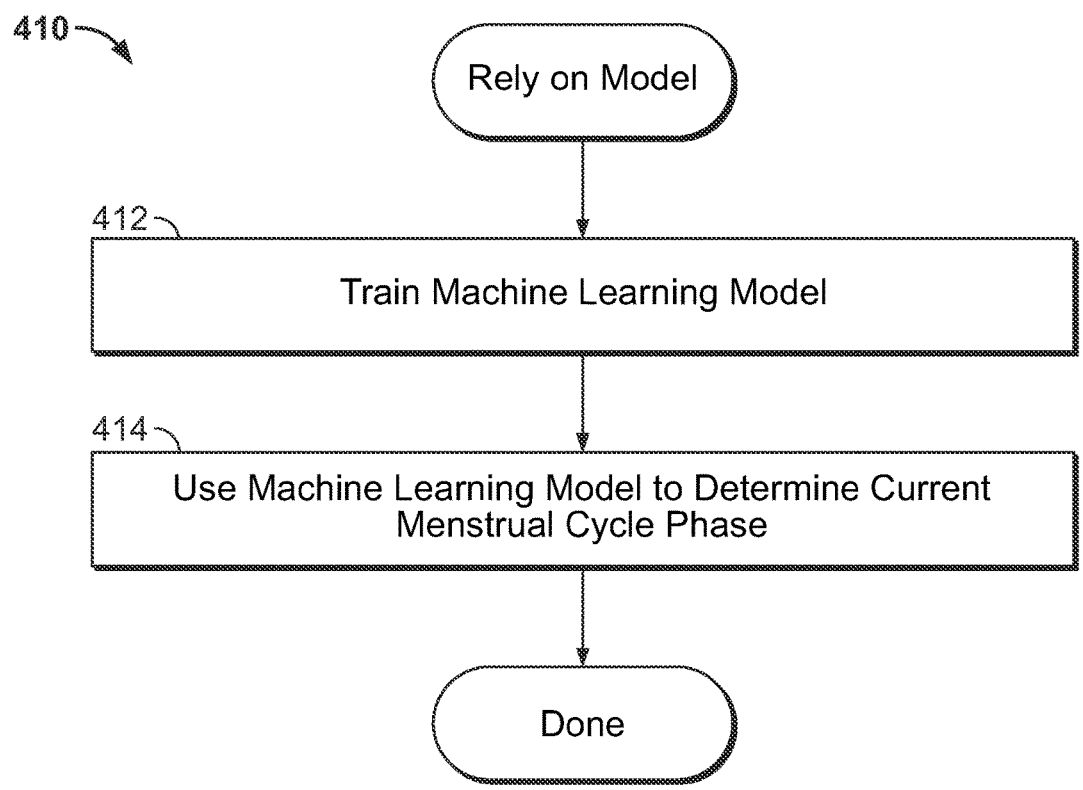
FIG. 4B depicts a flowchart of illustrative steps that may be performed in exemplary embodiments to determine a current phase of a menstrual cycle of a user using a model.

Another option to determining the current phase of the menstrual cycle of the user 108 is to rely upon a model 115. FIG. 4B depicts a flowchart 410 of illustrative steps that may be performed in exemplary embodiments when relying upon a model. The model 115 may be a deep learning model or other type of neural network model. The model 115 may use machine learning algorithms and may use logistic regressors, random forests, support vector machines boosting and bagging approaches and/or unsupervised learning methods. The model 115 automatically detects a current phase of the menstrual cycle of a user and learns trends in insulin sensitivity variation for the user. At 412, the machine learning model 115 is trained. The machine learning model 115 may be trained on data obtained from other women and then may be customized to the user 108. Alternatively, the machine learning model 115 may be trained solely on data for the user 108. For example, the medicament delivery device 102 may be secured to the user 108 and the sensors 106 may gather data for a period of two to three months. During this time, the machine learning model 115 may be in training mode. Once the training is complete, the machine learning model 115 is used to determine the current menstrual cycle phase of the user 108 at 414.

Figure 5:
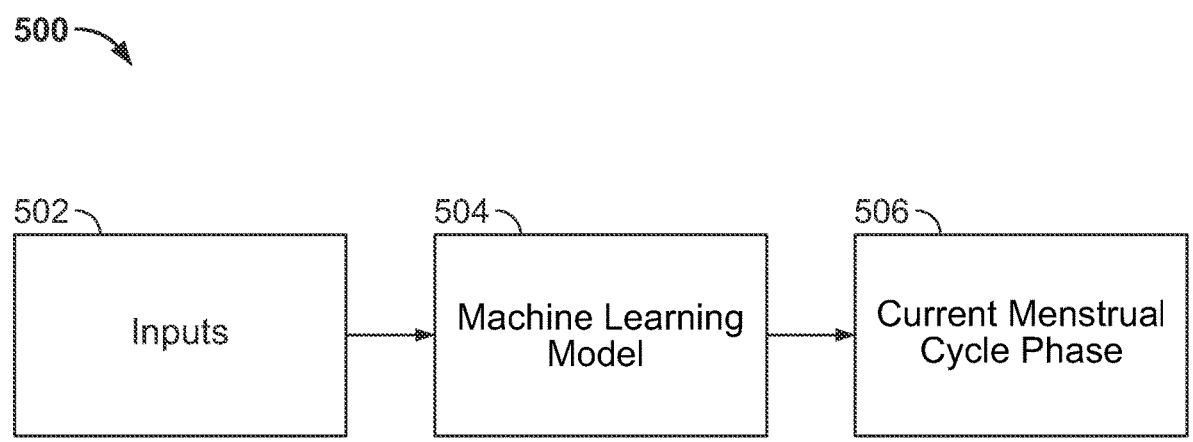
FIG. 5 depicts a block diagram of the data flow for the machine learning model in exemplary embodiments.
Figure 6:
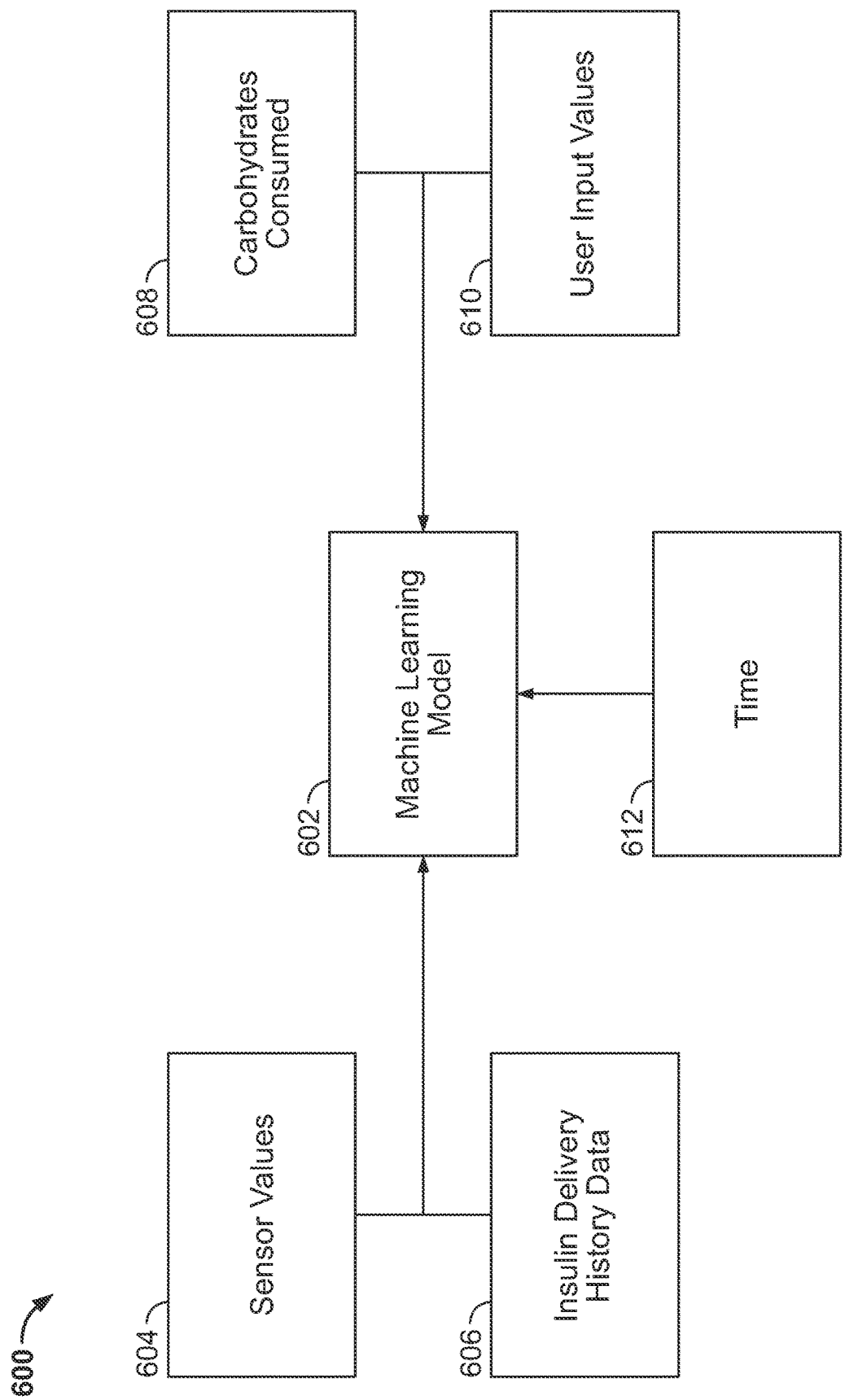
FIG. 6 depicts a diagram showing some of the inputs that may be used by the machine learning model in exemplary embodiments.

FIG. 5 depicts a block diagram 500 of the data flow for the machine learning model 504. The machine learning model 504 processes inputs 502 and generates an output 506 of the current menstrual cycle phase. FIG. 6 depicts a diagram 600 showing some of the inputs that may be used by the machine learning model 602 in exemplary embodiments. Many of these inputs are sensor values 604. For example, the sensor values may include values from sensors like those shown in FIG. 1B of a skin temperature sensor 141, a heart rate sensor 142, a skin conductance sensor 143, an activity detector 144 and/or a glucose sensor 145. The sensor values 604 are segregated into nighttime readings (as indicated by time values when taken) and daytime readings where the user is at rest (as determined by the accelerometer readings or other activity level sensor readings). These values are more determinative of a current phase of menstrual cycle of the user 108 than values taken when the user 108 is active. The machine learning model 602 may use insulin delivery histories 606 as input. Carbohydrates consumed 608 may be input as well as user input values 610. Carbohydrate consumption levels may be indicative of a current phase of the menstrual cycle of the user 108. The machine learning model 602 may also receive time and/or date values 612 as input.

Skin temperature generally drops in the follicular phase 202 and for most women is significantly higher in the luteal phase 204. Nightly heart rate may be lower than average in the follicular phase 202 and higher than average in the luteal phase 204. Nightly heart rate variability may be higher in the follicular phase 202 than average and lower than average in the luteal phase 204. Skin conductance may be lower in the follicular phase 202 than in other portions of the menstrual cycle. Increased carbohydrates are typically consumed during the luteal phase 204. These observations may be used by the logic or the machine learning model 602 to determine current phase of the menstrual cycle of the user.

The machine learning model 602 may determine whether the current phase of the user is the follicular phase 204 by performing the steps of the flowchart 700 in exemplary embodiments. The machine learning model 602 may be rules based in some exemplary embodiments. The flowchart 700 encodes some of the logic used by a general rule of the machine learning model 602. These steps may in some exemplary embodiments be performed by software that is not part of a machine learning model.

At 702, a determination is made whether a current skin temperature of the user 108 is greater than a mean skin temperature of the user over a time interval, such as over one or more menstrual cycles. This check is made because, in general, during the follicular phase the skin temperature of a woman is elevated above the mean skin temperature. If not, the conclusion is reached that the current phase is not a follicular phase at 708. If the skin temperature is greater than the average skin temperature, the variability of the heart rate of the user 108 is compared to the mean heart rate variability of the user to determine if the heart rate variability is greater than the average heart rate variability over an interval at 704. Heart rate variability refers to the degree to which heart rate varies over a menstrual cycle and the mean heart rate variability refers to the average heart rate variability over multiple menstrual cycles, such as those for which data was gathered in the training. It is known that heart rate variability increases to be above average for many women during the follicular phase 204. If heart rate variability is not higher than the mean, it is concluded that the current phase is not a follicular phase at 708. If heart rate variability of the user is above the mean, the current heart rate of the user is compared to the mean heart rate at 706. If the current heart rate is above the mean heart rate, it is determined that the current phase is the follicular phase 204 at 710. Otherwise, the current phase is determined to not be the follicular phase at 708.

Figure 8:
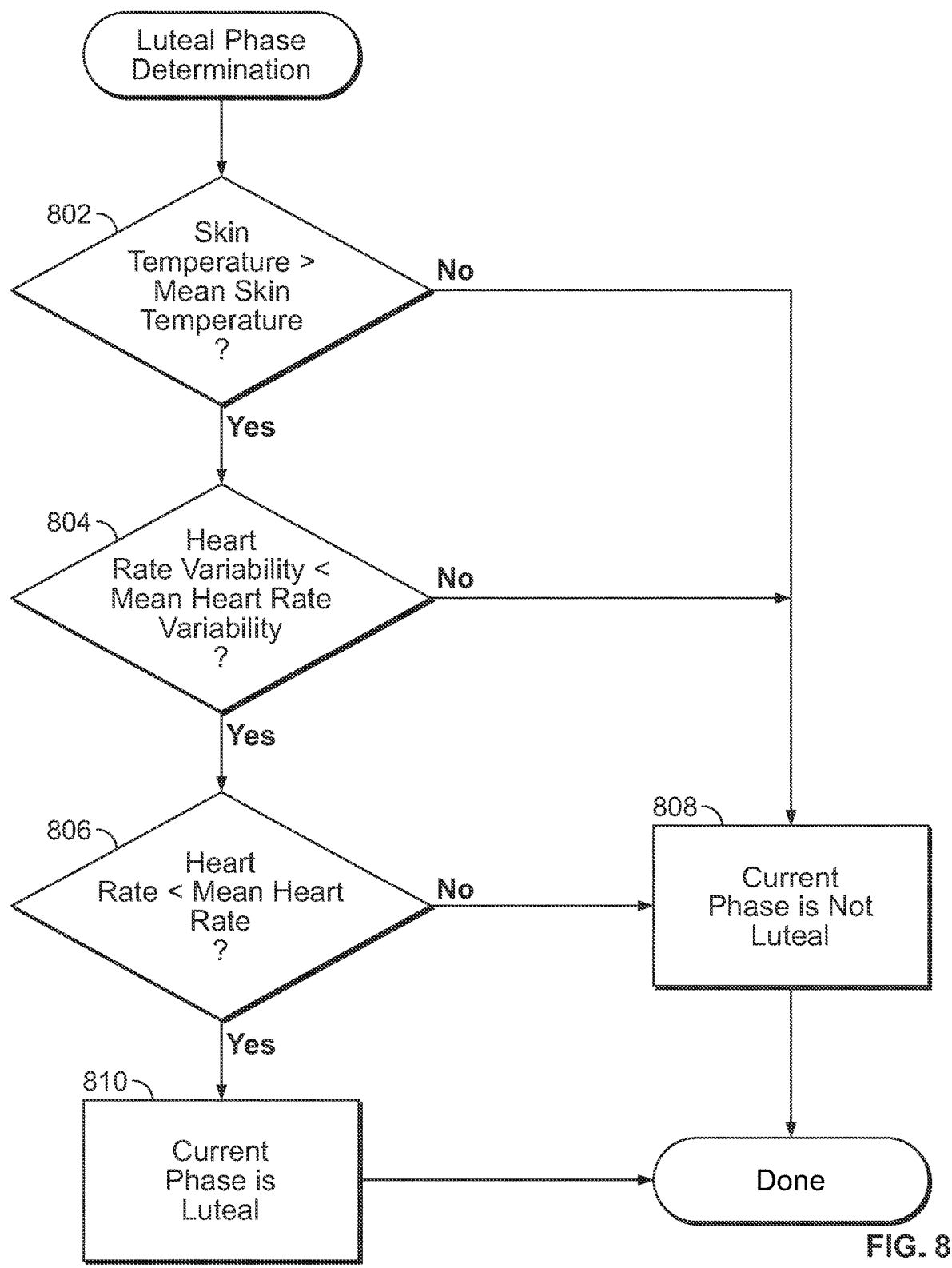
FIG. 8 depicts a flowchart of illustrative steps that may be performed to determine in the current phase of the menstrual cycle of the user is the luteal phase.

FIG. 8 depicts a flowchart 800 of logic that may be applied in exemplary embodiments by the machine learning model 602 or by logic to determine if the current phase is the luteal phase 204. In general, a number of checks are made to see if sensed values are indicative of the current phase being the luteal phase 204. The flowchart 800 captures a general rule that may be applied by the machine learning model 602. At 802, a check is made whether a current skin temperature is higher than the mean skin temperature for the user 108. If not, the current phase is determined to not be the luteal phase at 808. If so, a check is made whether the current heart rate variability of the user is greater than the mean heart rate variability at 804. If not, the current phase is determined to not be the luteal phase at 808. If so, at 806 a check is made if the heart rate of the user is less than the mean heart rate. If not, the current phase is determined to not be the luteal phase 204 at 808. If so, the current phase is determined to be the luteal phase 204 at 810.

Figure 7:
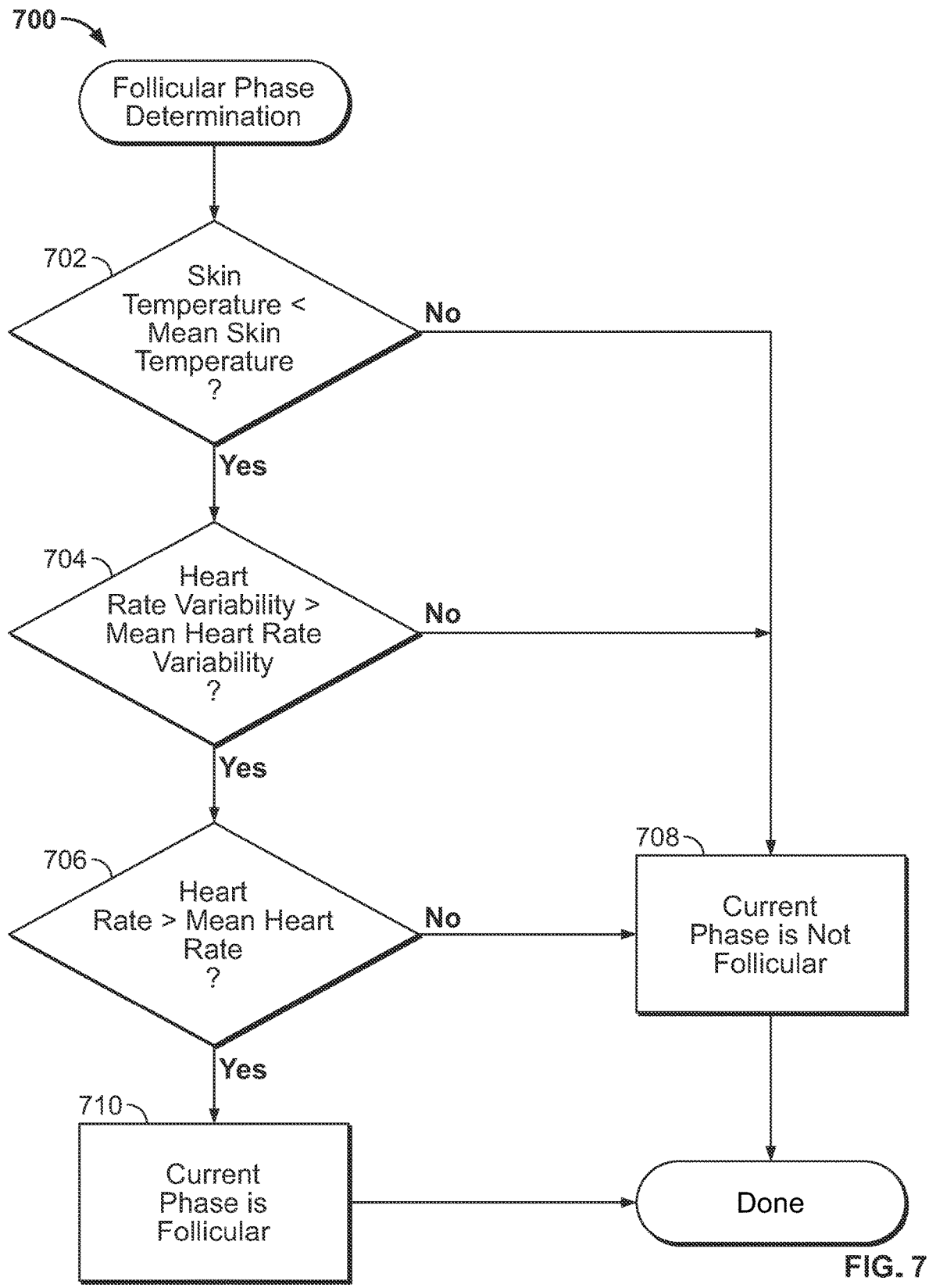
FIG. 7 depicts a flowchart of illustrative steps that may be performed to determine in the current phase of the menstrual cycle of the user is the follicular phase.

The machine learning model need not be limited to applying the general rules and logic of FIGS. 7 and 8. Detailed individual rules may also be learned and applied by the machine learning model 602.

Figure 9A:
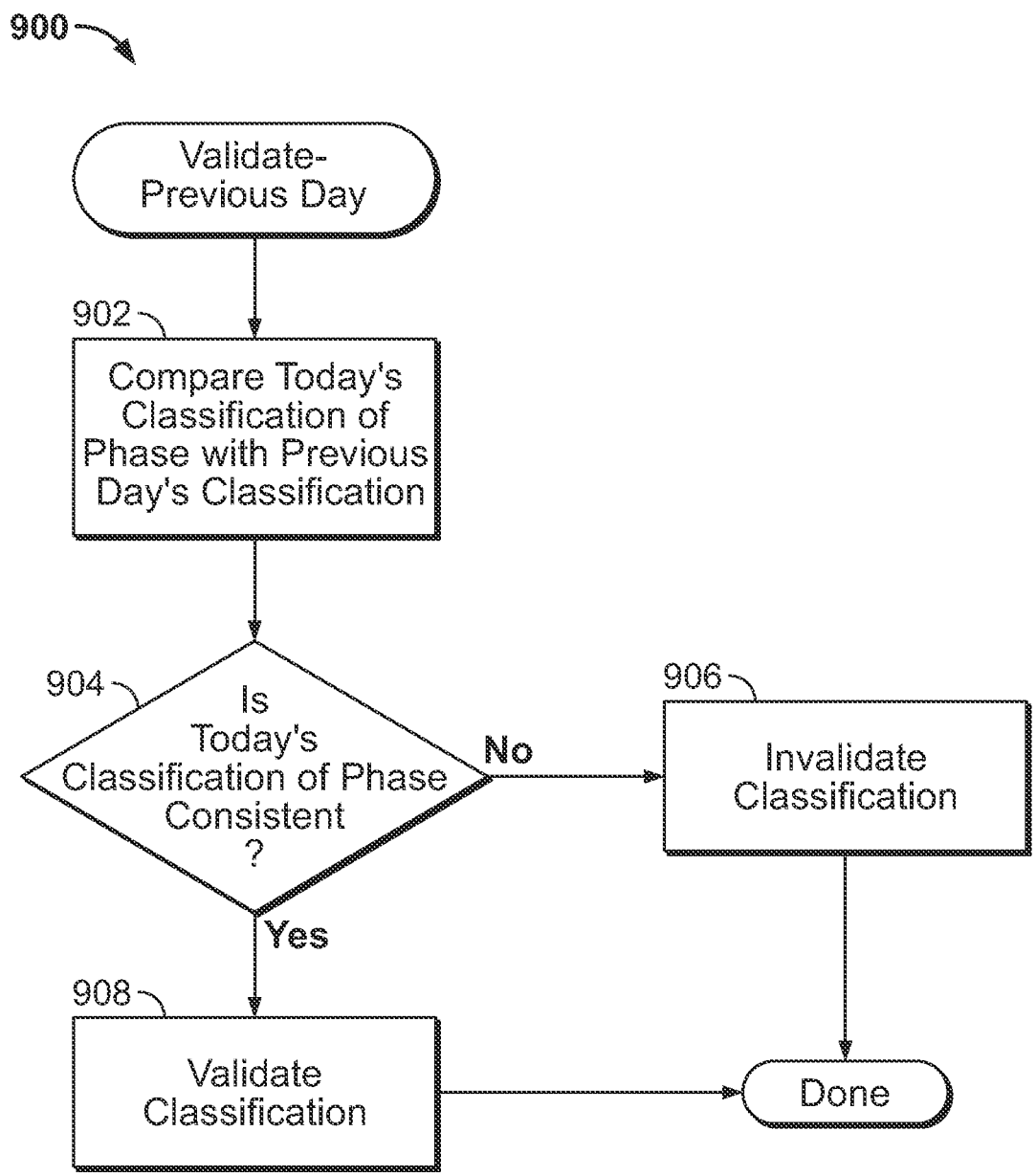
FIG. 9A depicts a flowchart of illustrative steps that may be performed by exemplary embodiments to perform validation of the current phase of the menstrual cycle of the user based on the phase determined for the previous day.

The choice of current phase by the machine learning model 602 may be validated in multiple ways. One validation option is to look at previous decisions of a current phase made by the machine learning model 602. FIG. 9A depicts a flowchart 900 of illustrative steps that may be performed by exemplary embodiments to perform such validation. At 902, the classification of phase for the previous day by the machine learning model 602 is compared with the classification of current phase chosen for the current day by the machine learning model 602. An analysis is made whether the classifications are consistent at 904. In other words, does the current day's classification of current phase make sense with yesterday's classification. For example, if yesterday's classification was the early follicular phase and today's classification was the mid luteal phase, there is an inconsistency as these phases are not adjacent to each other and do not follow each other. If there is an inconsistency, the classification of the current phase is invalidated at 906. If there is not an inconsistency, the classification of the current phase is validated at 908.

Figure 9B:
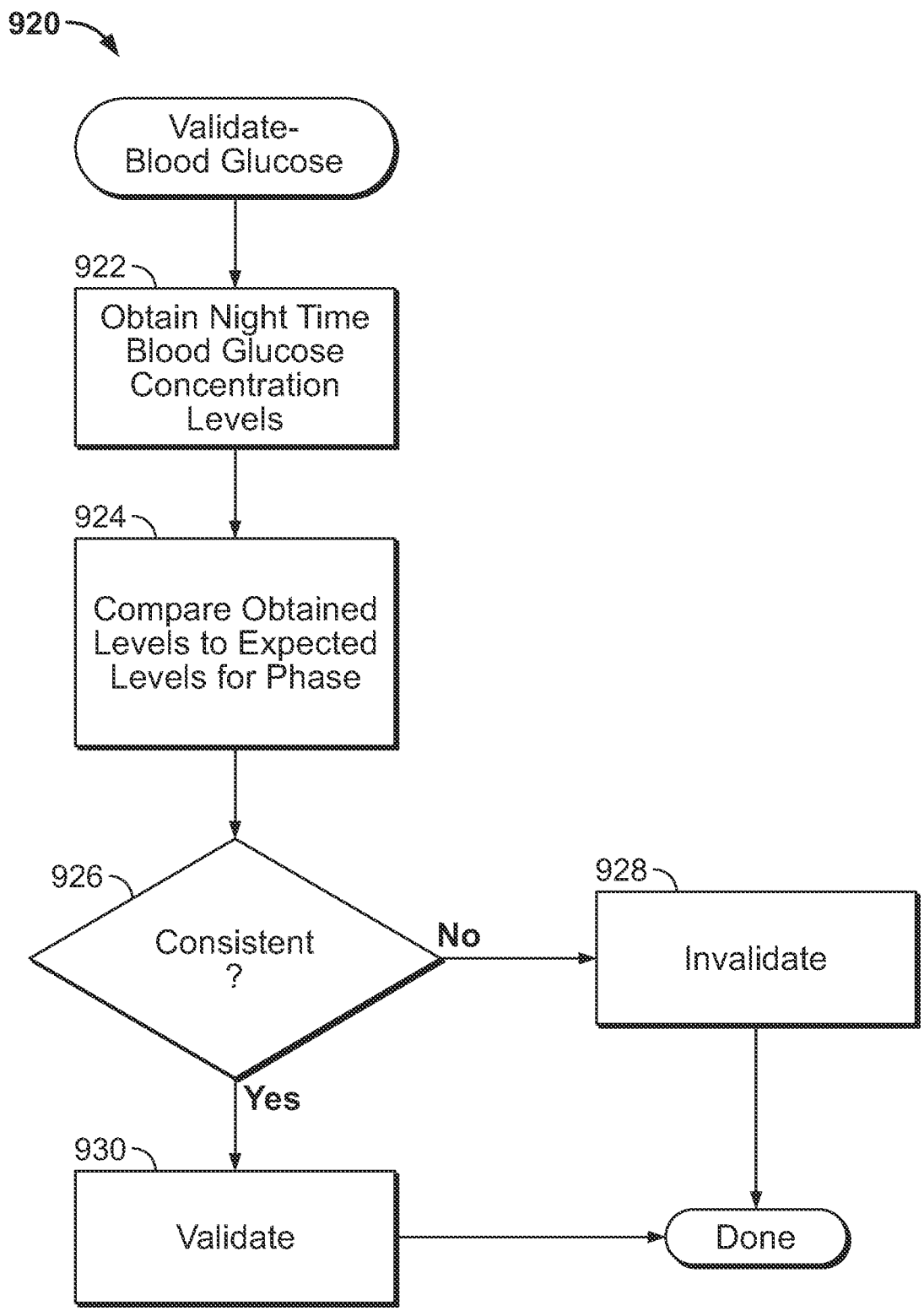
FIG. 9B depicts a flowchart of illustrative steps that may be performed by exemplary embodiments to perform validation of current phase of the menstrual cycle of the user based on blood glucose concentration values.

Another validation option is to look at the blood glucose concentration levels for the user to validate the classification of the current phase by the machine learning model 602. FIG. 9B depicts a flowchart 920 of illustrative steps that may be performed in exemplary embodiments to validate the classification of the current phase. At 922, the nighttime blood glucose concentration levels for the user are obtained. The blood glucose sensor 145 may provide these values. These obtained sensor values are compared to the expected values for the current phase classification from the machine learning model 602 at 926. For example, if there is a reduction in nighttime blood glucose concentration levels relative to a baseline, it is an indication that there is increased insulin sensitivity. An increase in insulin sensitivity is associated with follicular phase 202 and a decrease in insulin sensitivity is associated with the luteal phase 204. At 926, a check is made whether the nighttime blood glucose concentration levels are consistent with the classification of the current phase by the machine learning model 602. If not, the classification of the current phase is invalidated at 928. If so, the classification of the current phase is validated at 930.

Figure 9C:
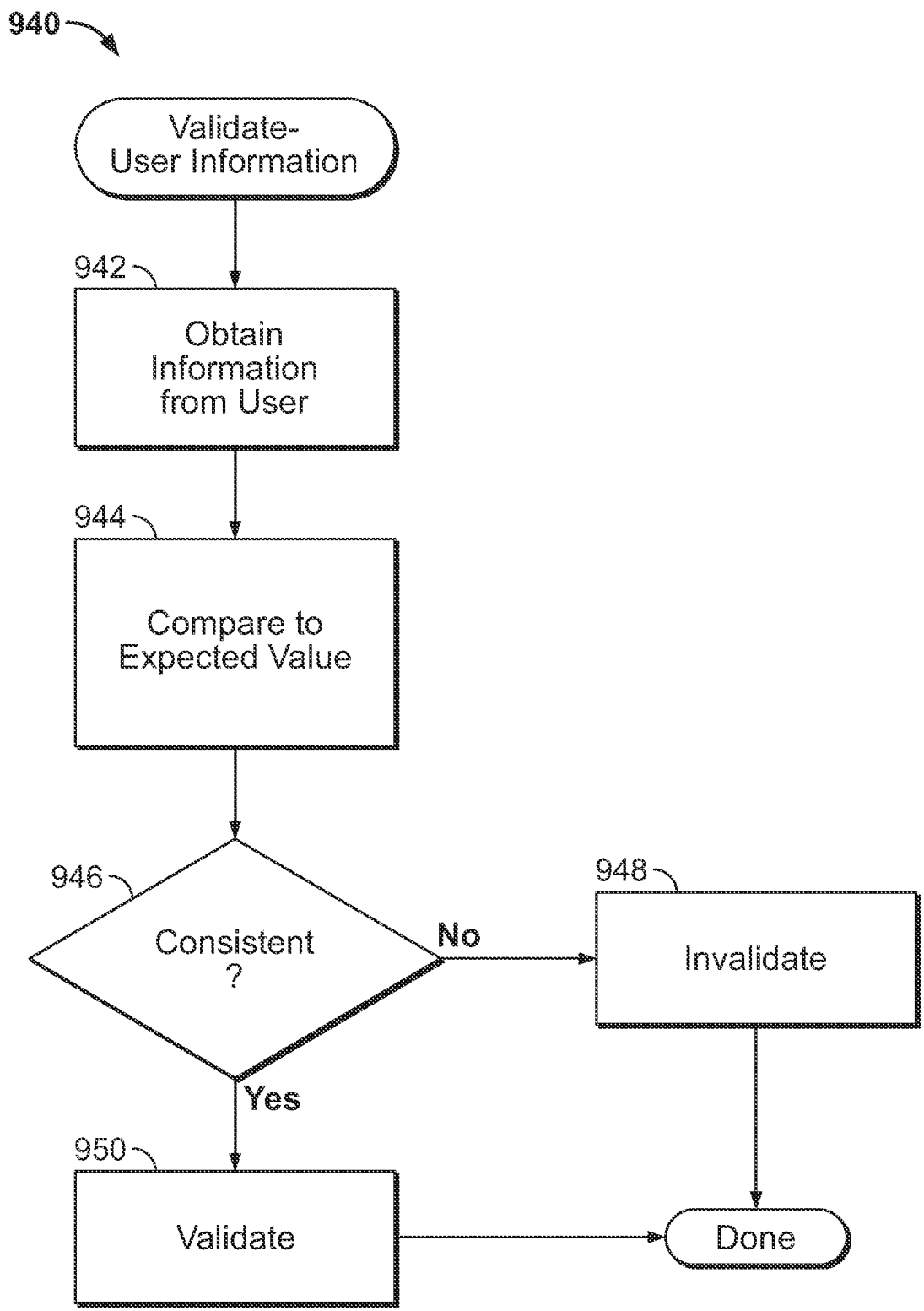
FIG. 9C depicts a flowchart of illustrative steps that may be performed by exemplary embodiments to perform validation of current phase of the menstrual cycle of the user based on user-provided information.

A third approach to validation of a classification of the current phase by the machine learning model 602 is to validate relative to information provided by the user 108. FIG. 9C depicts a flowchart 940 of illustrative steps that may be performed in exemplary embodiments to perform such validation. At 942, information is obtained from the user 108. For instance, the date that a last period of the user started may be obtained from the user. This may be compared at 944 to an expected value, e.g., the date the machine learning model 602 believes the menstrual cycle of the user began. At 946, a check is made whether the machine learning information (e.g., date) is consistent with the information (e.g., date) provided by the user 108. If inconsistent, the current phase classification by the machine learning model 602 is invalidated at 948. If consistent, the current phase classification by the machine learning model 602 is validated at 950.

The three above-described validation approaches may be applied together, separately or in various combinations by the machine learning model 602 to validate preliminary classifications of the current phase of the menstrual cycle by the machine learning model. These validations may be performed before the classification of the current phase is used to adapt medicament dosages. The validations provide an added level of confidence that the classifications of current phase are accurate and reliable. The consequences of invalidation may be determined by the machine learning model 602. Invalidation may prompt the machine learning model 602 to repeat the classification of the current phase, for instance.

Figure 10:
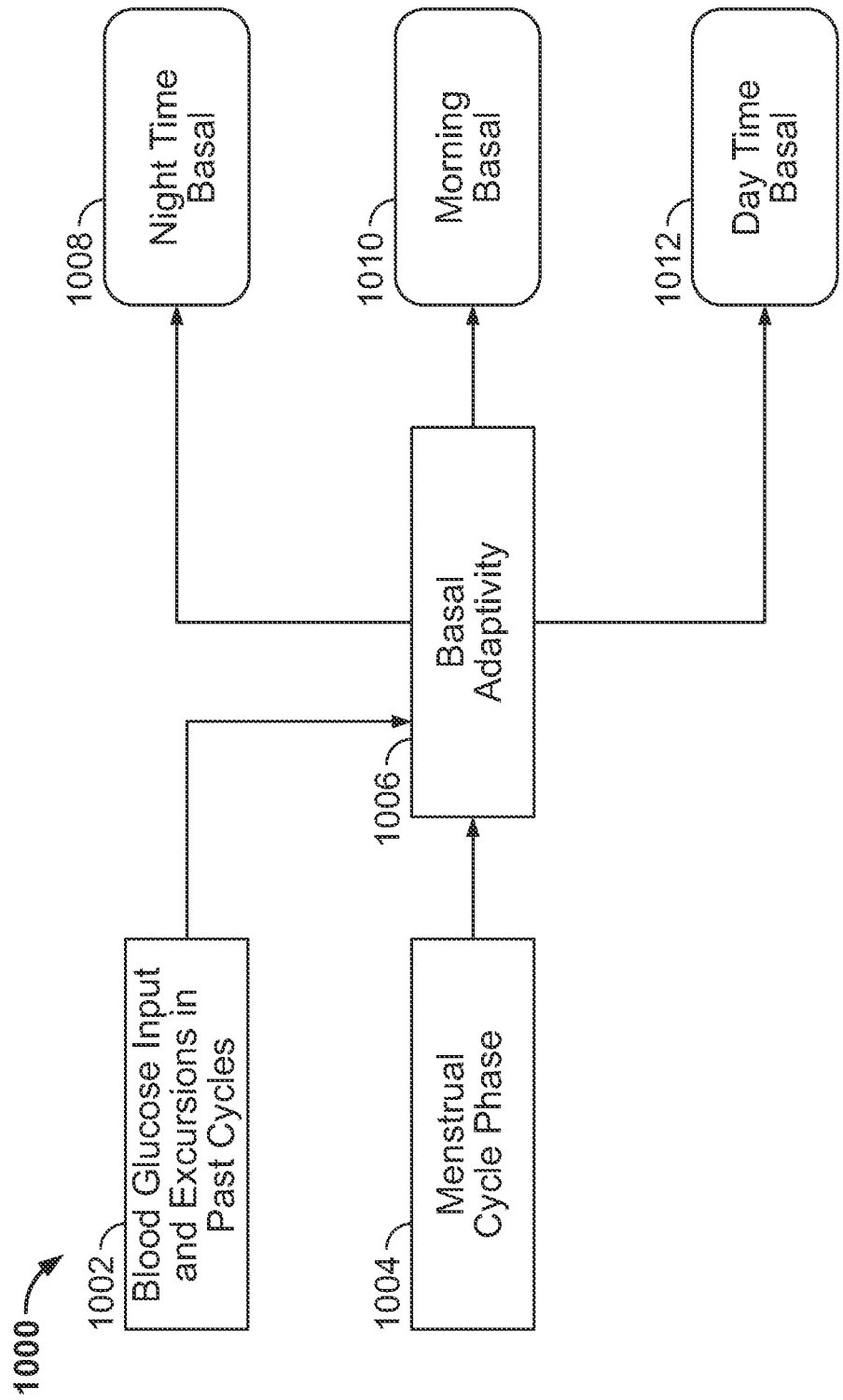
FIG. 10 depicts a diagram showing the inputs and output of the basal adaptivity mechanism of the exemplary embodiments.

Once the current phase of the menstrual cycle of the user 108 is determined, the basal dosage of medicament to be delivered by the medicament delivery device 102 may be adjusted as needed. FIG. 10 depicts a diagram 1000 showing the inputs an output of the basal adaptivity mechanism 1006 of the exemplary embodiments. The basal adaptivity mechanism 1006 may be realized by computer programming instructions contained in the control applications 116 or 120. The basal adaptivity mechanism 1006 receives the classification of the current phase 1004 of the menstrual cycle of the user 108. The basal adaptivity mechanism 1006 also receives a most recent blood glucose concentration reading and information regarding excursions from past cycles (a cycle is, for example, a 5-minute interval). The basal adaptivity mechanism 1006 considers basal needs separately for nighttime, morning and daytime because the needs at these portions of the day tend to vary. As such, depending on the time of day, the basal adaptivity mechanism 1006 may produce a nighttime basal dosage 1008, a morning basal dosage 1010 or a daytime basal dosage 1012. In general, the basal adaptivity mechanism 1006 looks at the current menstrual phase classification 1004 and the historical blood glucose concentration trends in earlier menstrual cycles to adapt the basal dosage amounts 1008, 1010 and 1012. In general, the dosages of basal insulin are increased in the early luteal phase 212 and gradually return to normal levels at the end of the luteal phase 204. The adaptation is tailored to the individual user based on learned patterns. Past blood glucose concentration excursions 1002 are referenced in determining customized basal dosages.

Figure 11A:
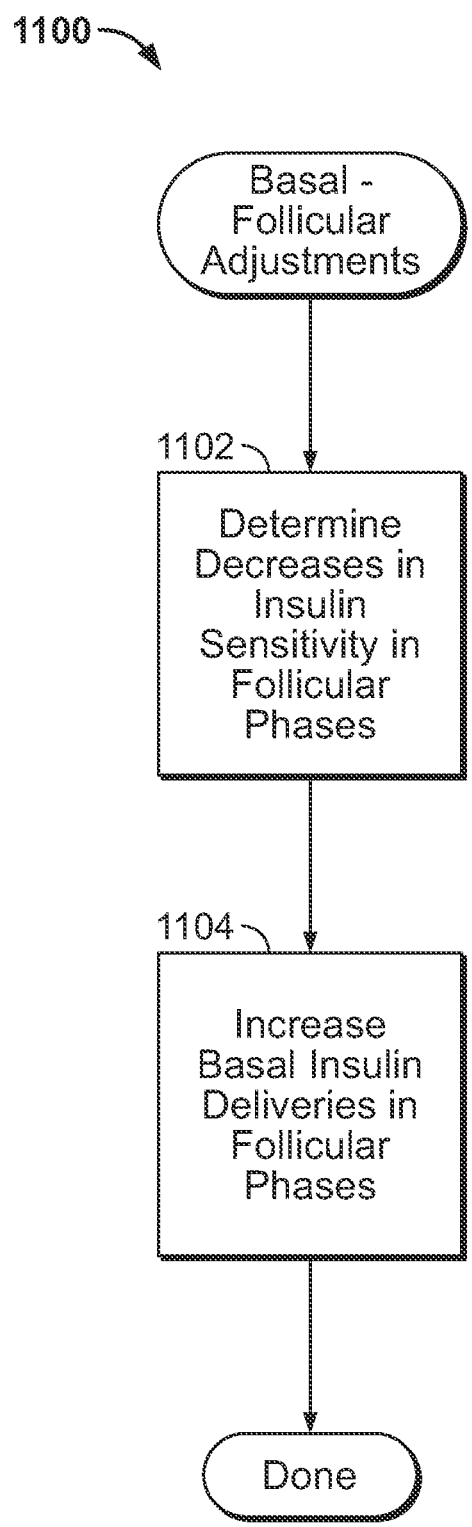
FIG. 11A depicts a flowchart of illustrative steps that may be performed in exemplary embodiments for follicular phase adjustments.

FIG. 11A depicts a flowchart 1100 of illustrative steps that may be performed in exemplary embodiments for follicular phase 202 adjustments. As noted above, decreases in insulin sensitivity are observed with some women in the follicular phase 202. At 1102, the decreases in insulin sensitivity are determined. As mentioned above these decreases are determined by observation by the machine learning model 602. The basal insulin dosages are increased in the follicular phases to compensate for the decreased insulin sensitivity at 1104.

Figure 11B:
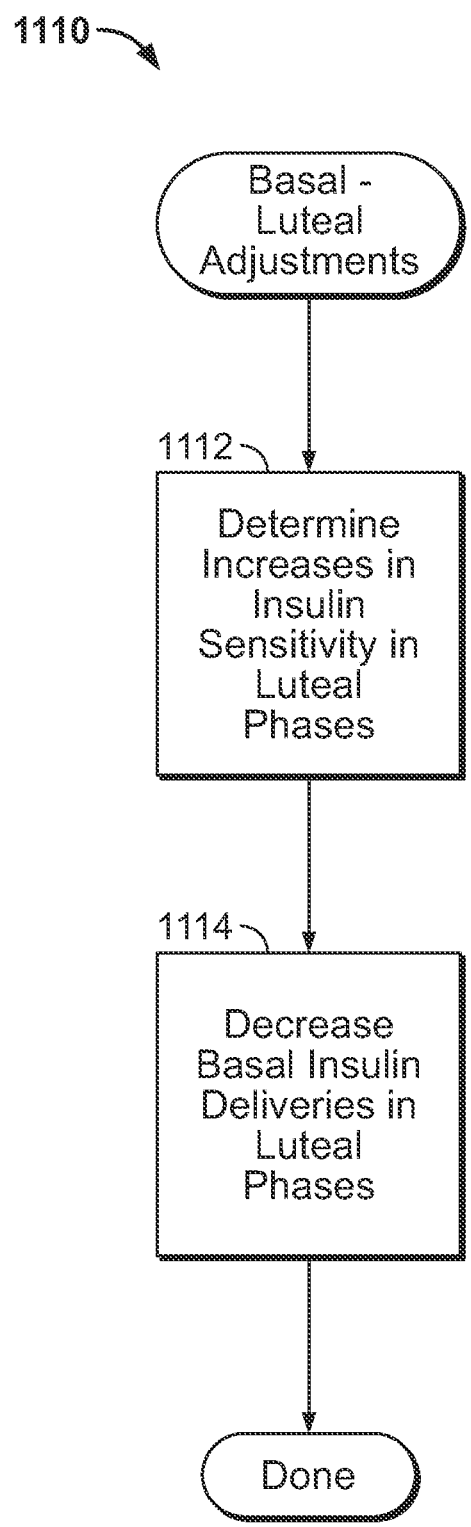
FIG. 11B depicts a flowchart of illustrative steps that may be performed in exemplary embodiments for luteal phase adjustments.

FIG. 11B depicts a flowchart 1110 of illustrative steps that may be performed in exemplary embodiments for luteal phase 204 adjustments. At 1112, a determination of increases in insulin sensitivity in the luteal phase 204 is determined. The basal insulin dosages for the luteal phase 204 are decreased in response at 1114.

Some examples help to illustrate the basal dosage adaptivity that may be provided. The adaptivity is customized to the particular user. Some women experience a reduction in insulin sensitivity of up to 25% in the early luteal phase 212. Typical reductions of insulin sensitivity are in excess of 5%. In such instances, a nominal basal dosage would be set for the early follicular phase 206, the mid-late follicular phase 208 and the peri-ovulation phase 210. The basal dosage would be increased by 15% during the early luteal phase 212. The increase relative to the nominal basal dosage would be set at 10% in the mid luteal phase 214 and would be set at a 5% increase relative to the nominal basal dosage in the late luteal phase 216.

Some women may experience an increased insulin sensitivity in the luteal phases 212, 214 and 216. The increases may be 5% in the early luteal phase, and 10% in the mid luteal phase 214. For these women, there is a nominal basal dosage for the follicular phase 202, the peri-ovulation phase 210 and the late luteal phase 216. The basal dosage would be decreased by 5% relative to the nominal basal dosage in the early luteal phase 212 and would be decreased by 10% relative to the nominal basal dosage in the mid luteal phase 214.

In some instances, no significant changes in insulin dosages for users are seen. The basal dosages are not adapted for such users.

Figure 12:
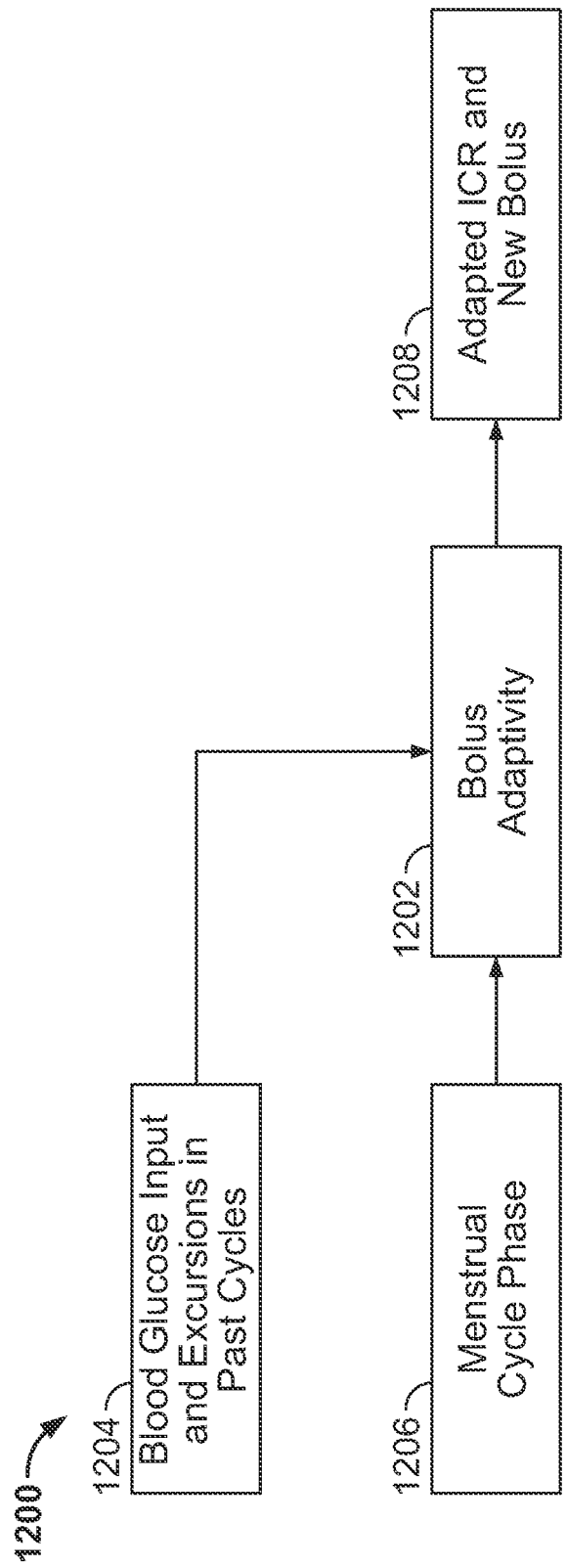
FIG. 12 depicts a diagram showing illustrative inputs and outputs for a bolus adaptivity mechanism.

The bolus dosages may also be adapted. FIG. 12 depicts a diagram 120 showing illustrative inputs and outputs for a bolus adaptivity mechanism 1202. The bolus adaptivity mechanism 1202 may be realized as computer programming instructions in the control application 116. Inputs to the bolus adaptivity mechanism 1202 may include the classification of the current menstrual cycle phase 1206 and the current blood glucose concentration reading along with information regarding blood glucose concentration excursions from past cycles 1204. The bolus adaptivity mechanism 1202 processes these inputs 1204 and 1206 to produce an adapted insulin to carbohydrate ratio for the user and a bolus dosage amount 1208. Bolus dosages may be calculated when requested by the user 108.

Figure 13:
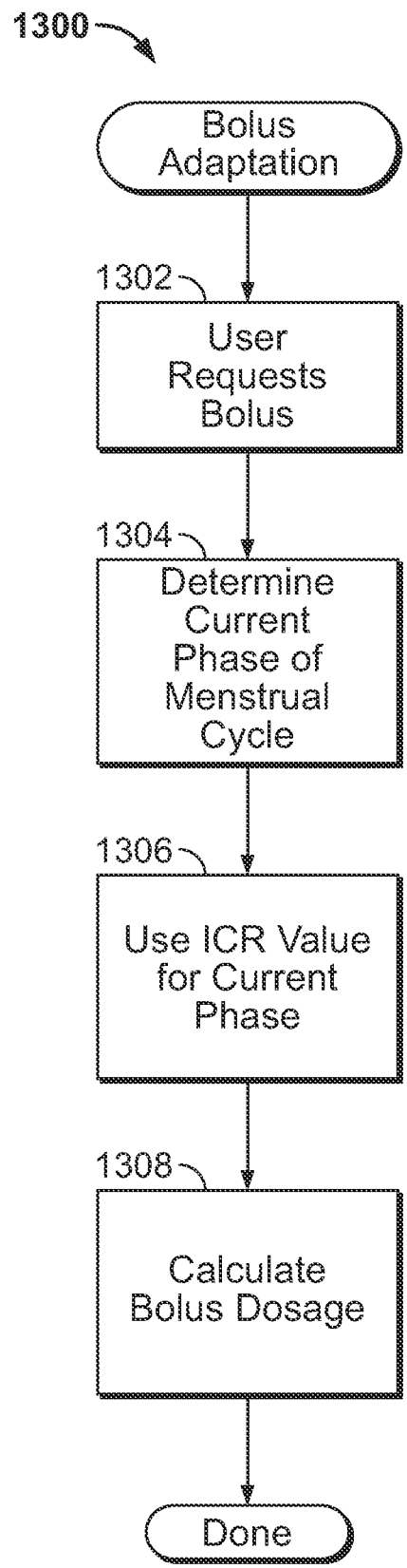
FIG. 13 depicts a flowchart of illustrative steps that may be performed in exemplary embodiments to generate an adapted insulin bolus dosage based on current phase of the menstrual cycle of the user.

FIG. 13 depicts a flowchart 1300 of illustrative steps that may be performed in exemplary embodiments to generate an adapted insulin bolus dosage based on the current phase of the menstrual cycle of the user 108. At 1302, the user 108 requests a medicament bolus, such as a bolus of insulin. At 1304, the current phase of the menstrual cycle of the user 108 is determined as discussed above. As was mentioned above, insulin sensitivity may vary with phase of the menstrual cycle. The exemplary embodiments may adapt for the changing insulin sensitivity by adapting the insulin to carbohydrates ratio (ICR), which may be used in determining the bolus dosage. The ICR is used to determine how much insulin is needed to compensate for a quantity of carbohydrates that is ingested. If insulin sensitivity increases, the ICR is decreased, whereas if insulin sensitivity decreases, the ICR is increased. At 1306, the ICR for the current phase of the menstrual cycle of the user 108 is identified and at 1308 is used to calculate the bolus dosage. The magnitude of the increase in ICR or decrease in ICR is customized to the user's learned change in insulin sensitivity across the phases of the menstrual cycle of the user.

The bolus dosage is proportional to the carbohydrates ingested and the ICR. In particular, the bolus dosage equals the grams of carbohydrates ingested divided by the ICR. ICR typically will be higher during the luteal phase 204 compared to the follicular phase 202. A suitable increase in the ICR for the luteal phase is 10% compared to the follicular phase 202.

The ICR adaptation may follow the insulin sensitivity trend. As explained above, the insulin sensitivity changes at the individual level. As an example, suppose that the insulin sensitivity decreases in the early luteal phase 212 as described above, sensitivity changes the ICR would be reduced by 15% compared to baseline ICR in the early luteal phase 212, increased by 10% in the mid luteal phase 214 and reduced by 5% in the late luteal phase 216 compared to baseline ICR.

When the insulin sensitivity does not change through the menstrual cycle, the ICR may not be modulated through the menstrual period. The insulin sensitivity may be determined, such as described above, by looking at changes in blood glucose concentration for the user relative to the quantity of insulin delivered. If the area under the blood glucose curve is remaining the same, but the insulin delivery amount is increased, this means that the insulin sensitivity has been reduced (for the same blood sugar levels we are requiring more insulin). Conversely, if the area under the blood glucose curve remains the same, but the amount of insulin needed has reduced, then the insulin sensitivity has increased. When comparing insulin sensitivity across the menstrual cycle one can compare the ratio of blood sugar area under the curve to insulin delivery and infer insulin sensitivity variation or the lack thereof. If the change in insulin sensitivity over the user's menstrual cycle is below a threshold based on the comparison, the modulation by menstrual cycle phase described herein may not be performed.

Figure 14A:
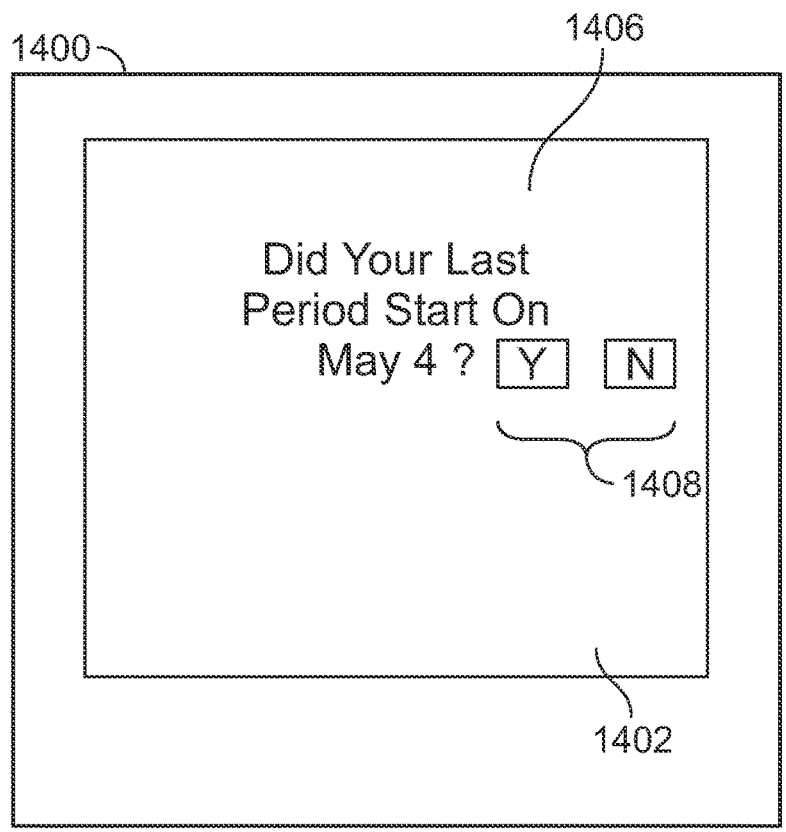
FIGS. 14A-14D depict illustrative user interfaces.
Figure 14B:
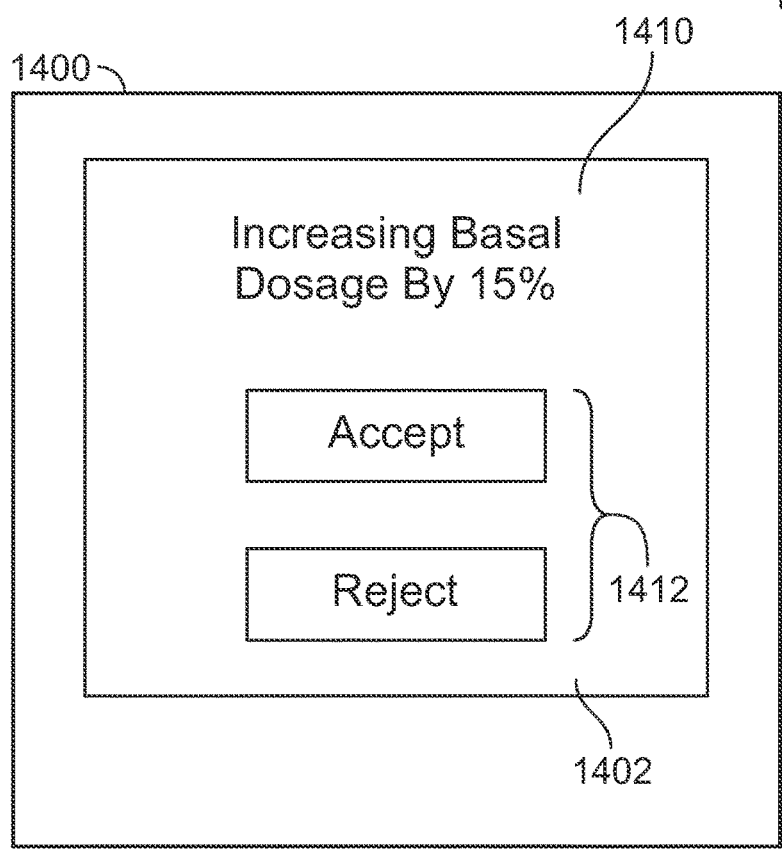
Figure 14C:
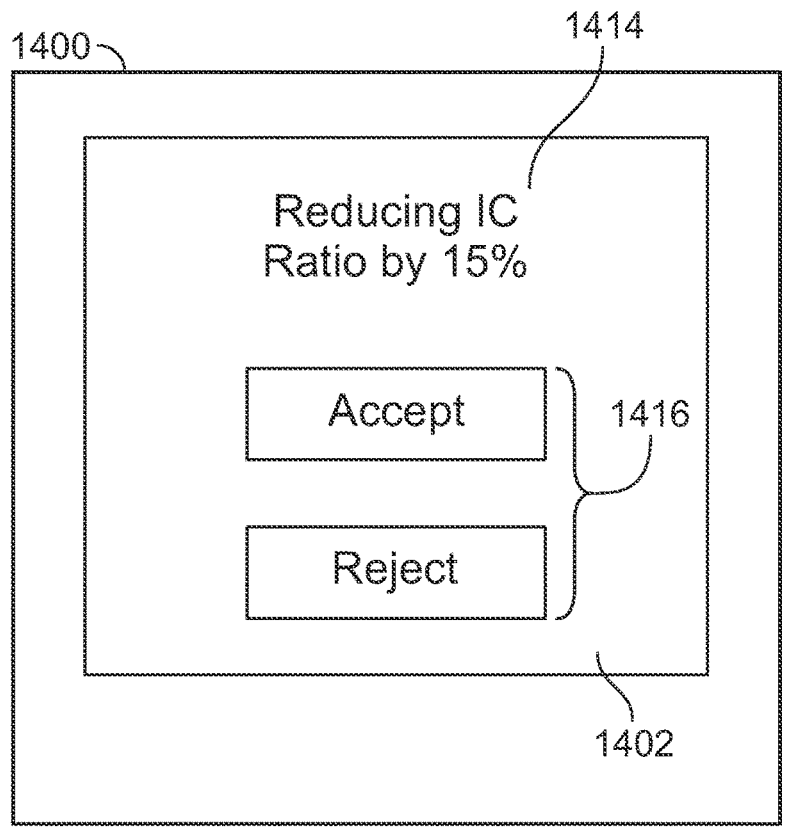
Figure 14D:
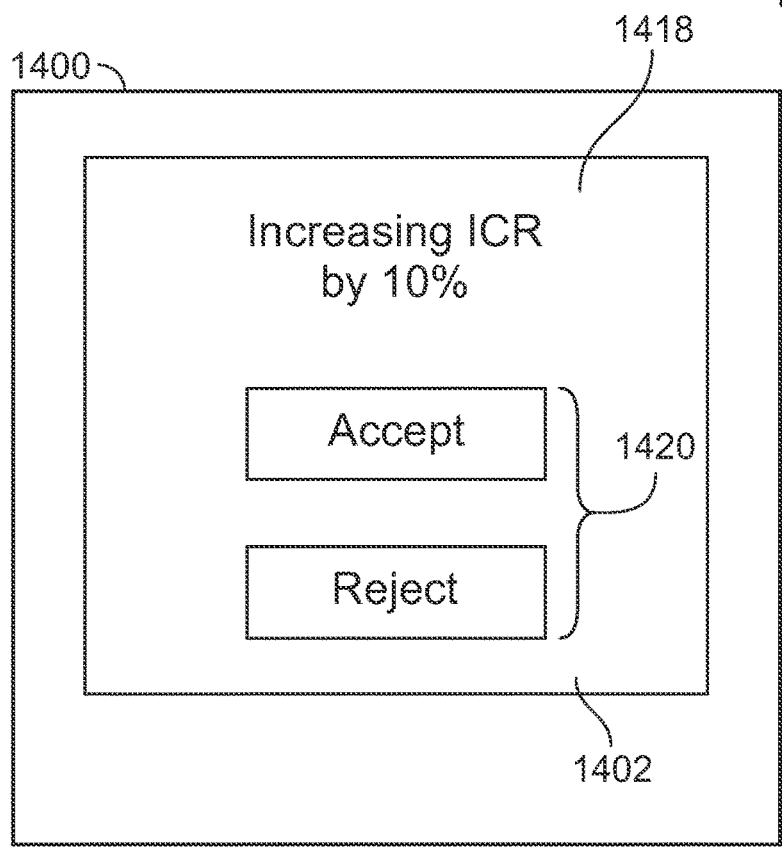

As was mentioned above, the medicament delivery device 102 may include a user interface 117 and the management device 104 may include a user interface 123. The user interfaces 117 and 123 may be used to verify the phase that the machine learning model deems to be the current phase of the menstrual cycle. For example, as shown in FIG. 14A, a display 1402 on a device 1400 (such as the medicament delivery device 102 or the management deice 104) may display a prompt 1406 for the user to verify and/or input the date that her last period began on. Buttons 1408 may be selected to verify (selecting "Y") or not verify (selecting "N") the displayed date. Buttons may be used to adjust the date rather than selecting a "Y" or "N" to verify the date. The display 1402 may also be used to verify a change in the basal dosage. As shown in FIG. 14B, a message 1410 that may be displayed on display 1402 to prompt the user to accept or reject the proposed increase in basal dosage. A user interface screen or informational text may also be displayed to inform the user as to why an increase or decrease of X % (e.g., 10%) of the basal dosage is being recommended by the system. Buttons 1412 enable the user 108 to accept or reject the proposed increase. The display 1402 may also display a request 1414 to accept or reject a proposed reduction in ICR by choosing buttons 1416 as shown in FIG. 14C. A user interface screen or informational text may also be displayed to inform the user as to why an increase or decrease of the ICR (e.g., −15%) is being recommended by the system. Similarly, a request 1418 to reduce or increase the ICR may be displayed on the display 1402. Buttons 1420 enable the user to accept or reject the reduction. Such buttons, confirmations, recommendations, and/or informational text may be displayed and/or used throughout the menstrual cycle.

These are just a few examples of how the user interface 117 or 123 may be used to authorize changes, inform of changes, recommend changes, or confirm analysis performed by the machine learning model 602. Other messages and graphical items may be displayed.

Figure 15:
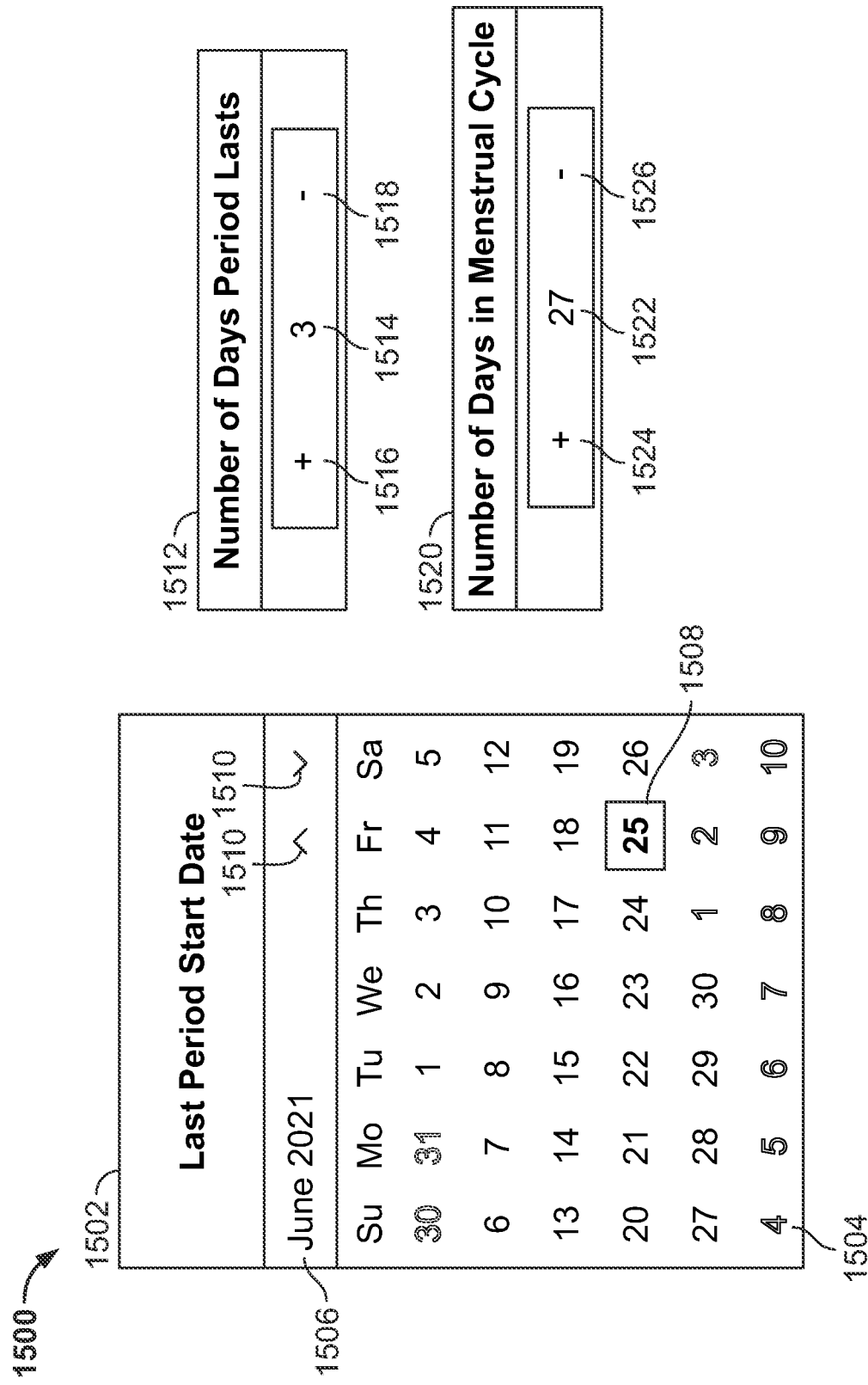
FIG. 15 depicts an illustrative user interface for soliciting information from a user regarding the user's menstrual cycle.

FIG. 15 shows an illustrative user interface 1500 for soliciting information from the user 108. The user interface includes a section 1502 for obtaining information regarding the start date of the user's last period. The section 1502 includes a calendar 1504 that shows a month. Text 1506 identifies the month and year that is displayed. The current date is identified by a highlight box 1508. An up arrow and a down arrow 1510 may be selected to choose the next month or the previous month, respectively. The user 108 simply clicks on the day of the month on which her last period started. This information is then recorded and stored, such as in storage 114. The user interface 1500 may also include a text box 1512 for the user 108 to specify the number of days her period typically lasts. The user 108 may enter a value 1514 in the text box 1512 or may be select the +button 1516 to increase the displayed value 1514 or the— button to decrease the displayed value by increments of 1. A text box 1520 may be provided for the user 108 to specify the average number of days in her menstrual cycle. The user 108 may enter a value 1522 in the text box 1520 or use the +button 1524 and/or—button to select the correct value. The information gathered from the user may be stored in storage 114. This information may be used by the model 155 and the controller 110 as described above.

While the discussion has focused on exemplary embodiments, it should be appreciated that various changes in form and detail relative to the exemplary embodiments without departing from the intended scope of the appended claims.

The invention claimed is:

1. A method performed by a processor in an electronic device, comprising:
receiving a classification of a current phase of a menstrual cycle of a user from a machine learning model;
attempting to validate the classification based on glucose levels of the user by comparing expected glucose levels of the user with actual glucose levels of the user for an interval; and
where the classification is validated, adjusting a medicament dosage to be delivered by an automated medicament delivery device in view of the classification.

2. The method of claim 1, wherein the electronic device is one of a medicament delivery device or a management device for managing the medicament delivery device.

3. The method of claim 2, wherein the machine learning model receives sensor data regarding the user as input.

4. The method of claim 1, wherein the sensor data includes heart rate data.

5. The method of claim 4, wherein the machine learning model processes the heart rate data to determine a mean heart rate variability of the user and uses the mean heart rate variability of the user in determining an estimated menstrual cycle of the user.

6. The method of claim 1, wherein the medicament is one of insulin, glucagon or a glucagon peptide-1 (GLP-1) agonist.

7. The method of claim 1, wherein the adjusting comprises adjusting an insulin dosage to be delivered by a medicament delivery device based on an insulin sensitivity of the user for the current phase of the menstrual cycle of the user.

8. A method performed by a processor in a medicament delivery system, comprising:
receiving a classification of a current phase of a menstrual cycle of a user from a machine learning model;
attempting to validate the classification of the current phase of the menstrual cycle of the user by comparing the classification of the current phase of the menstrual cycle of the user with a classification of a phase of the menstrual cycle of the user for a previous day from the machine learning model; and
where the classification is validated:
determining insulin sensitivity of the user with the processor based on the classification; and
adjusting a quantity of the-insulin delivered by the medicament delivery system based on the determined insulin sensitivity.

9. The method of claim 8, wherein the machine learning model receives sensor data from a sensor and wherein the sensor senses skin temperature, heart rate, skin conductance, or activity level.

10. The method of claim 8, wherein the machine learning model receives additional sensor data inputs from multiple sensors and wherein the machine learning model uses the additional inputs in the determining of the classification of the current phase of the menstrual cycle of the user.

11. The method of claim 10, wherein the additional sensor data inputs from the multiple sensors include a blood glucose concentration value for the user from a one of the sensors that is a glucose monitor.

12. The method of claim 8, wherein the adjusting the quantity of insulin to be delivered by the medicament delivery system based on the determined insulin sensitivity comprises adjusting one of a basal insulin dosage or an insulin bolus dosage.

13. The method of claim 8, wherein the adjusting adjusts a size of a dosage of basal insulin to be delivered by the medicament delivery system.

14. The method of claim 8, wherein the adjusting adjusts a size of dosage of an insulin bolus to be delivered by the medicament delivery system.

15. A method performed by a processor in a medicament delivery system, comprising:
receiving a classification of a current phase of a menstrual cycle of a user of the medicament delivery system from a machine learning model;
attempting to validate the classification by prompting a user to provide information relating to timing of their menstrual cycle, receiving the information relating to timing of their menstrual cycle, and comparing the information received from the user to attempt to validate the classification; and
with the processor, where the classification is validated, adjusting delivery of medicament to the user based on the classification.

16. The method of claim 15, further comprising:
receiving input from at least one sensor that senses information regarding the user at the machine learning model; and
processing the input with the machine learning model to determine the classification.

17. The method of claim 16, wherein the input includes heart rate and skin temperature.

18. The method of claim 16, wherein the input includes blood glucose concentration and an indication of activity level.

19. The method of claim 15, wherein the machine learning model is trained by training the machine learning model on a data set derived from women other than the user; and then training the machine learning model on data from the user to customize the machine learning model to the user.

20. The method of claim 15, wherein the medicament is one of insulin, glucagon or a glucagon peptide-1 (GLP-1) agonist.

* * * * *